(12) United States Patent
Han

(10) Patent No.: US 10,670,116 B2
(45) Date of Patent: Jun. 2, 2020

(54) CONTROL APPARATUS AND METHOD FOR VARIABLE RENEWABLE ENERGY

(71) Applicant: Differential Dynamics Corporation, Owings Mills, MD (US)

(72) Inventor: Kyung Soo Han, Timonium, MD (US)

(*) Notice: Subject to any disclaimer, the term of this patent is extended or adjusted under 35 U.S.C. 154(b) by 157 days.

(21) Appl. No.: 15/883,927

(22) Filed: Jan. 30, 2018

(65) Prior Publication Data

US 2018/0195582 A1 Jul. 12, 2018

Related U.S. Application Data

(63) Continuation-in-part of application No. 15/267,655, filed on Sep. 16, 2016, now Pat. No. 9,912,209, which
(Continued)

(51) Int. Cl.
*F16H 3/72* (2006.01)
*F03B 13/10* (2006.01)
(Continued)

(52) U.S. Cl.
CPC ............ *F16H 3/724* (2013.01); *F03B 13/10* (2013.01); *F03B 13/22* (2013.01); *F03B 15/00* (2013.01); *F03B 17/06* (2013.01); *F03B 17/063* (2013.01); *F03D 3/002* (2013.01); *F03D 3/0436* (2013.01); *F03D 7/0276* (2013.01); *F03D 7/06* (2013.01); *F03D 15/00* (2016.05); *H02K 7/116* (2013.01); *H02K 7/183* (2013.01); *H02K 7/1823* (2013.01); *F05B 2210/16* (2013.01); *F05B 2220/32* (2013.01); *F05B 2220/706* (2013.01); *F05B 2260/40311* (2013.01); *F05B 2270/1014* (2013.01); *F16H 2200/20* (2013.01);
(Continued)

(58) Field of Classification Search
None
See application file for complete search history.

(56) References Cited

U.S. PATENT DOCUMENTS 3,619,746 A 11/1971 Thornton
7,081,689 B2 7/2006 Tilscher et al.
(Continued)

FOREIGN PATENT DOCUMENTS

WO WO199214298 8/1992
WO WO2011011358 1/2011

*Primary Examiner* — Justine Holmes
(74) *Attorney, Agent, or Firm* — Cameron LLP

(57) ABSTRACT

Three variable gear assemblies called Transgears, an electro-mechanical rotary frequency converter, and a variable overlap generator (VOG), may be used independently and together to provide constant frequency and voltage output power from variable input water flow and wind speed. Two sets of three variable spur/helical gear assemblies of sun and planetary gear sets are combined in a mechanical three variable control to form an assembly called a Hummingbird. A Hummingbird control may comprise a constant speed control motor and a constant speed generator to produce required constant frequency and voltage. In order to provide a constant control input, a constant rotational speed can be produced by a control motor. Once a constant rotational speed is produced, a constant electric frequency and constant AC voltage can be produced by the variable output generator.

17 Claims, 48 Drawing Sheets

General Layout of a Hummingbird-controlled River Turbine

Related U.S. Application Data is a continuation-in-part of application No. 14/838,867, filed on Aug. 28, 2015, now Pat. No. 9,476,401, and a continuation-in-part of application No. 15/707,138, filed on Sep. 18, 2017, now Pat. No. 10,378,506.

(60) Provisional application No. 62/409,549, filed on Oct. 18, 2016, provisional application No. 62/487,101, filed on Apr. 19, 2017, provisional application No. 62/520,884, filed on Jun. 16, 2017.

(51) Int. Cl.
| | | |
|---|---|---|
| *F03B 15/00* | (2006.01) | |
| *F03B 13/22* | (2006.01) | |
| *F03D 7/02* | (2006.01) | |
| *H02K 7/18* | (2006.01) | |
| *H02K 7/116* | (2006.01) | |
| *F03D 15/00* | (2016.01) | |
| *F03B 17/06* | (2006.01) | |
| *F03D 3/04* | (2006.01) | |
| *F03D 3/00* | (2006.01) | |
| *F03D 7/06* | (2006.01) | |

(52) U.S. Cl.
CPC ........ *H02K 2213/09* (2013.01); *Y02E 10/226* (2013.01); *Y02E 10/28* (2013.01); *Y02E 10/38* (2013.01); *Y02E 10/74* (2013.01)

(56) References Cited

U.S. PATENT DOCUMENTS

| | | | |
|---|---|---|---|
| 7,166,056 B2 | 1/2007 | Miller | |
| 7,632,203 B2 | 12/2009 | Miller | |
| 7,727,101 B2 | 6/2010 | Miller | |
| 7,828,685 B2 | 11/2010 | Miller | |
| 8,070,635 B2 | 12/2011 | Miller | |
| 8,131,149 B2 | 3/2012 | Smithson | |
| 8,338,481 B2 | 12/2012 | Kloog et al. | |
| 8,342,999 B2 | 1/2013 | Miller | |
| 8,485,933 B2 | 7/2013 | Han | |
| 8,641,570 B2 | 2/2014 | Han | |
| 8,702,552 B2 | 4/2014 | Han | |
| 8,816,620 B2 | 8/2014 | Pricop | |
| 8,986,149 B2 | 3/2015 | Han | |
| 8,992,370 B2 | 3/2015 | Han | |
| 9,022,889 B2 | 5/2015 | Miller | |
| 9,151,269 B2 | 10/2015 | Han | |
| 9,169,772 B2 | 10/2015 | Han | |
| 9,476,401 B2 | 10/2016 | Han | |
| 9,490,736 B2 | 11/2016 | Han | |
| 2005/0119090 A1 | 6/2005 | Miller | |
| 2007/0082779 A1* | 4/2007 | Han | F16H 3/721 475/325 |
| 2007/0142161 A1 | 6/2007 | Miller | |
| 2008/0146403 A1 | 6/2008 | Miller | |
| 2008/0146404 A1 | 6/2008 | Miller | |
| 2008/0161151 A1 | 7/2008 | Miller | |
| 2009/0041564 A1 | 2/2009 | Gray | |
| 2009/0197731 A1* | 8/2009 | Kobler | F16H 29/04 475/166 |
| 2010/0237626 A1 | 9/2010 | Hamner | |
| 2011/0057442 A1* | 3/2011 | Chauvin | F03B 17/063 290/43 |
| 2012/0115562 A1 | 5/2012 | Han | |
| 2012/0211990 A1 | 8/2012 | Davey et al. | |
| 2012/0243991 A1* | 9/2012 | Han | H02P 9/04 416/9 |
| 2012/0299301 A1* | 11/2012 | Han | F03B 3/18 290/52 |
| 2012/0302388 A1* | 11/2012 | Scekic | F16H 37/0813 475/31 |
| 2013/0106258 A1 | 5/2013 | Miler | |
| 2013/0239556 A1 | 9/2013 | Kim et al. | |
| 2014/0038771 A1 | 2/2014 | Miler | |
| 2014/0042941 A1 | 2/2014 | Pricop | |
| 2014/0271216 A1* | 9/2014 | Syrovy | F03B 17/061 416/224 |
| 2014/0378260 A1* | 12/2014 | Dewar | F16H 1/2818 475/149 |
| 2015/0233473 A1 | 8/2015 | Miller | |
| 2015/0357951 A1 | 12/2015 | Han | |
| 2016/0010620 A1 | 10/2016 | Han | |

\* cited by examiner

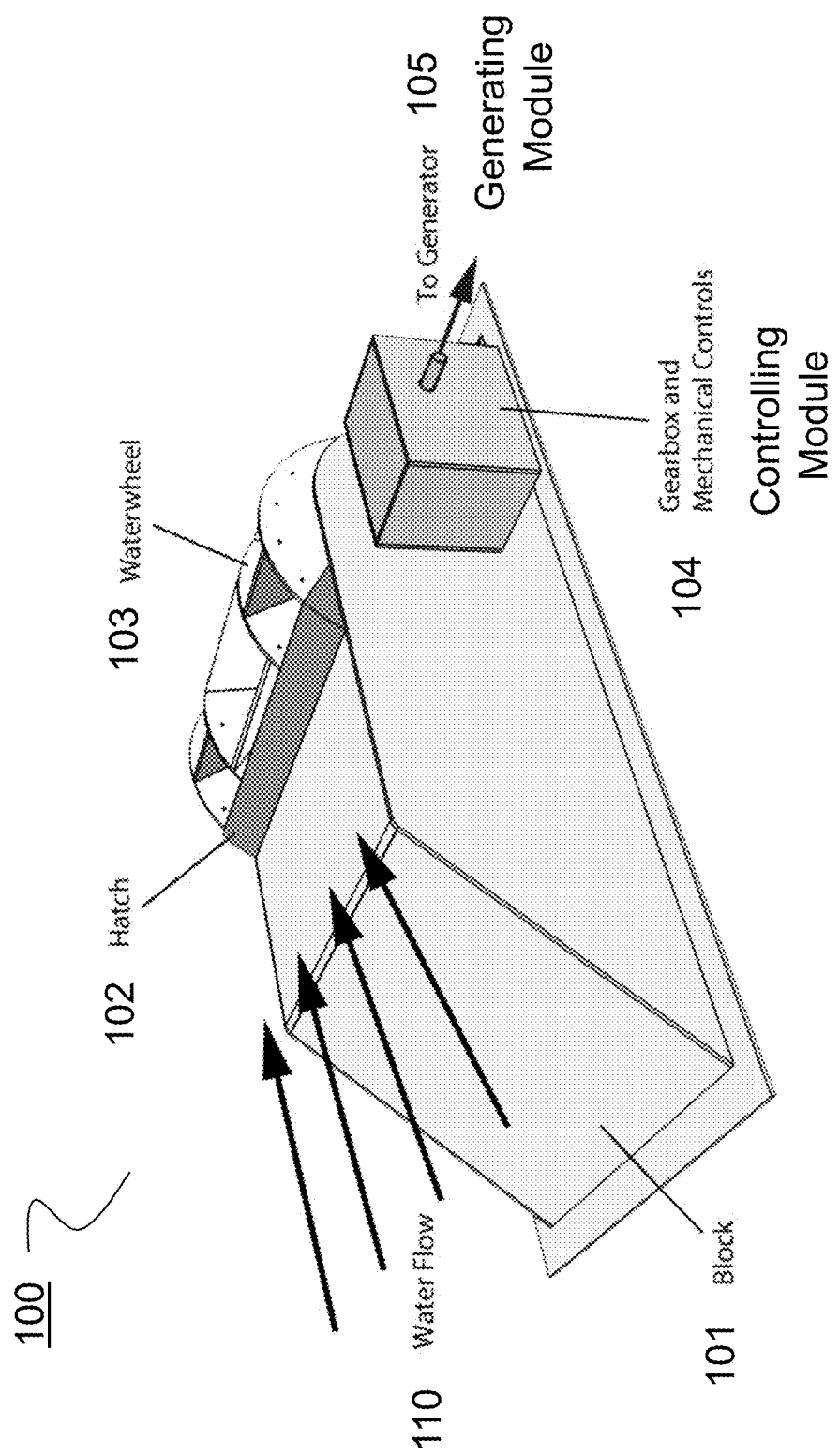
Figure 1. Perspective View of a Harnessing Module for an MHK Turbine

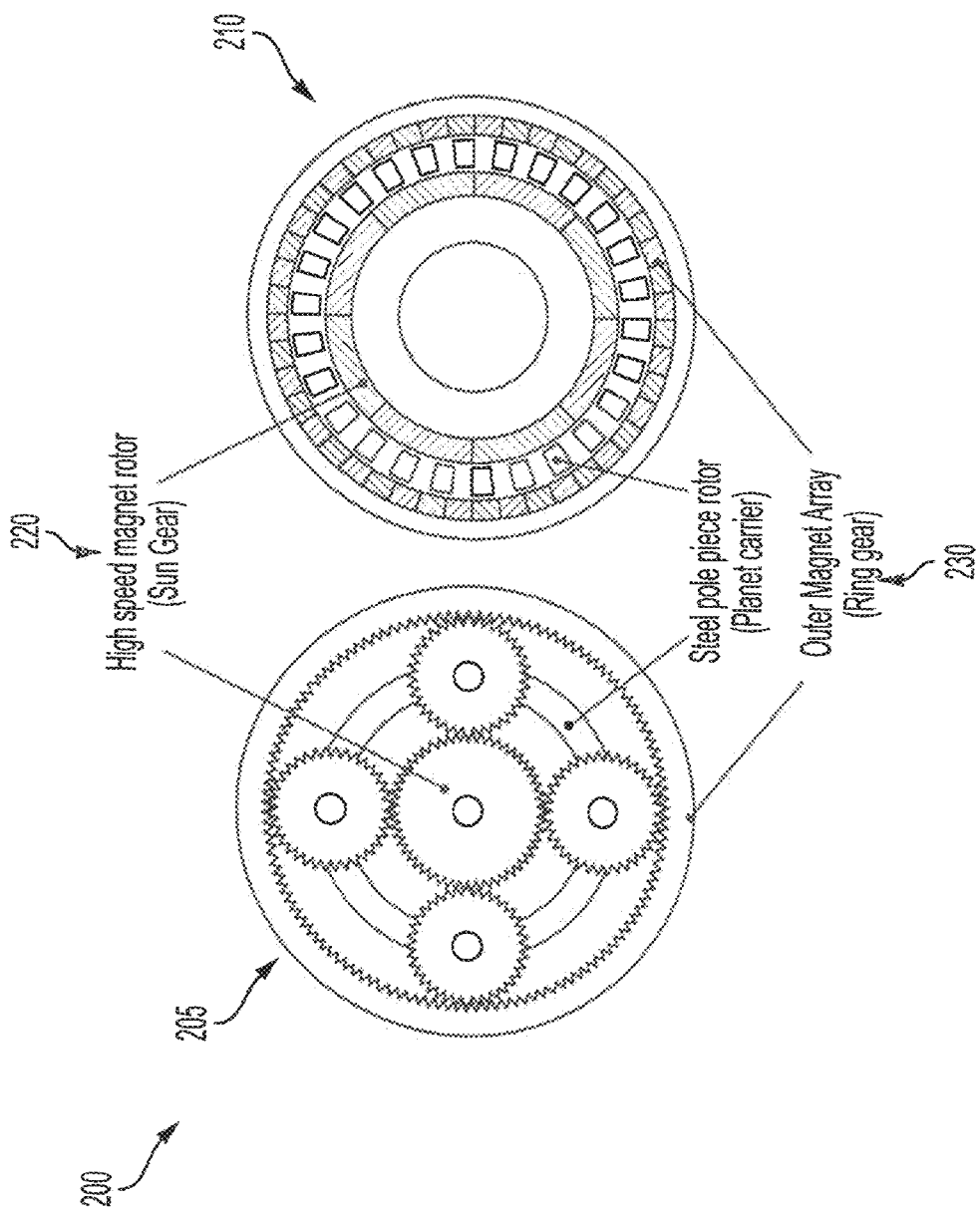
Figure 2A. Mechanical Gear Assembly
Figure 2B. Magnetic Gear Assembly

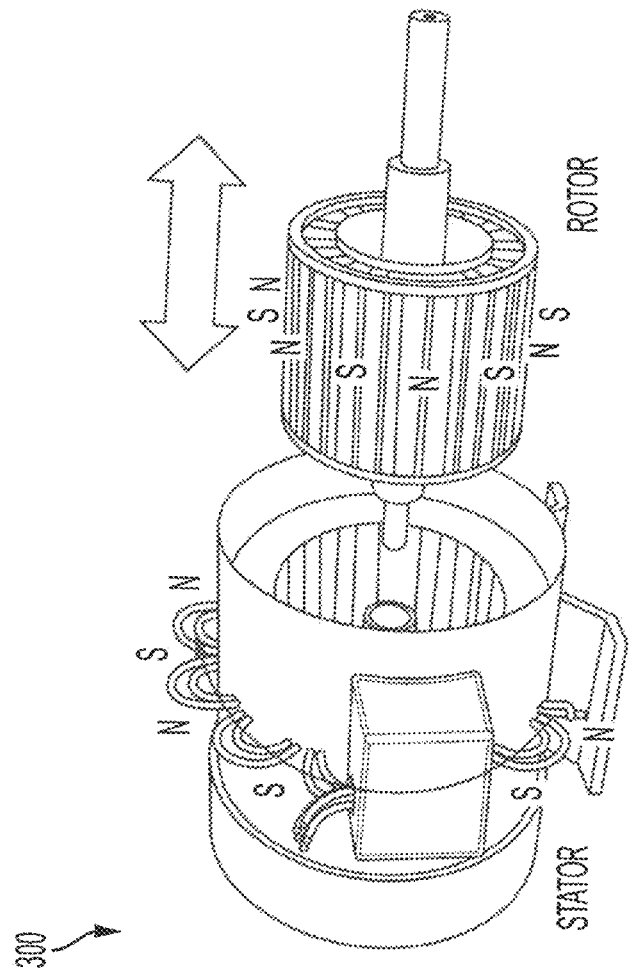
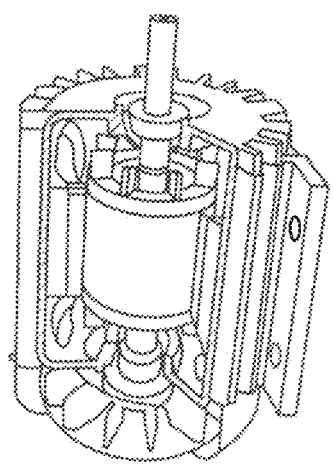
Figure 3A.
Fixed Overlap Generator
Figure 3B.
Variable Overlap Generator

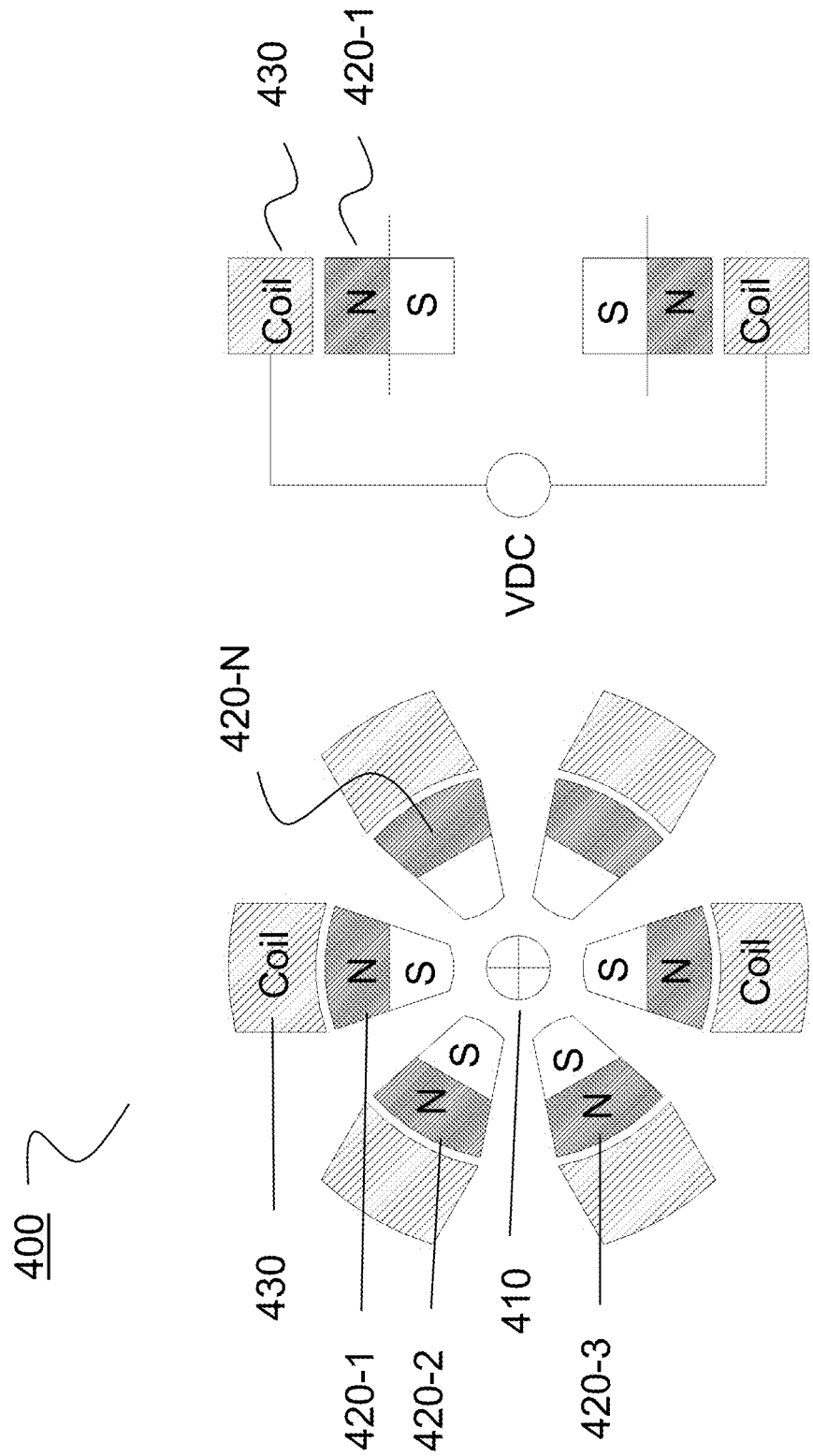
Figure 4A. Top View of DC Generator
Figure 4B. Side View of DC Generator

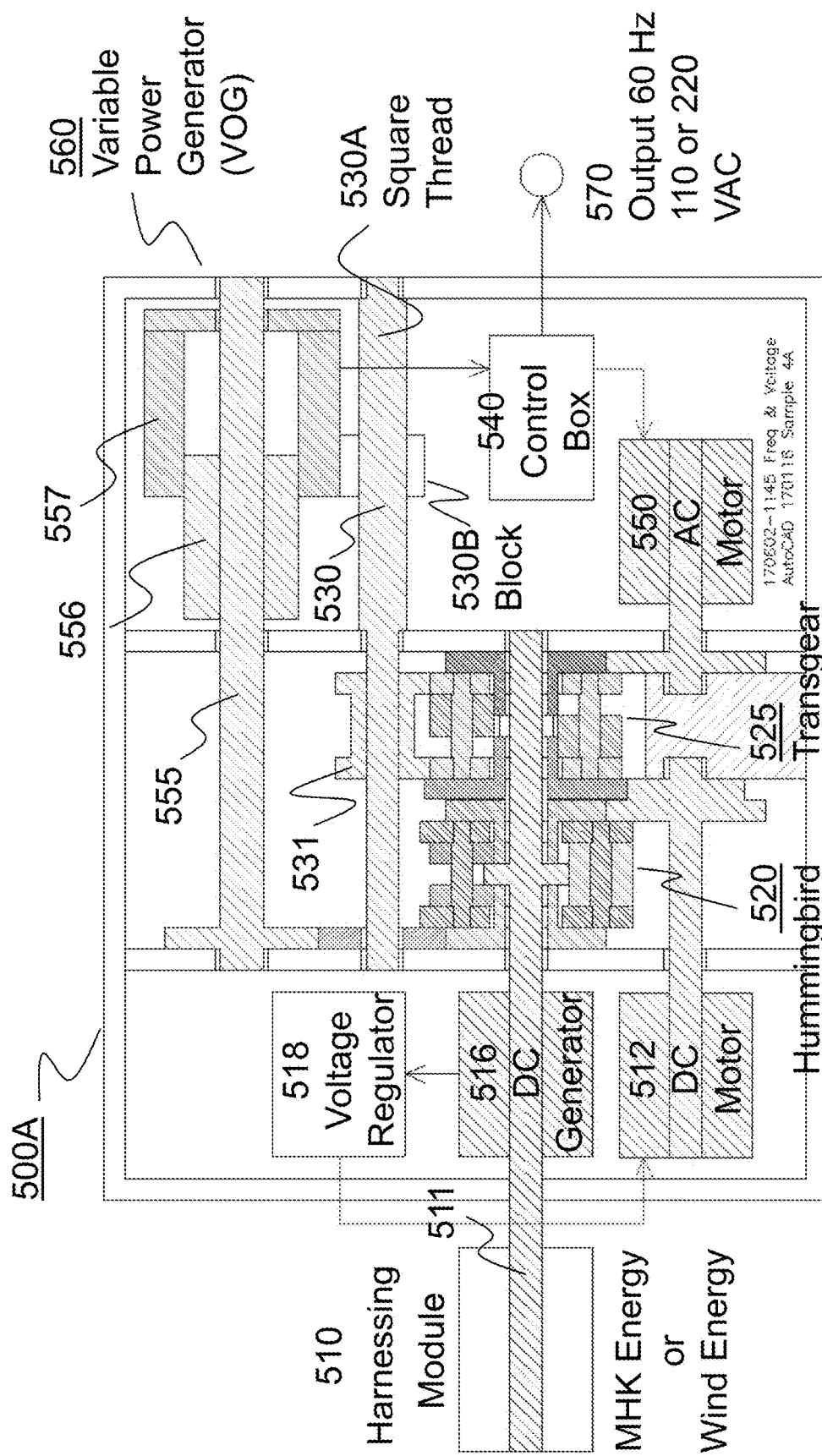
Figure 5A. "Demand Generation" or Variable Generation (without Grid)

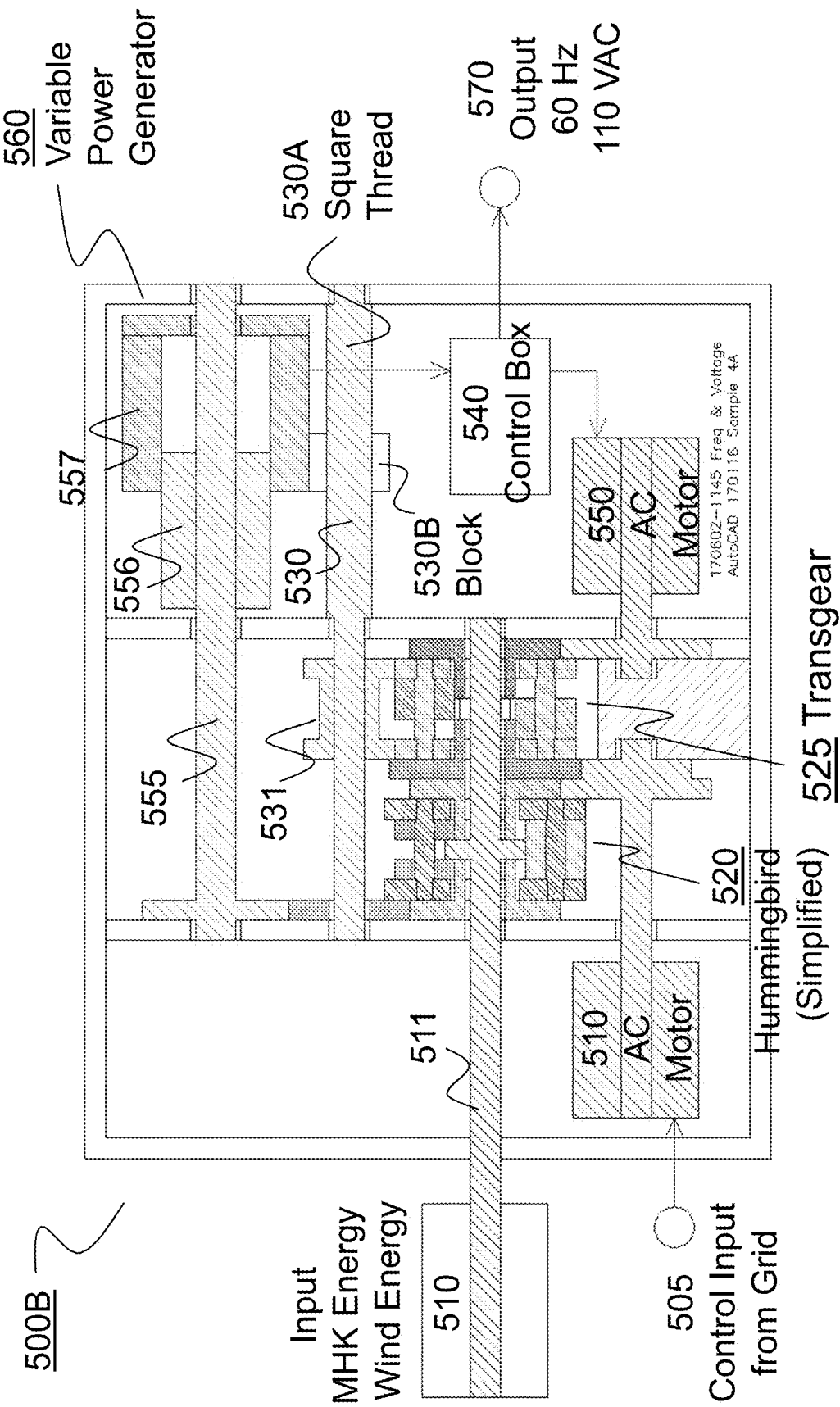
Figure 5B. "Demand Generation" or Variable Generation with Grid

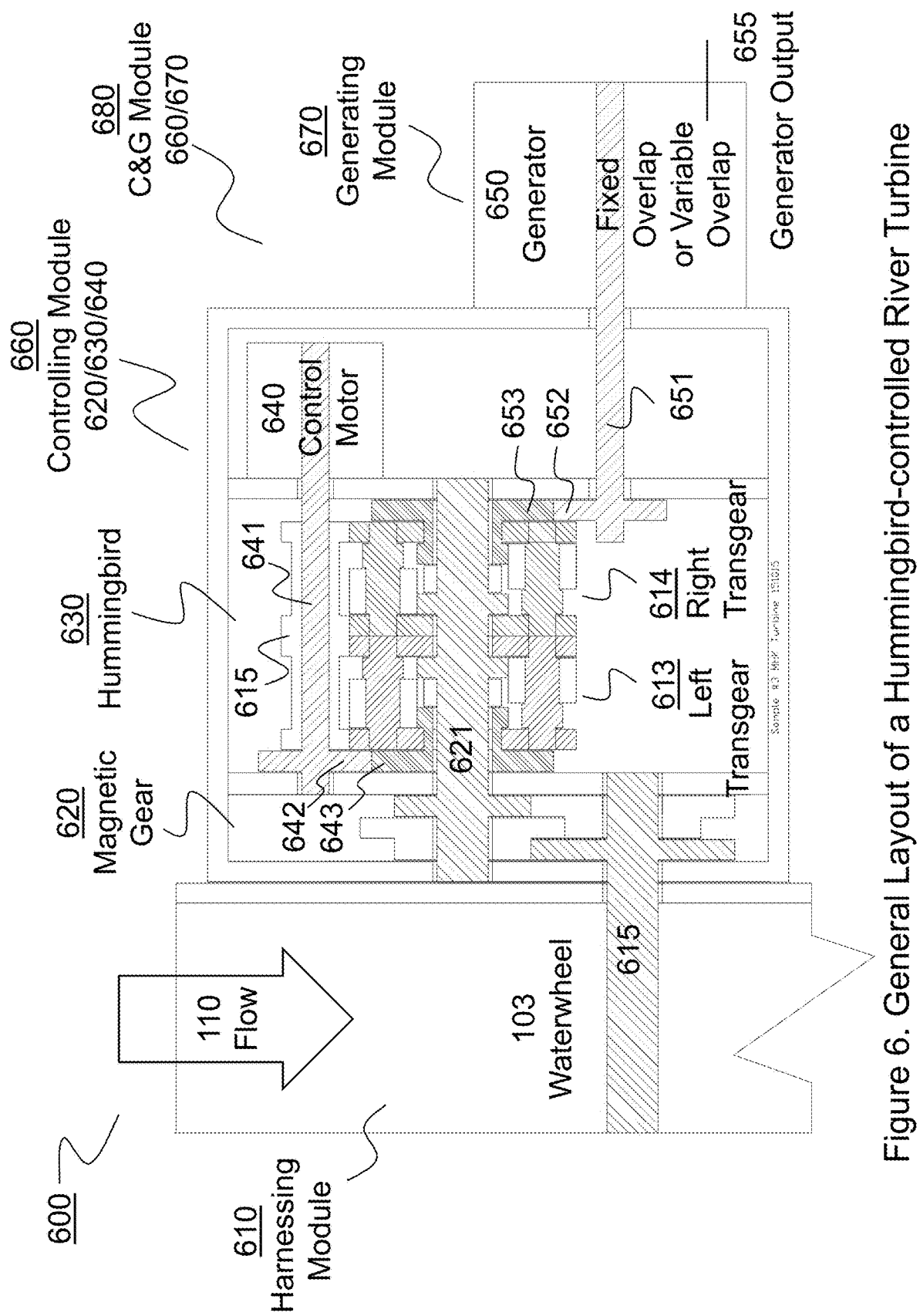
Figure 6. General Layout of a Hummingbird-controlled River Turbine

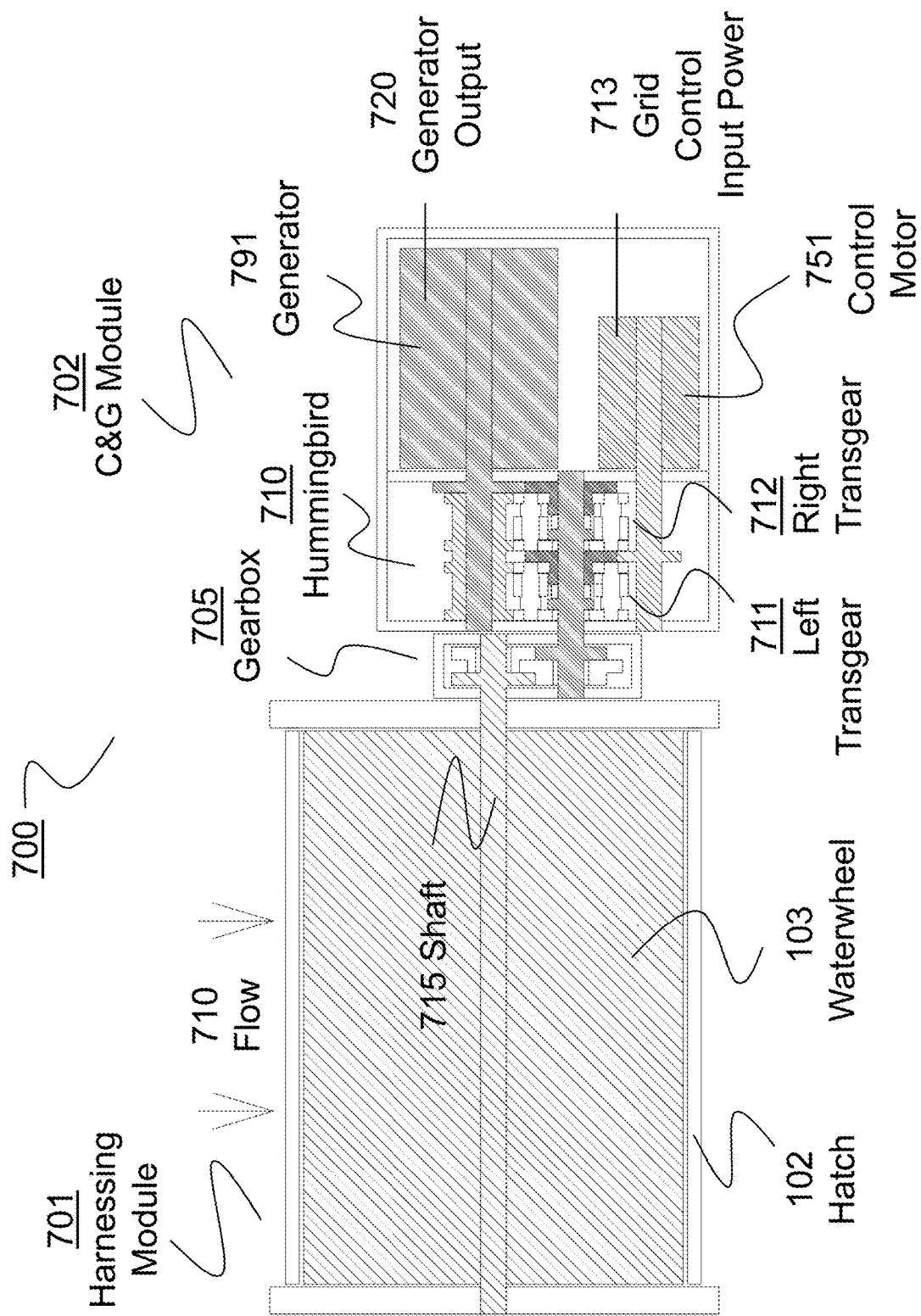
Figure 7. Layout of Sample #3 River Turbine

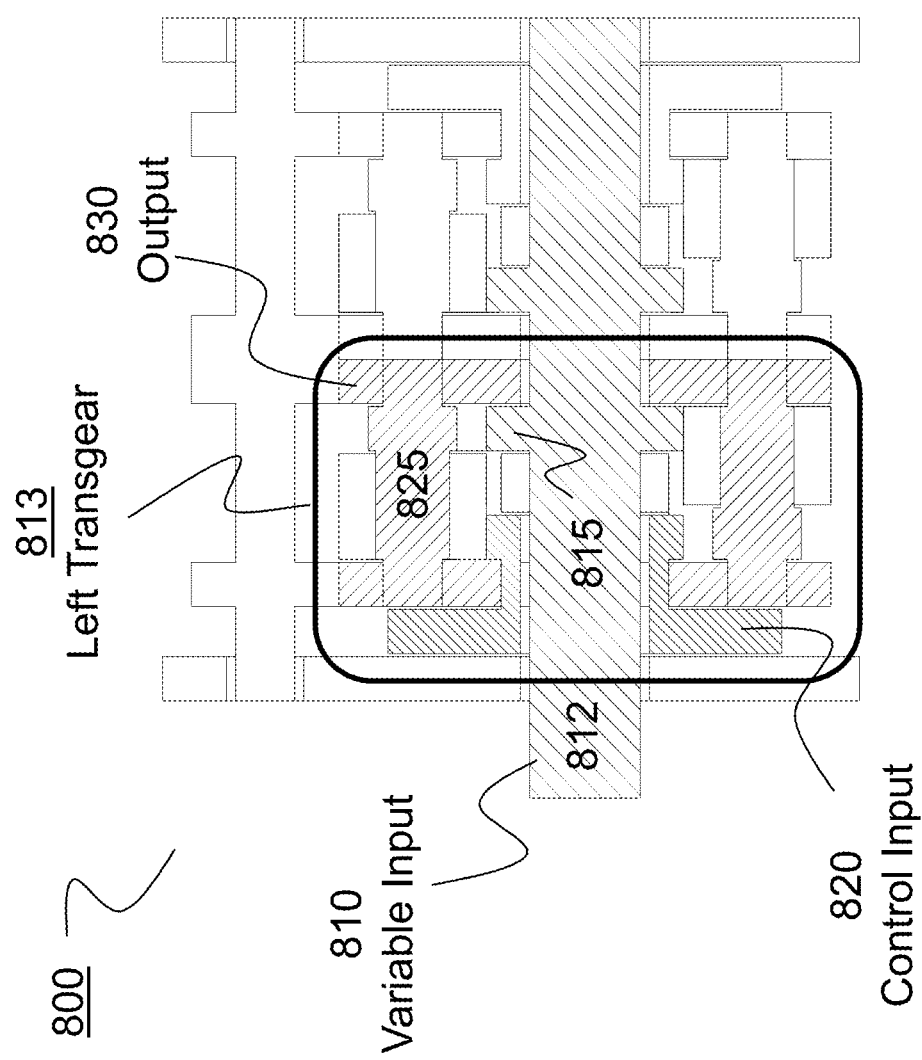
Figure 8A. Left Transgear of Hummingbird

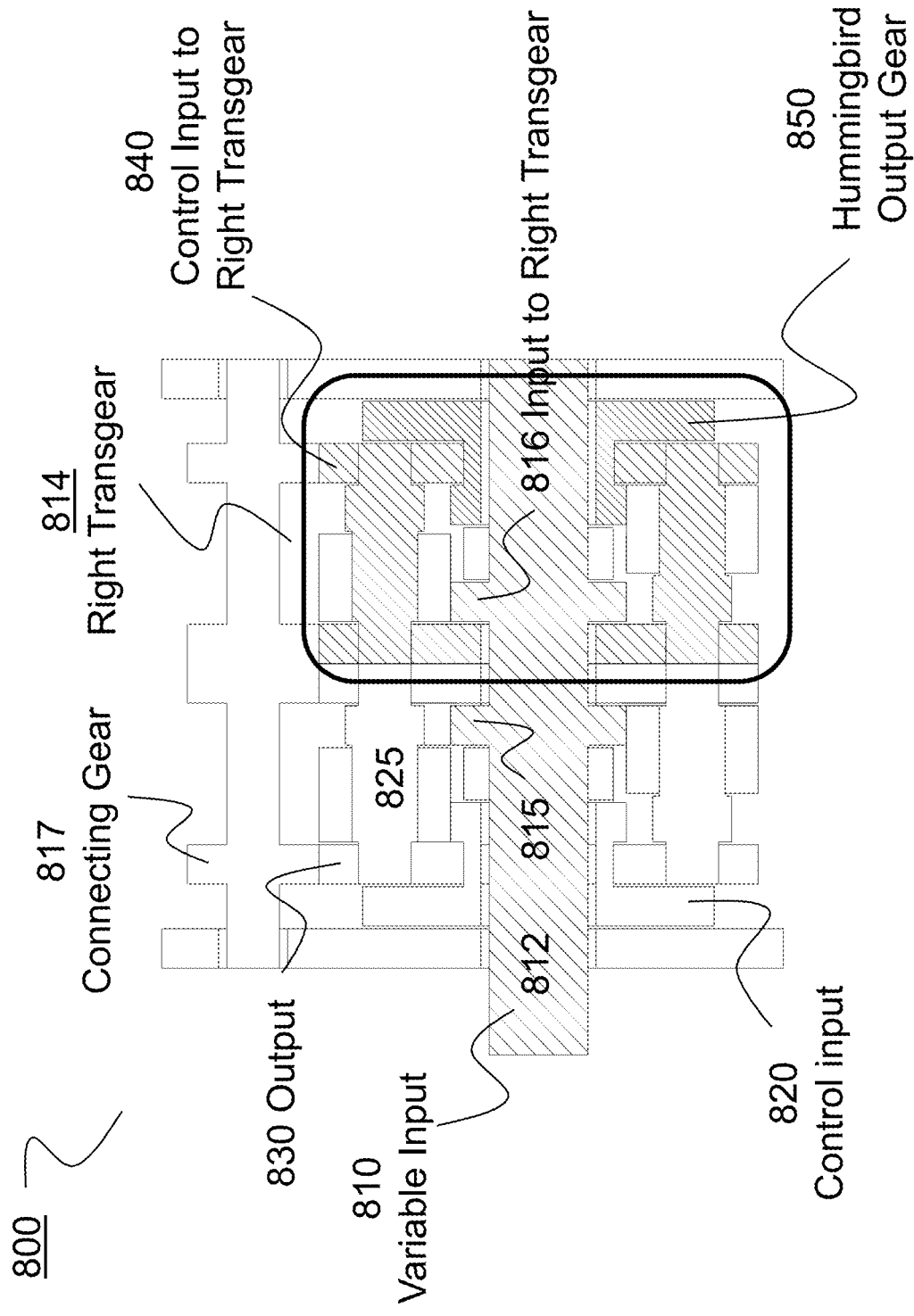
Figure 8B. Right Transgear of Hummingbird

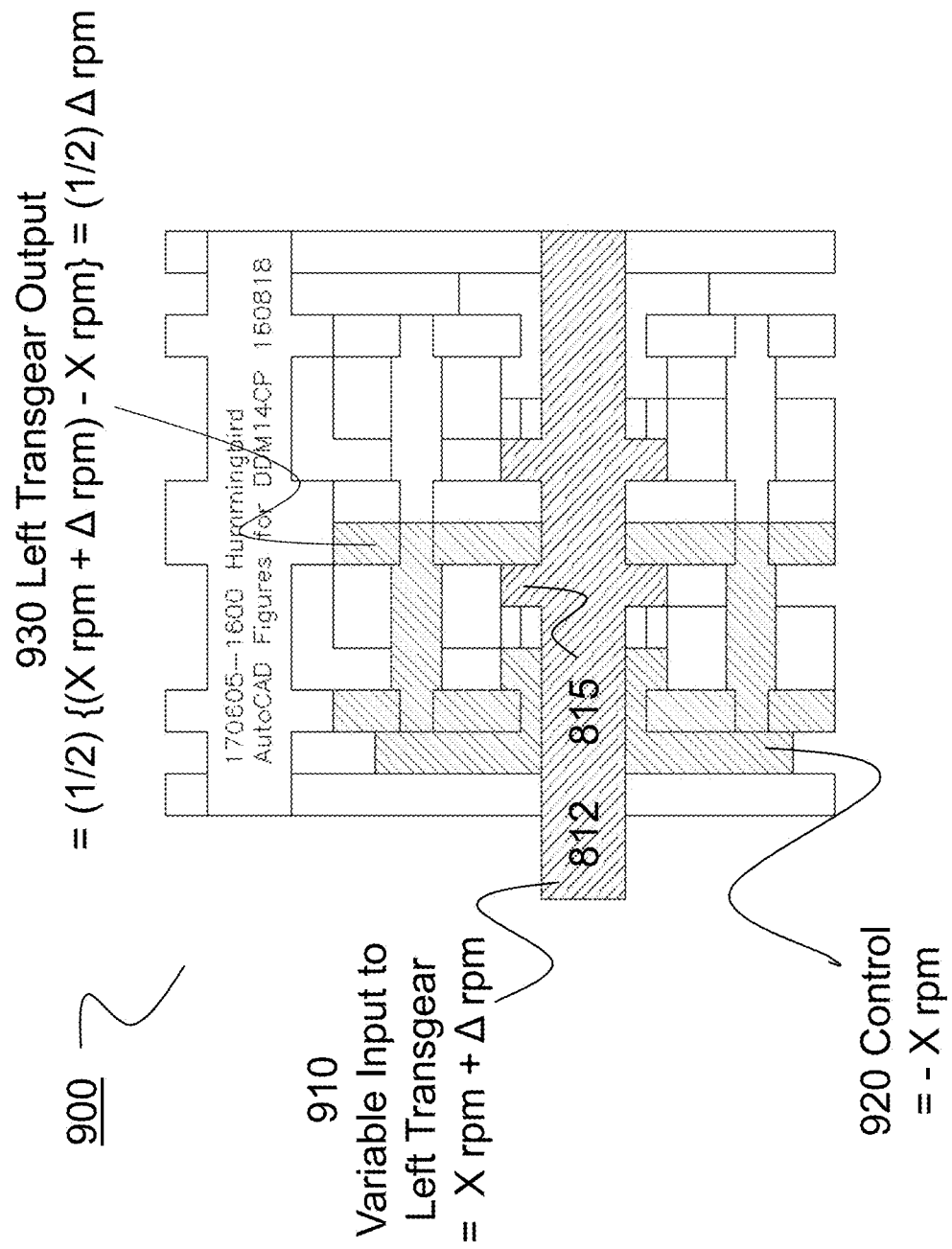
Figure 9A. Left half of Hummingbird

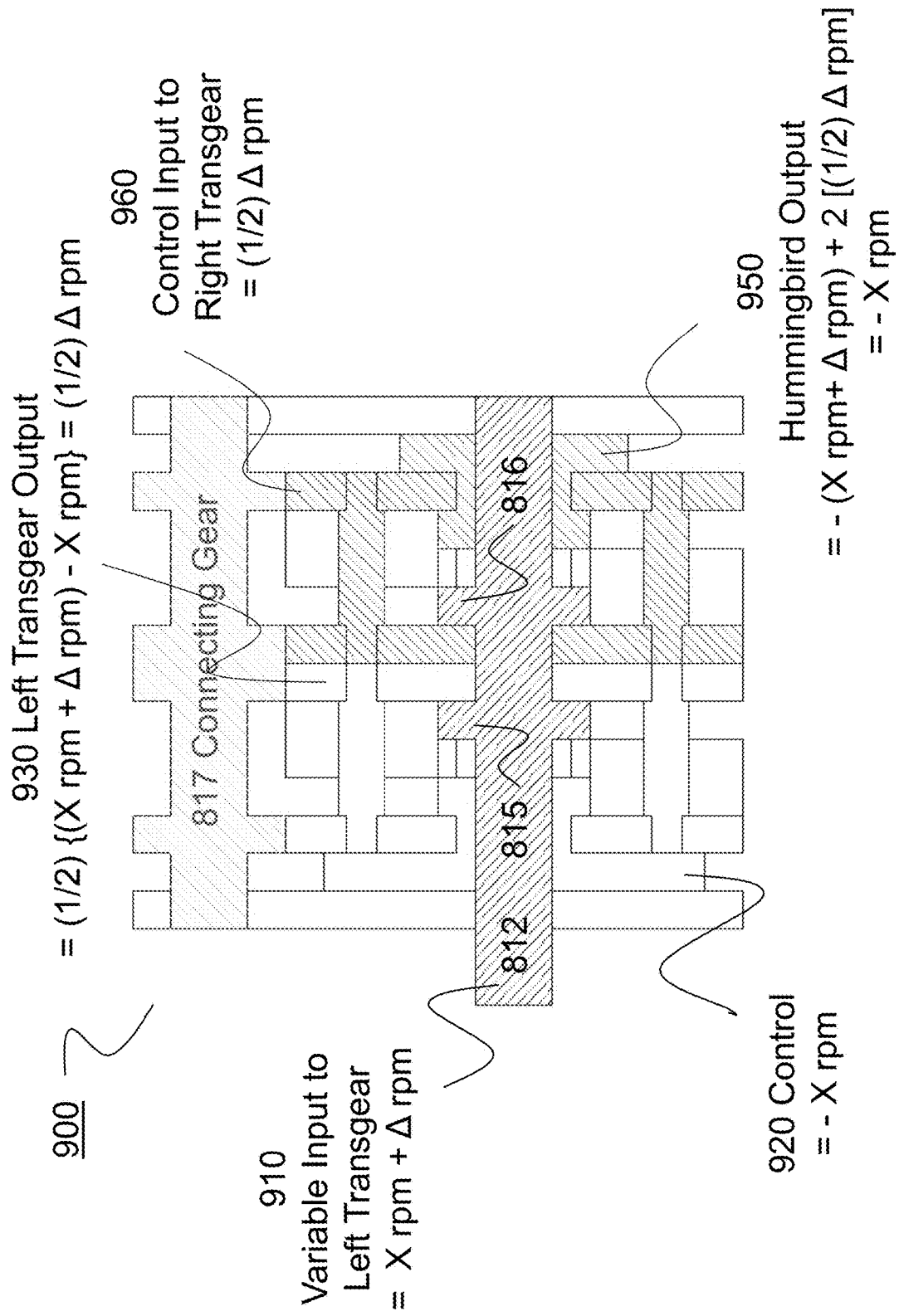
Figure 9B. Right half of Hummingbird

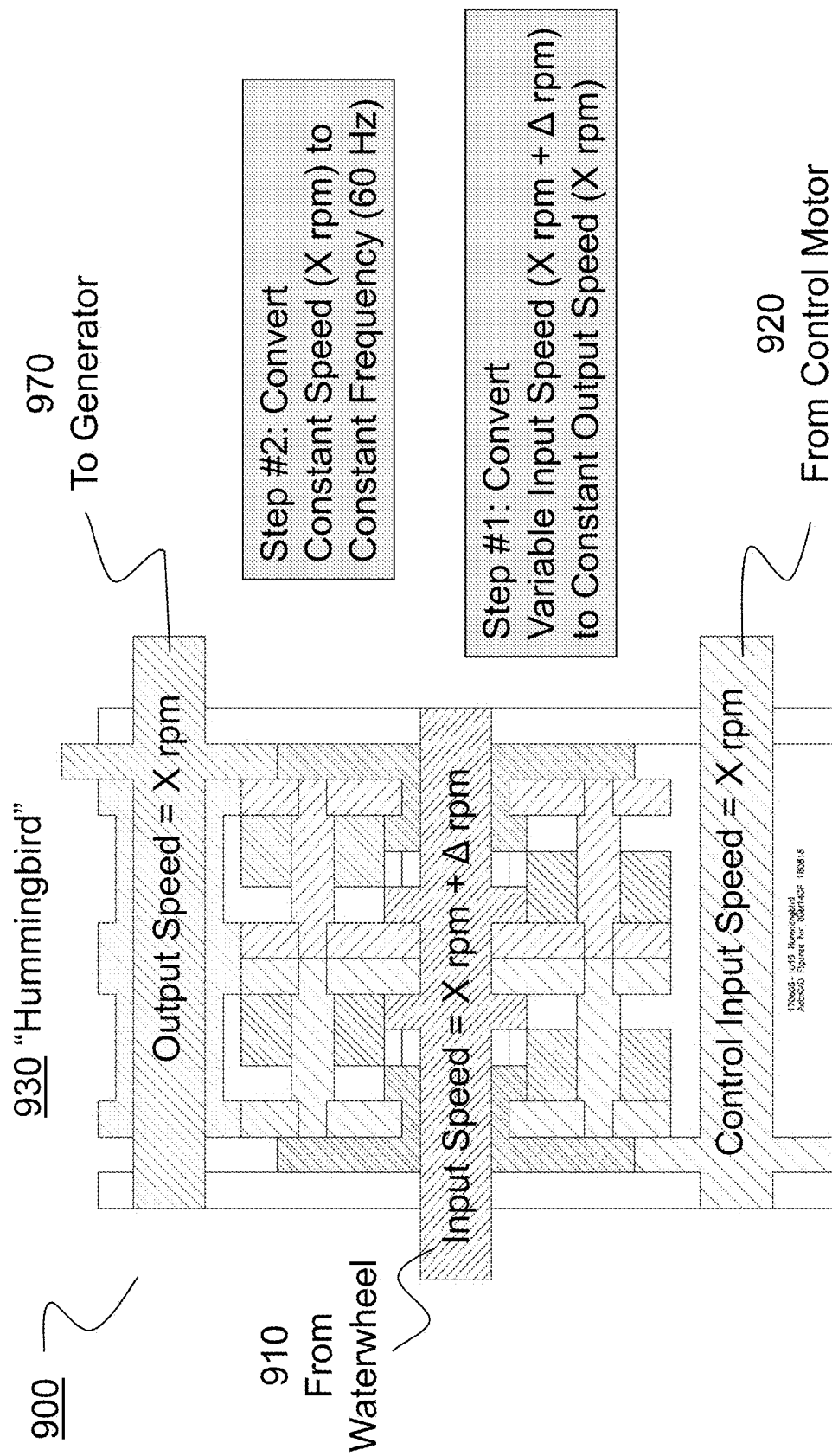
Figure 9C. Hummingbird with Two Step Conversions

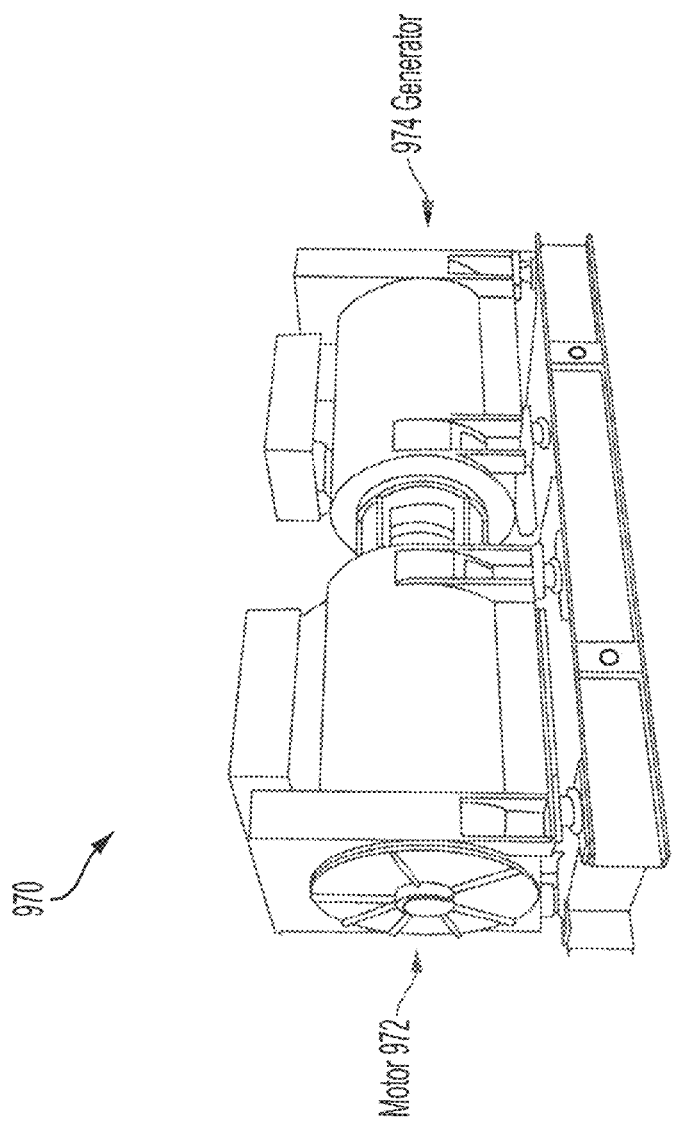
Figure 9D. Rotary Frequency Converter

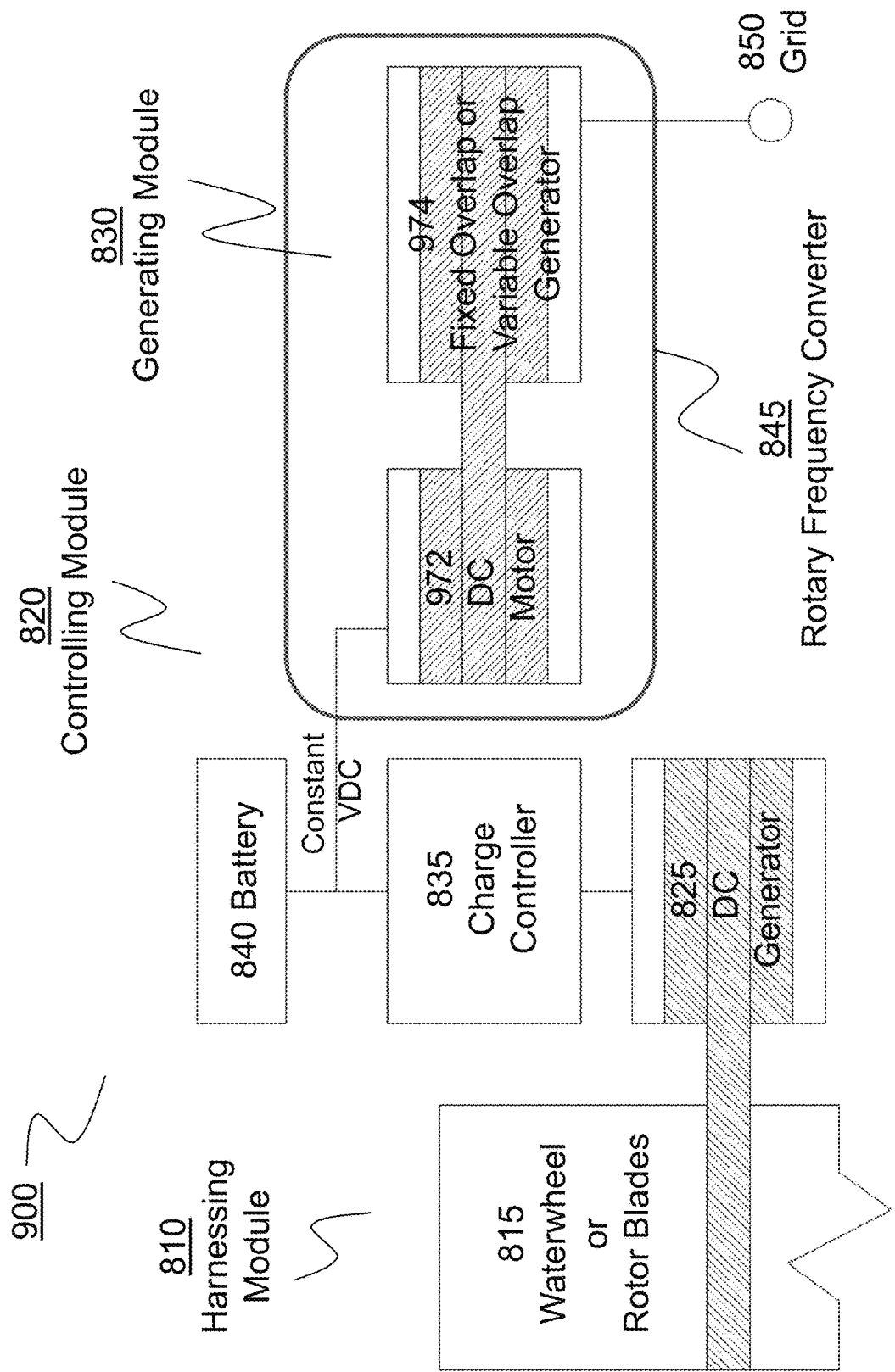
Figure 9E. Schematic Diagram of a Basic River Turbine without grid

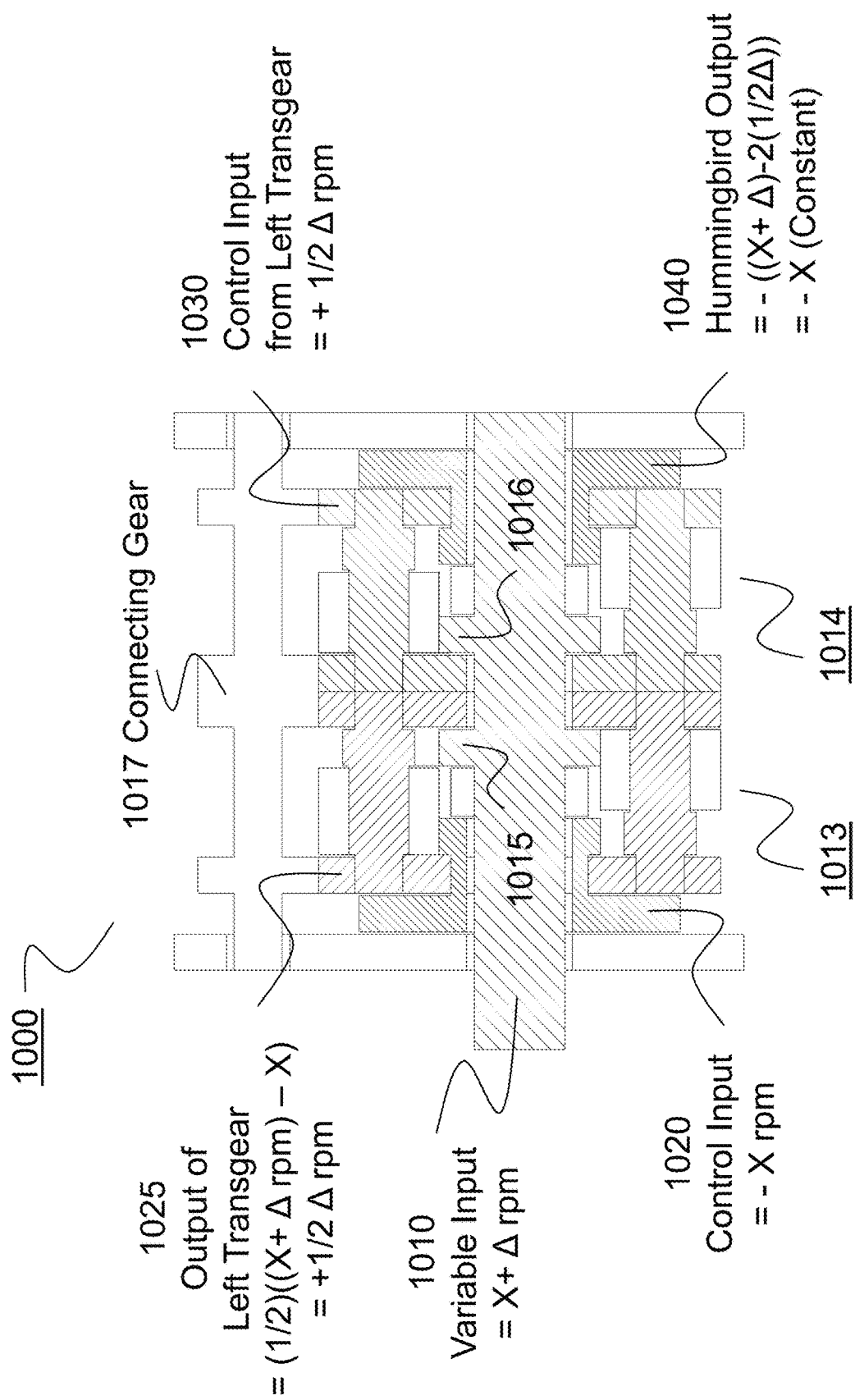
Figure 10. Hummingbird: Input, Control, and Output (Transgear Rule applied)

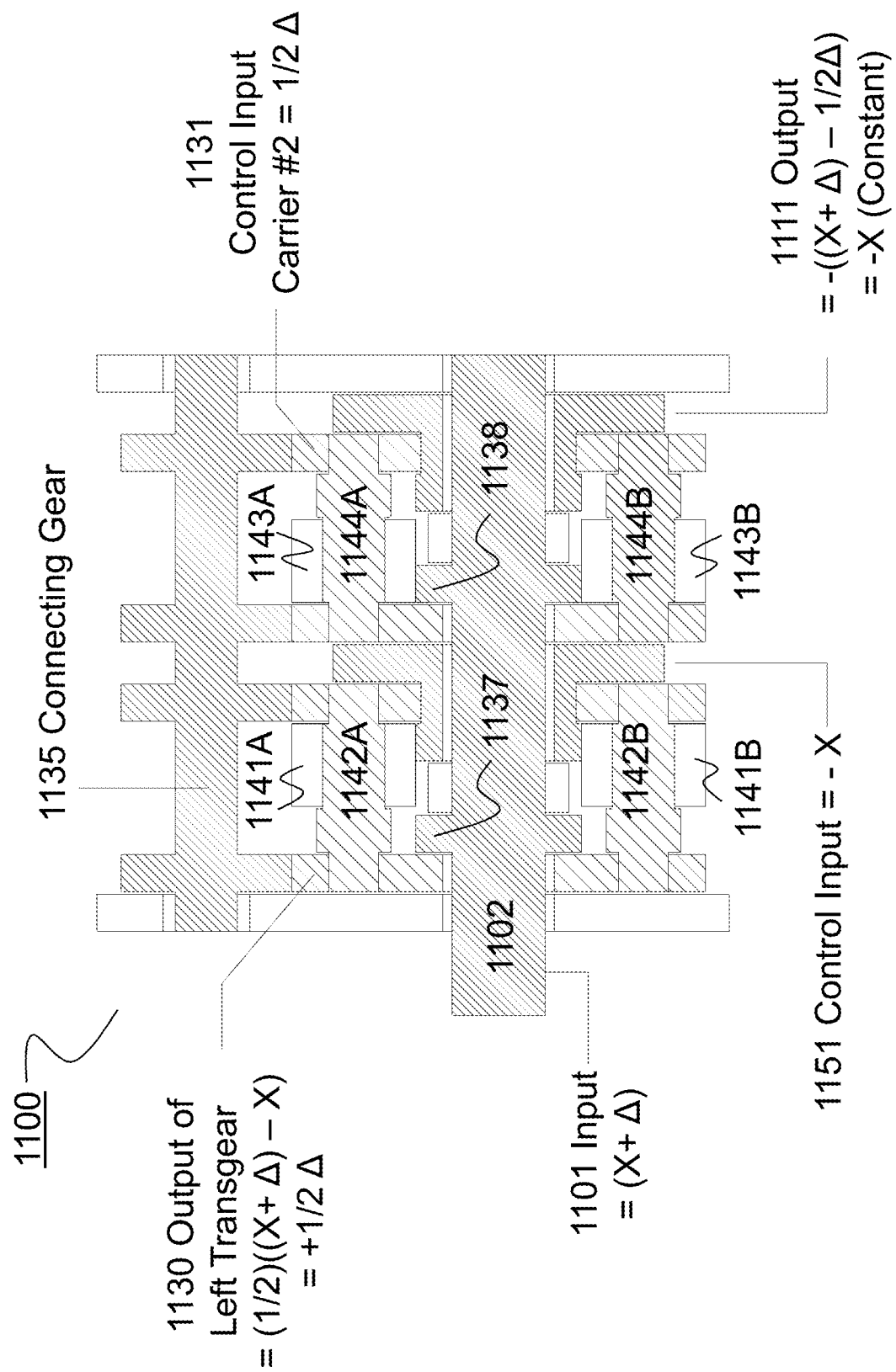
Figure 11. Two Transgear Control "Hummingbird" (Second Embodiment)

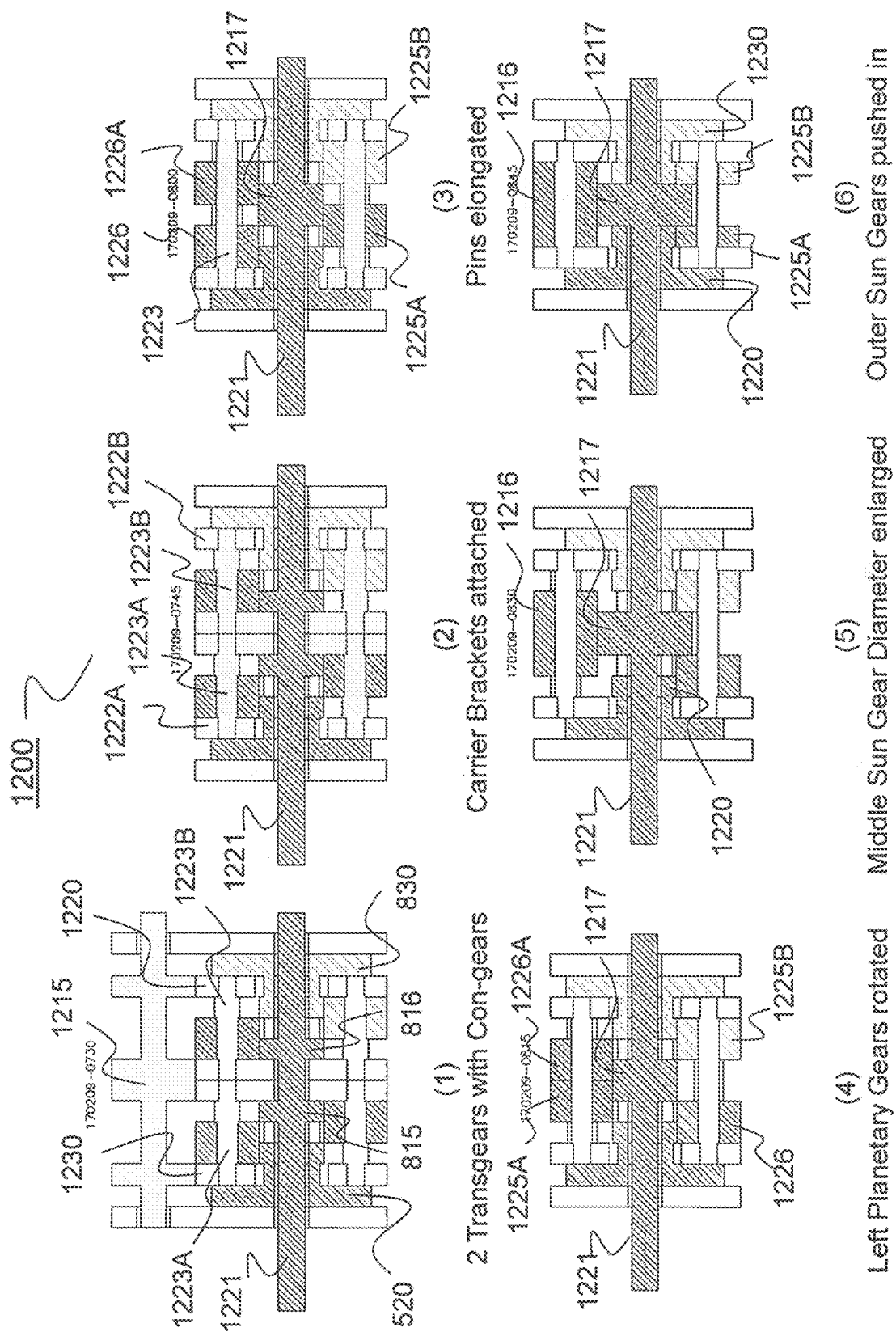
Figure 12A. Simplifying Hummingbird

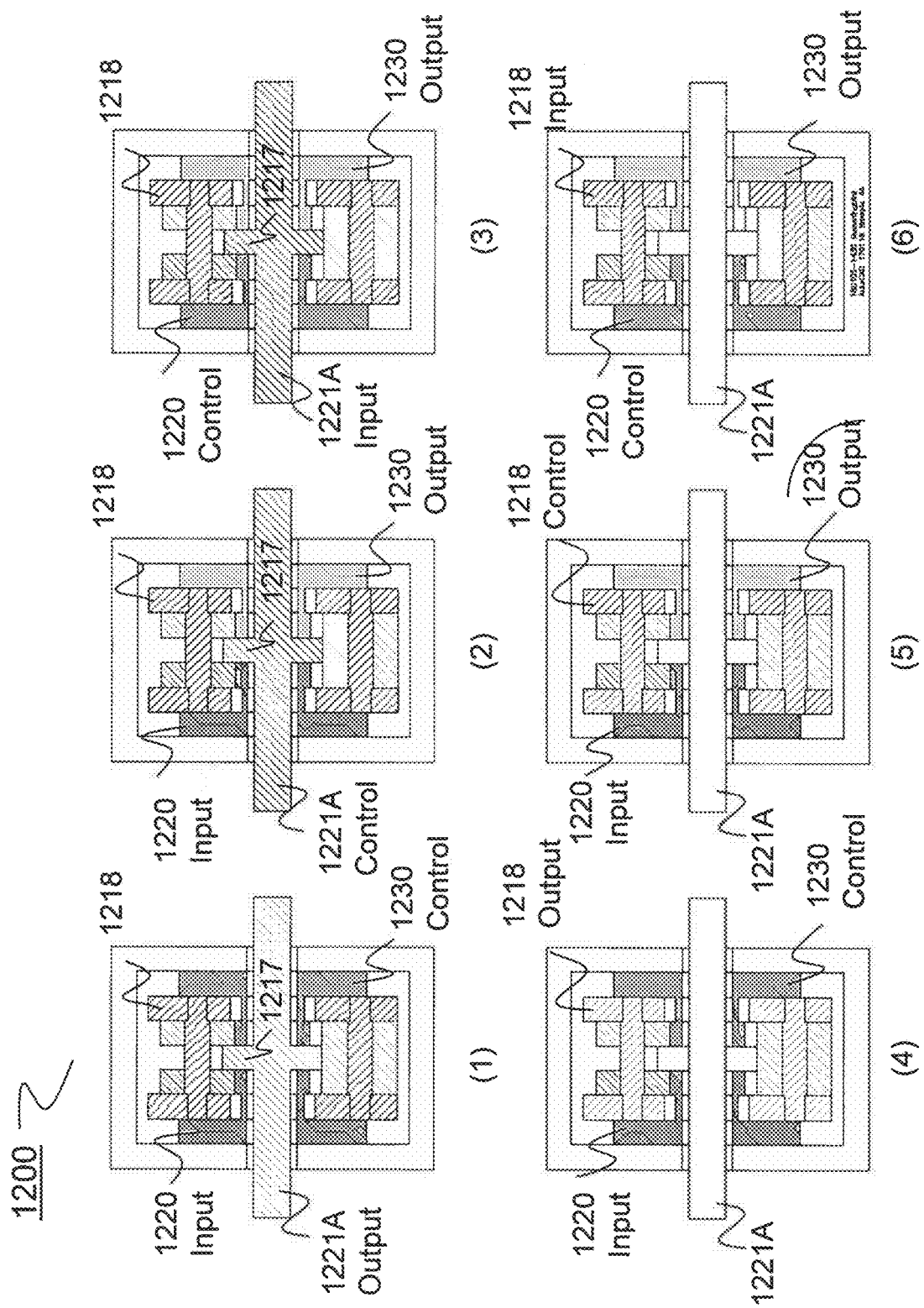
Figure 12B. Function Assignment to Simplified Hummingbird

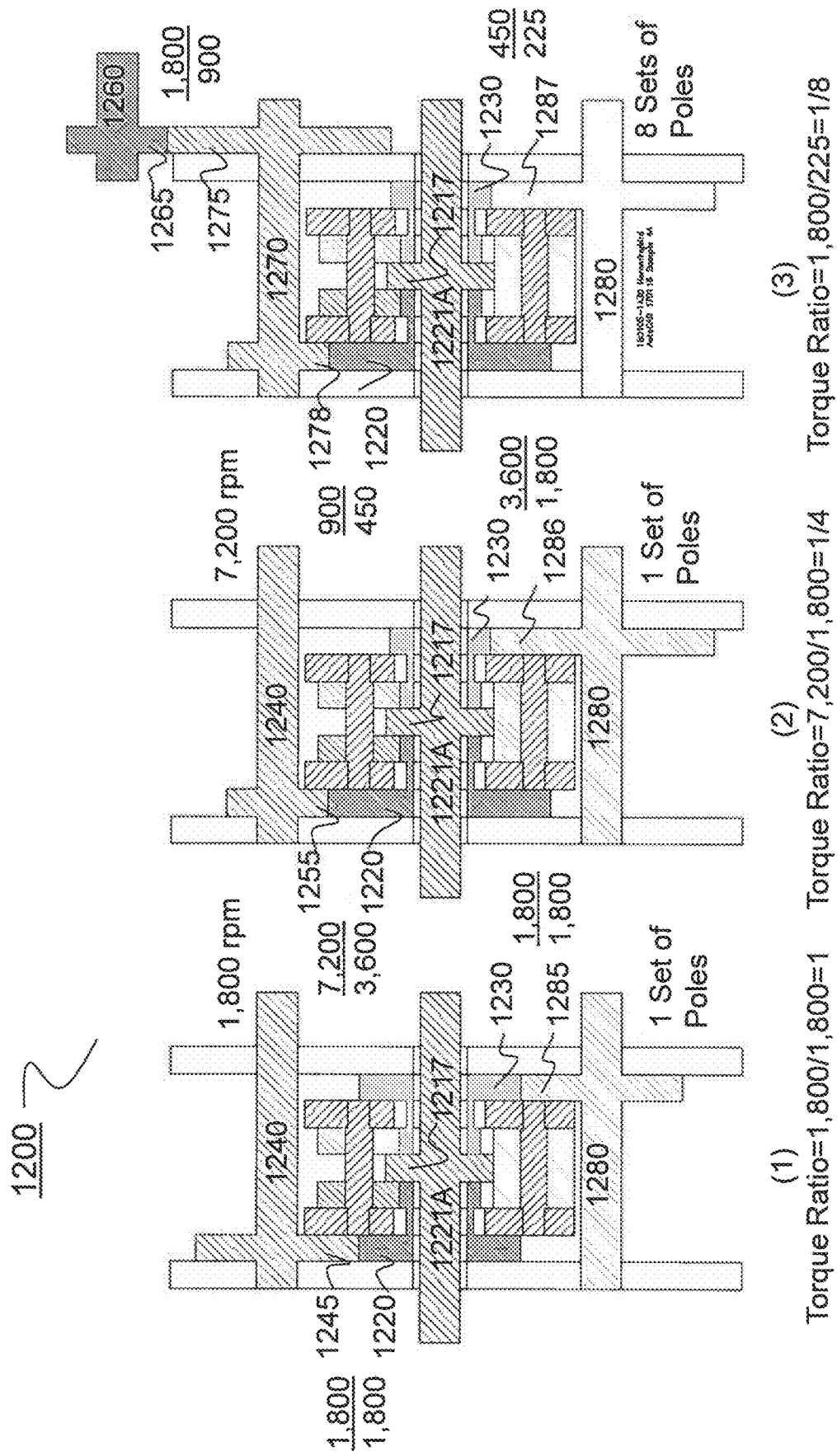
Figure 12C. Speed and Torque Adjustment by Gear Ratio, Control Motor Speed, and Set Number of Generator Poles

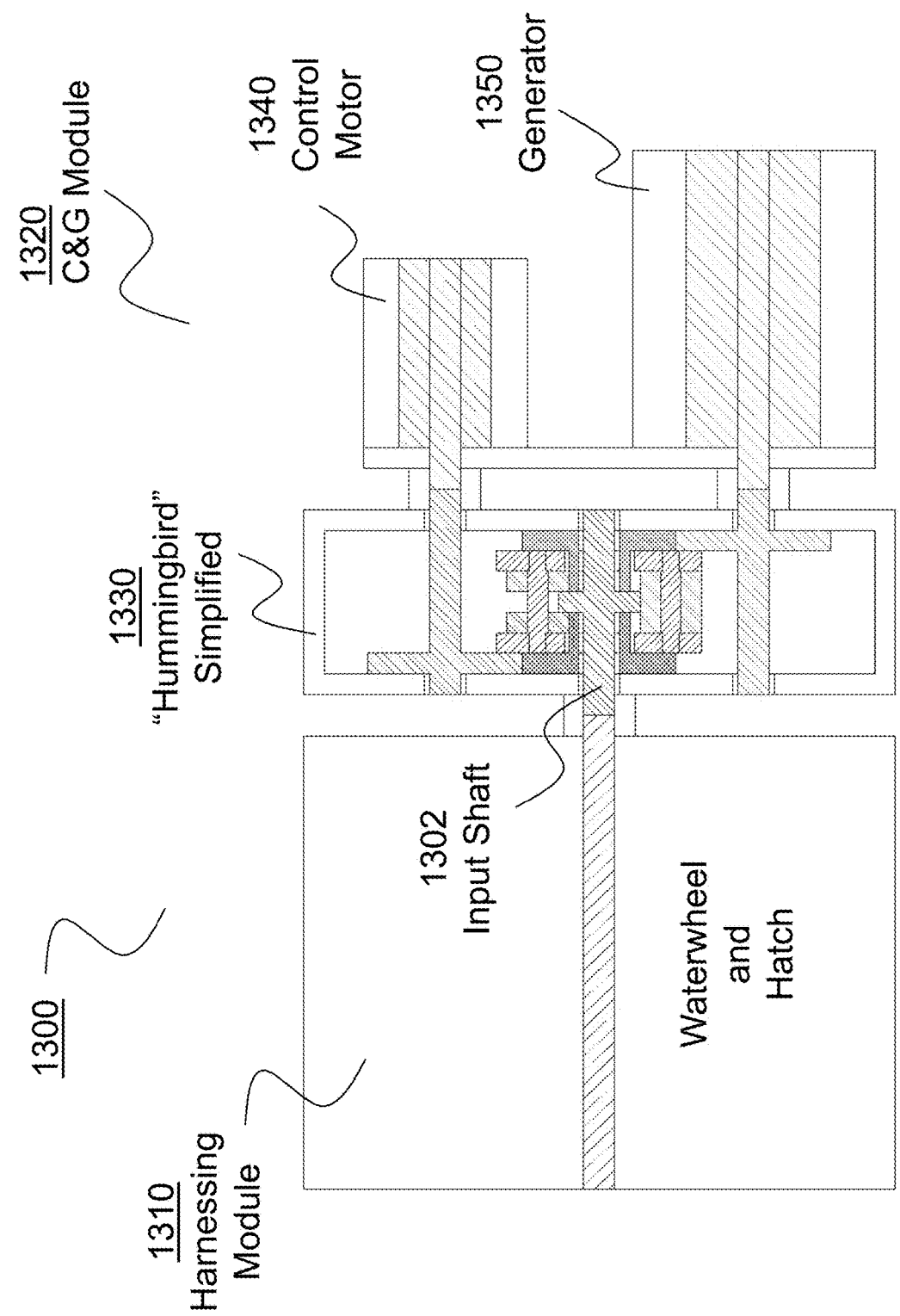
Figure 13. Layout of Sample #3

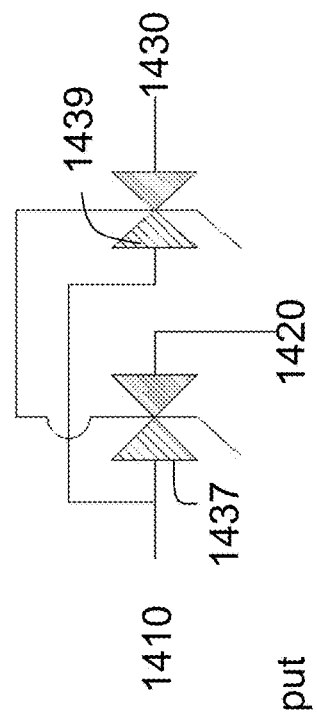
Figure 14A(1): Schematic
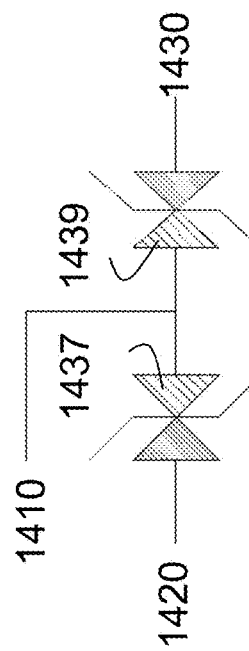
Figure 14B(1): Schematic
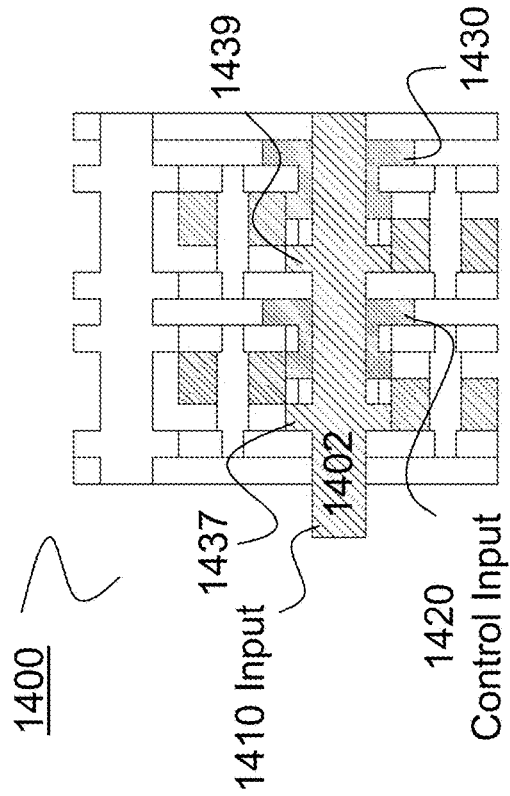
Figure 14A: Layout
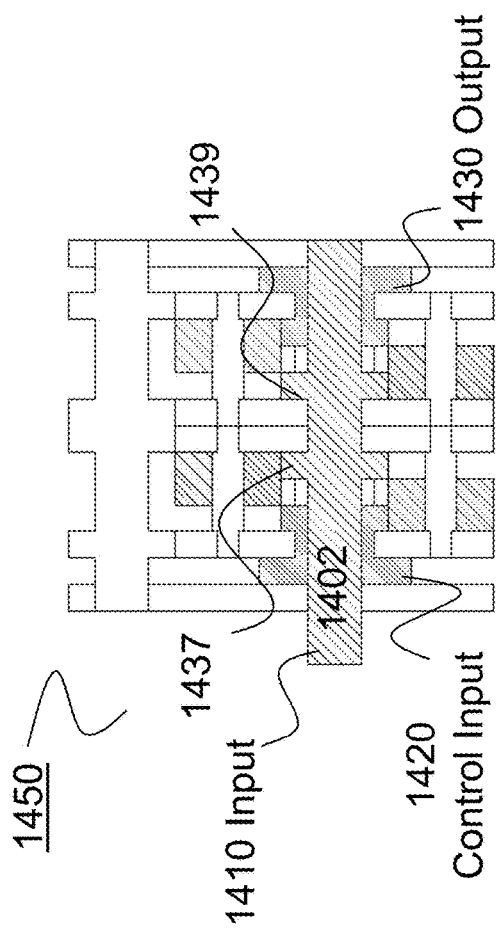
Figure 14B Layout

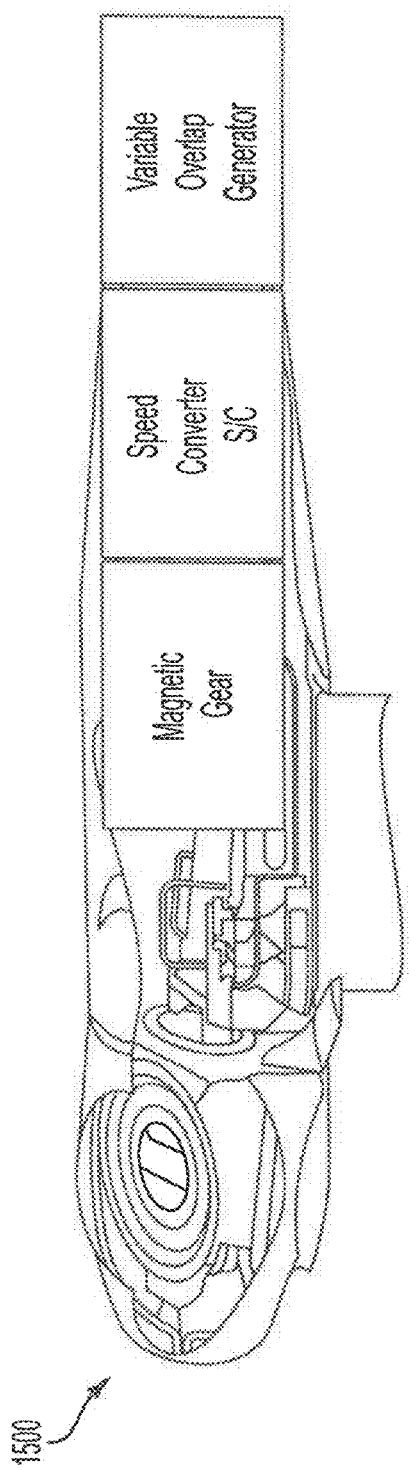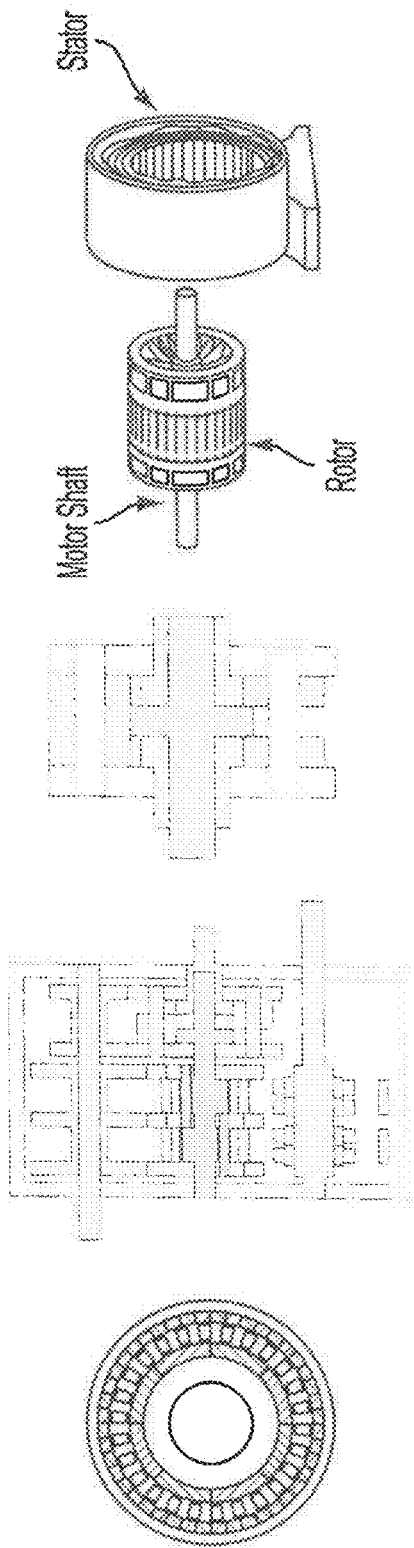
Figure 15A Cut-away View of a Wind Turbine
Figure 15B Magnetic Gear
Figure 15C(1) S/C Goldfinch
Figure 15C(2) S/C Hummingbird
Figure 15D VO Generator

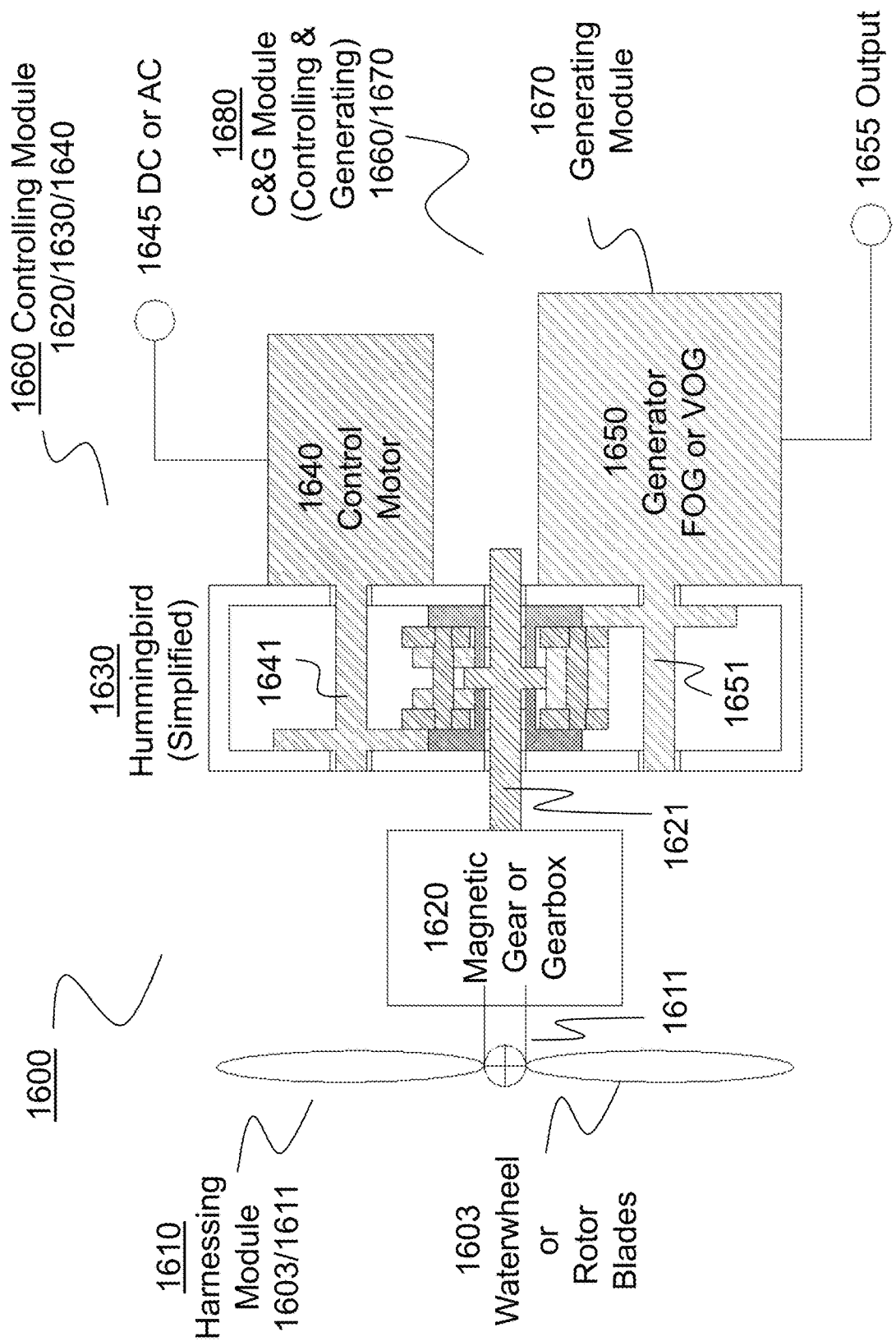
Figure 16. River or Wind Turbine with a simplified Hummingbird.

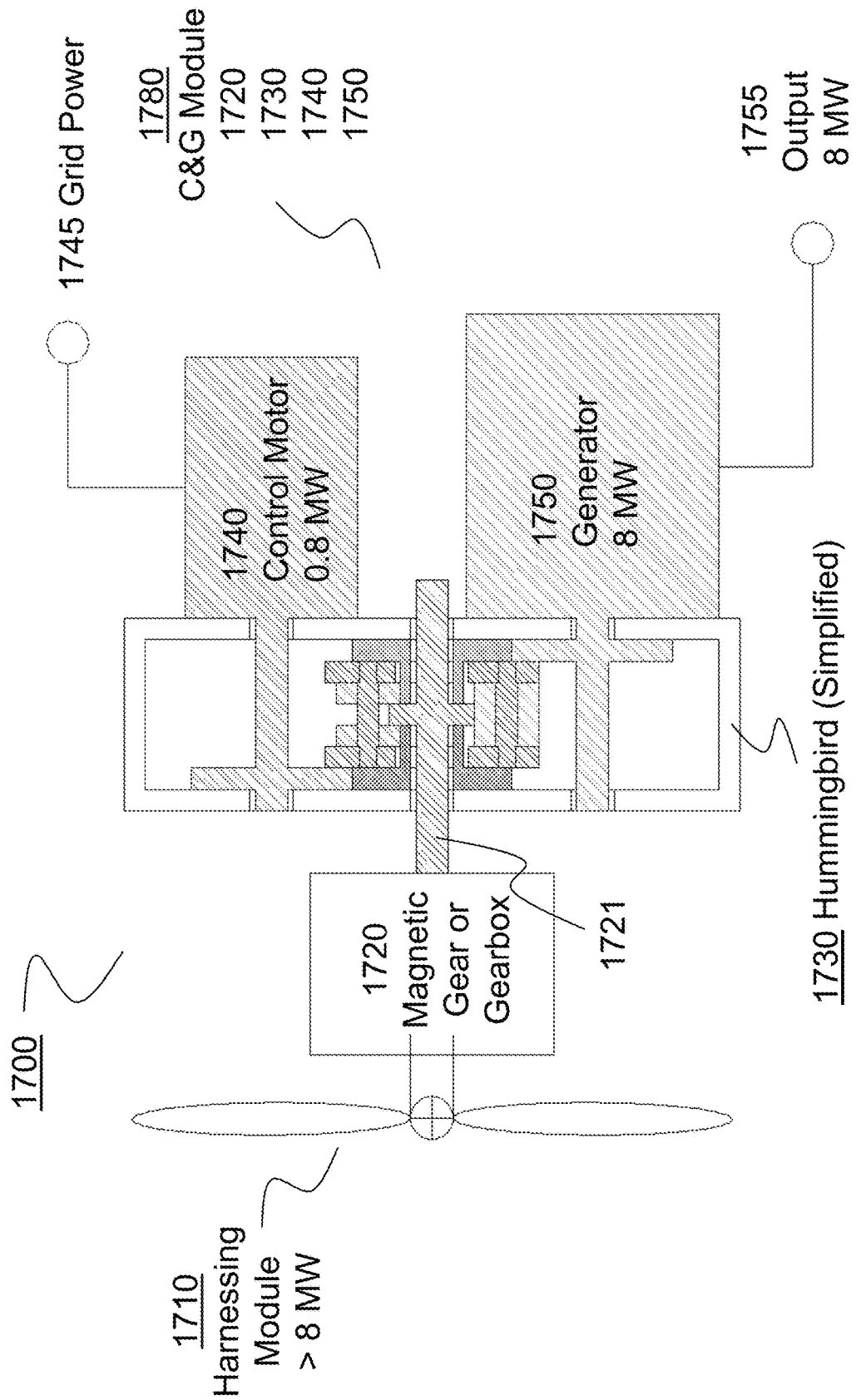
Figure 17. Power Amplification. For Example, 0.8 MW Control Motor can generate 8 MW Output when Harnessing Module can harness 8 MW.

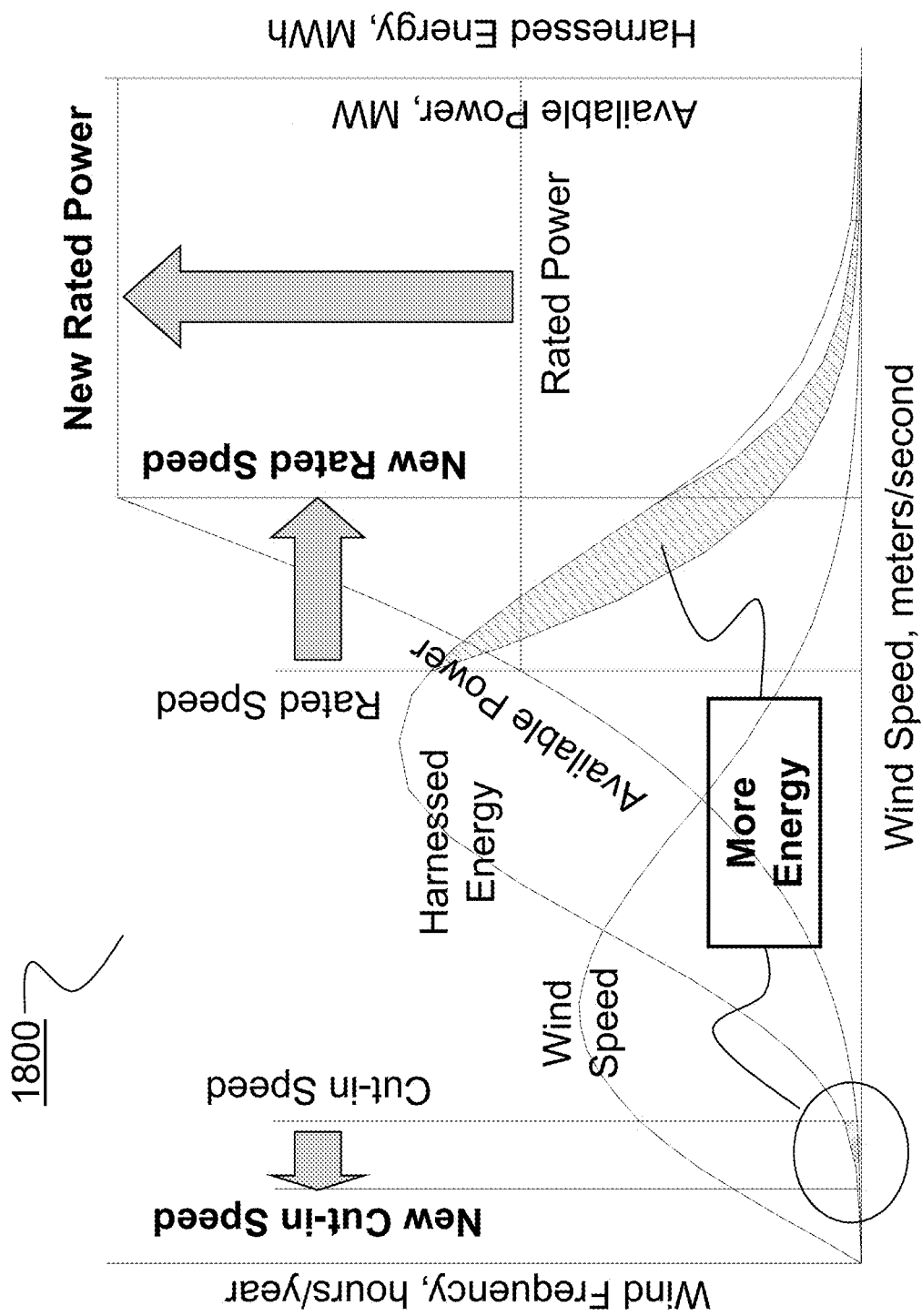
Figure 18. Harnessing More Energy with Variable Overlap Generator

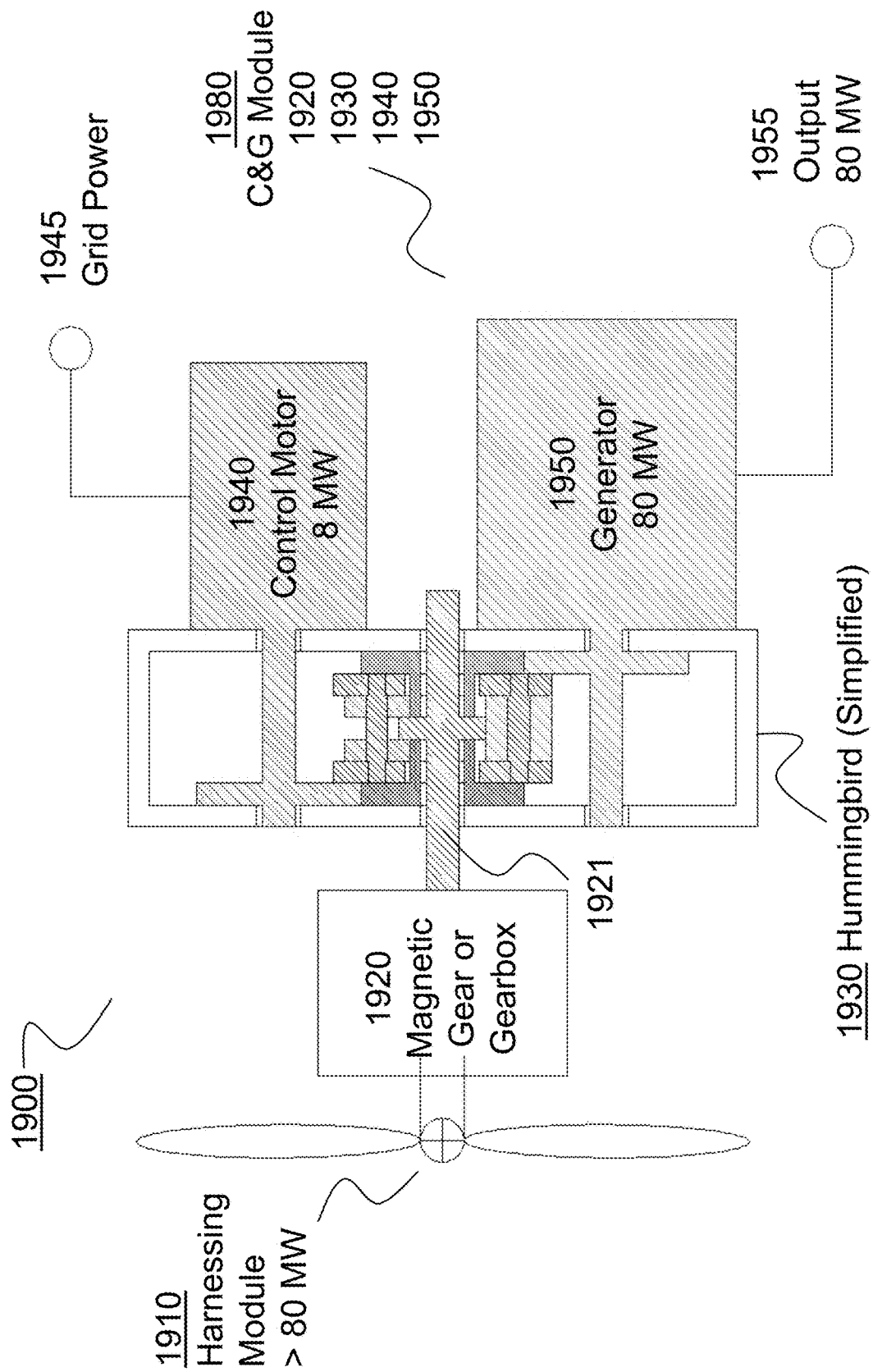
Figure 19. Generation with Grid Power.

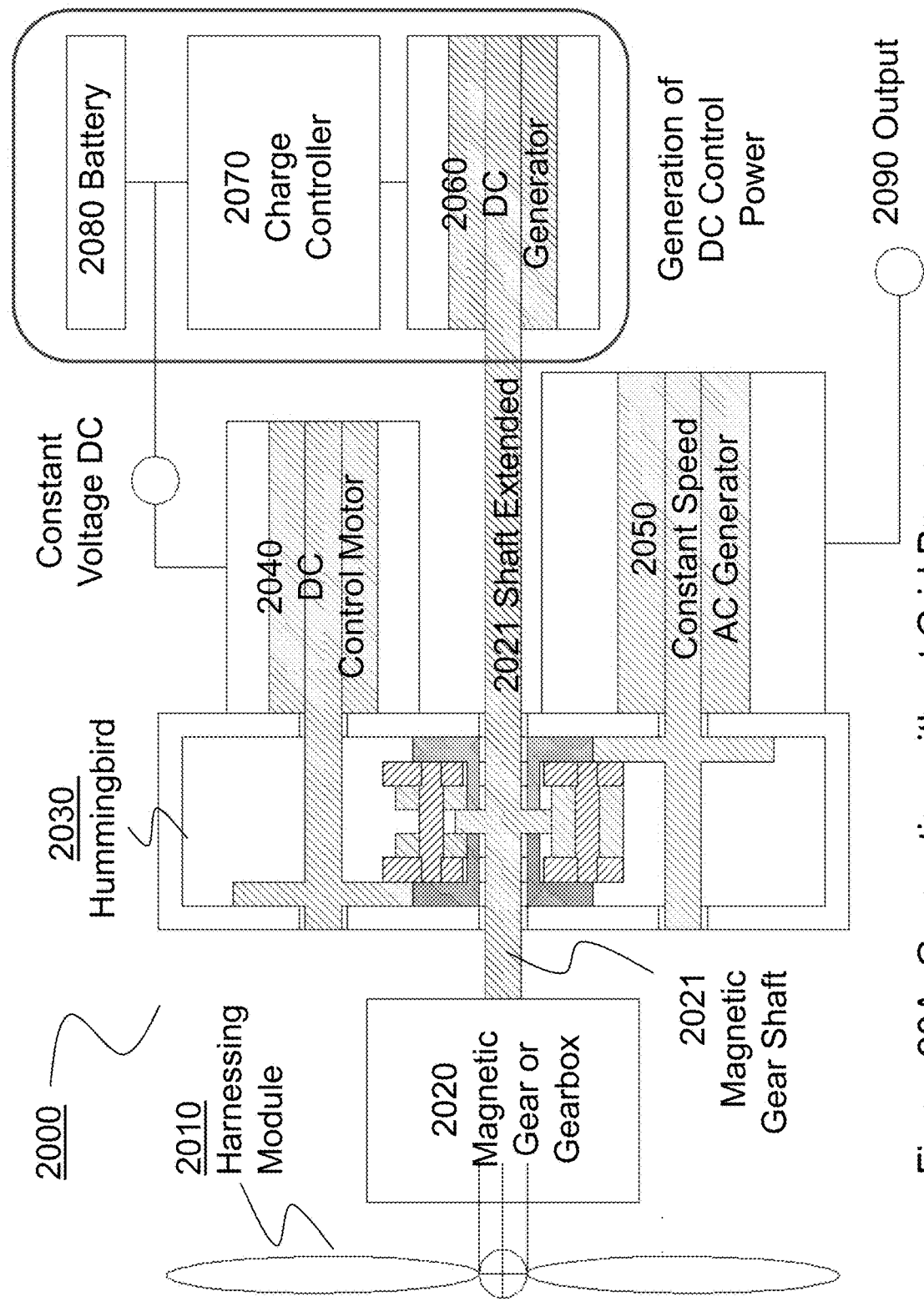
Figure 20A. Generation without Grid Power: Stand-alone or Distributed Generation with a DC Generator

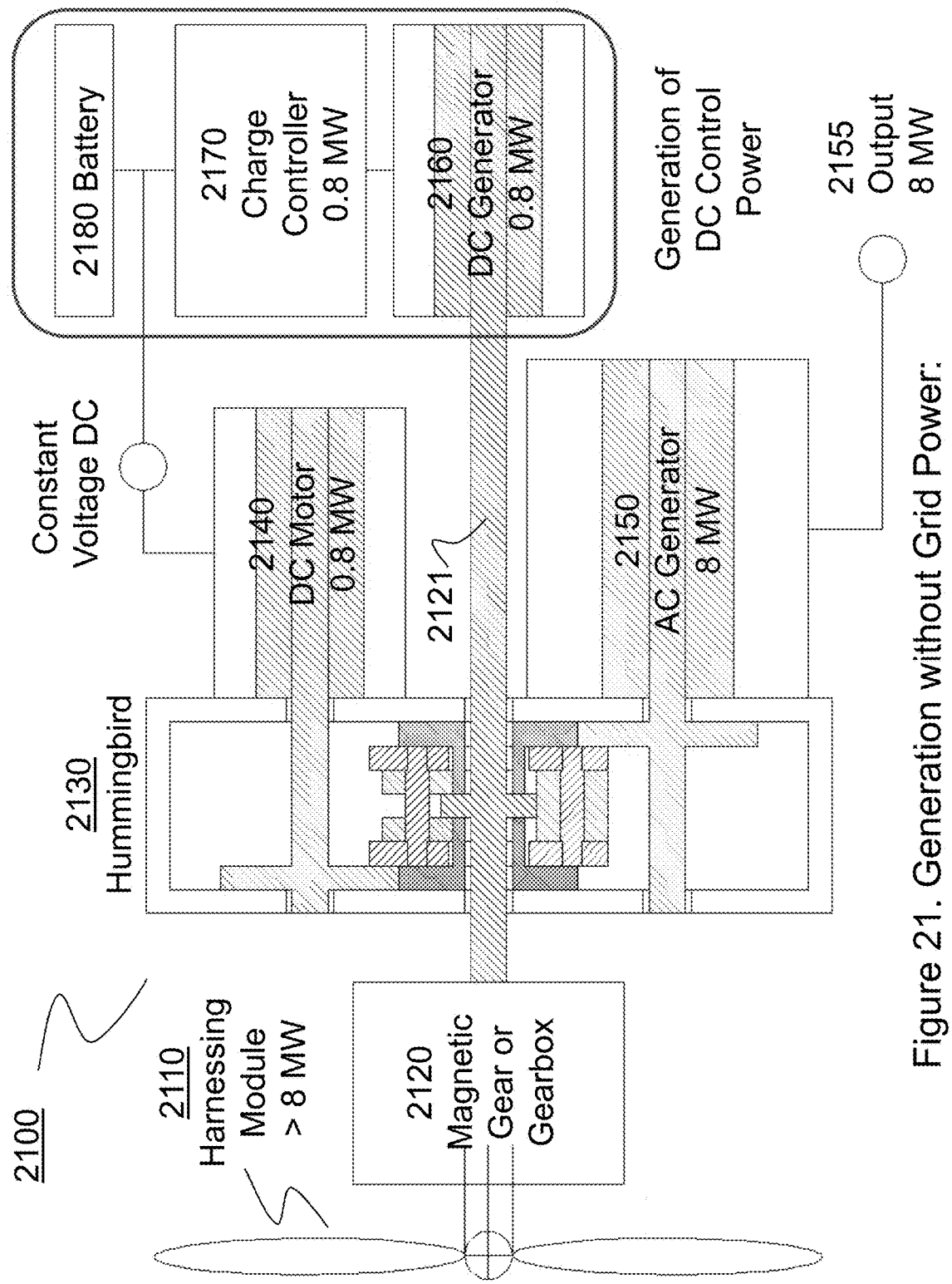
Figure 21. Generation without Grid Power: Distributed Generation with a DC Generator

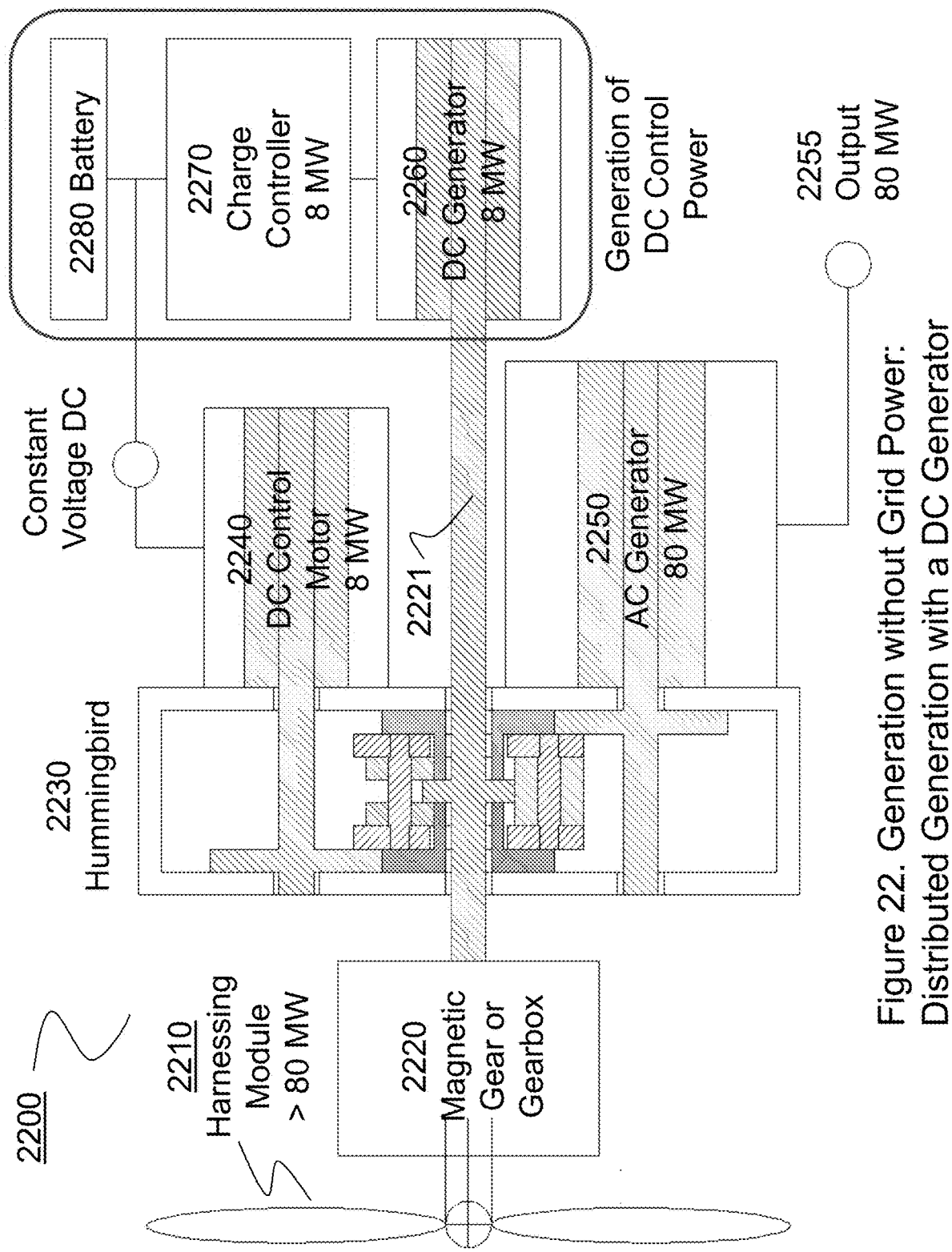
Figure 22. Generation without Grid Power:
Distributed Generation with a DC Generator

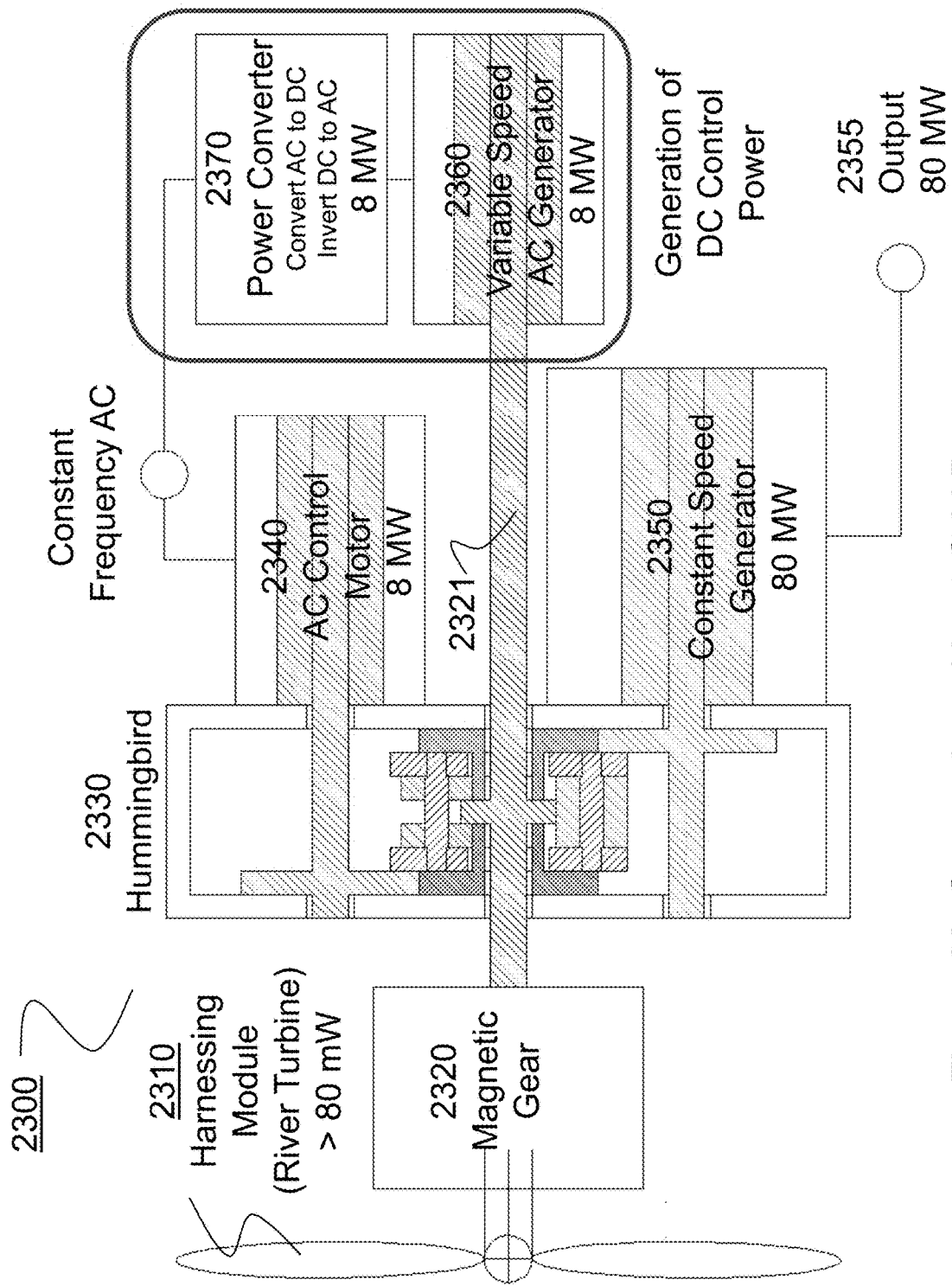
Figure 23. Generation without Grid Power:
Distributed Generation with a Power Converter

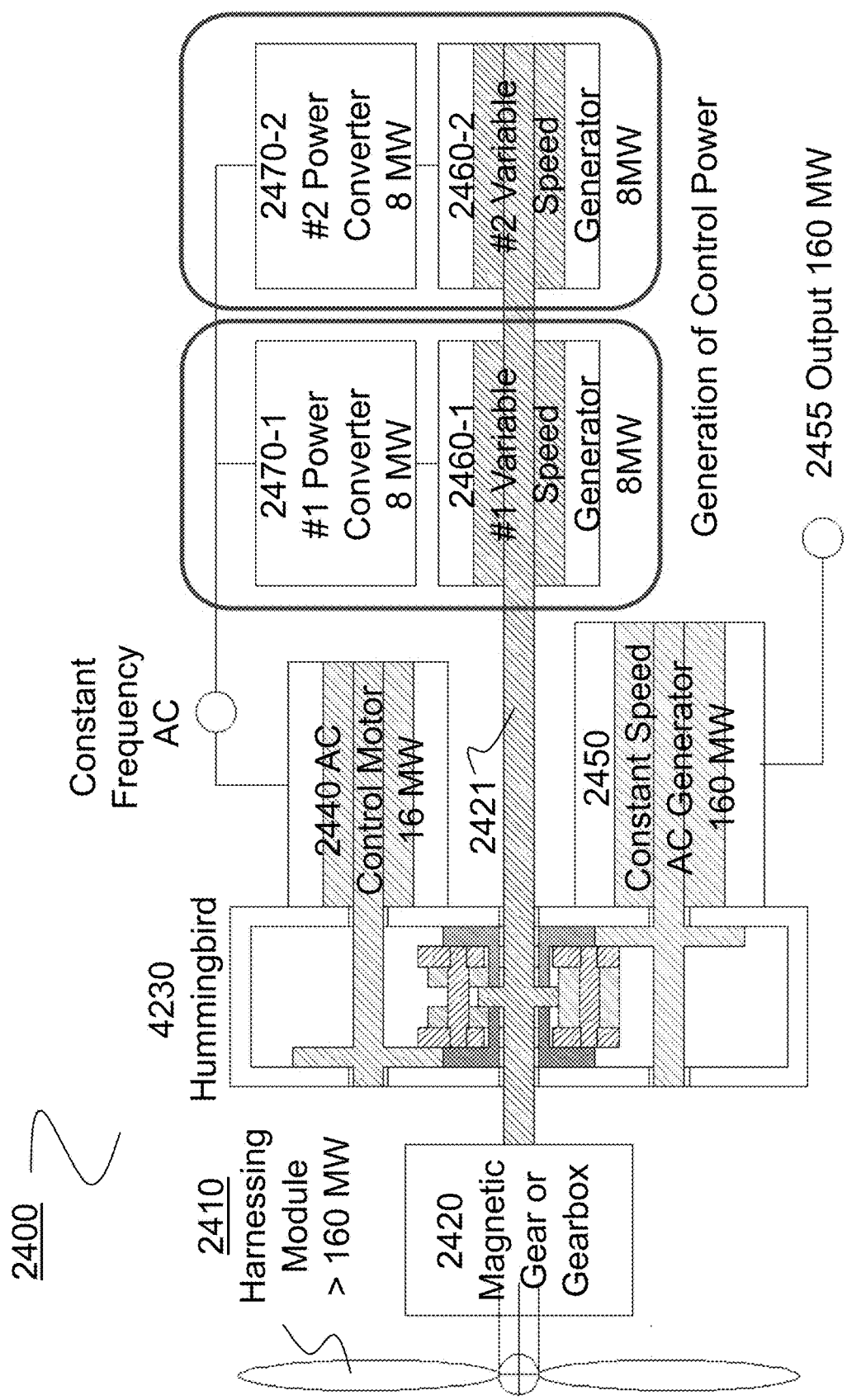
Figure 24. Generation without Grid Power:
Distributed Generation with Multiple Power Converters

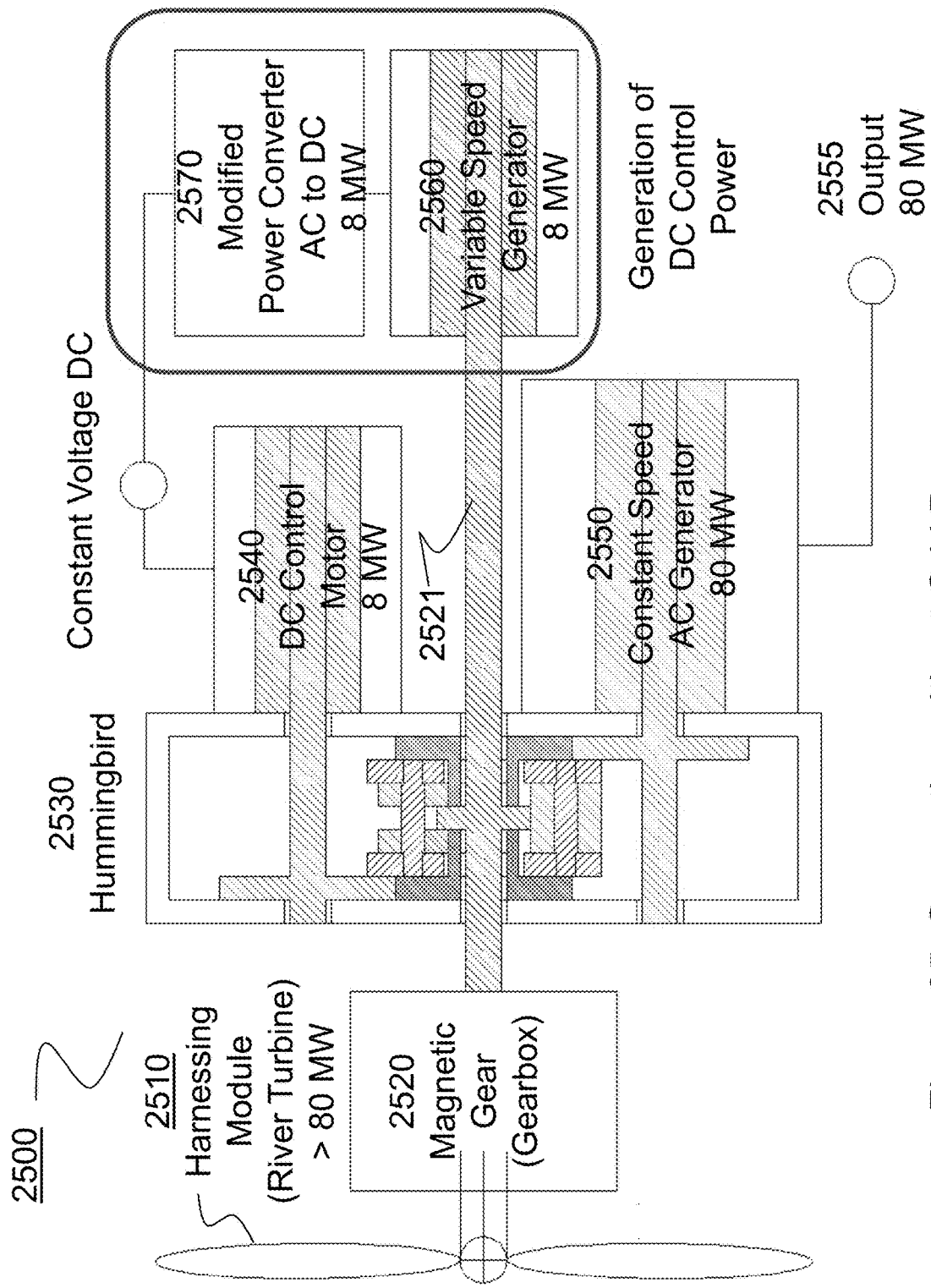
Figure 25. Generation without Grid Power:
Distributed Generation with a Modified Power Converter

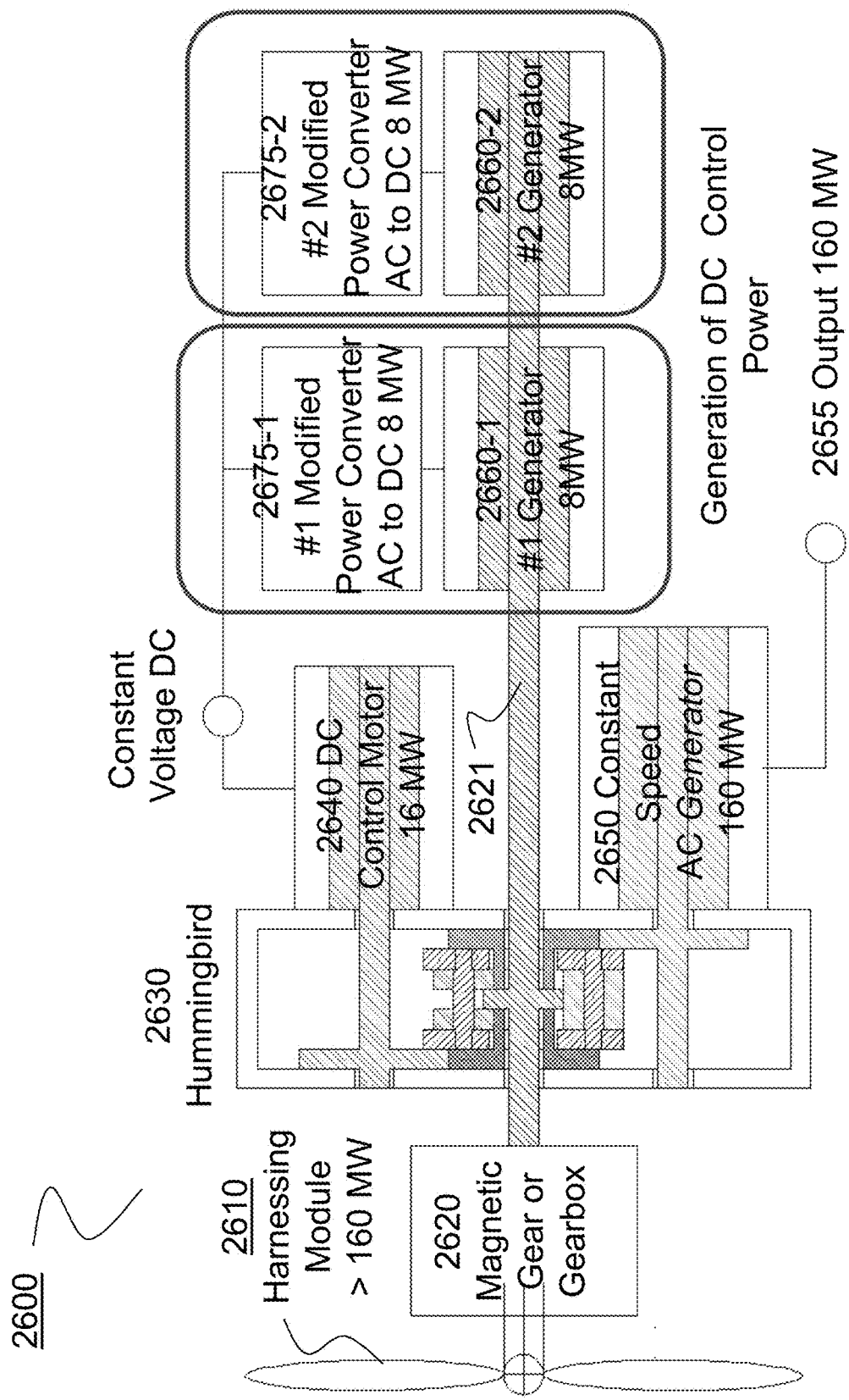
Figure 26. Generation without Grid Power:
Distributed Generation with Multiple Modified Power Converters

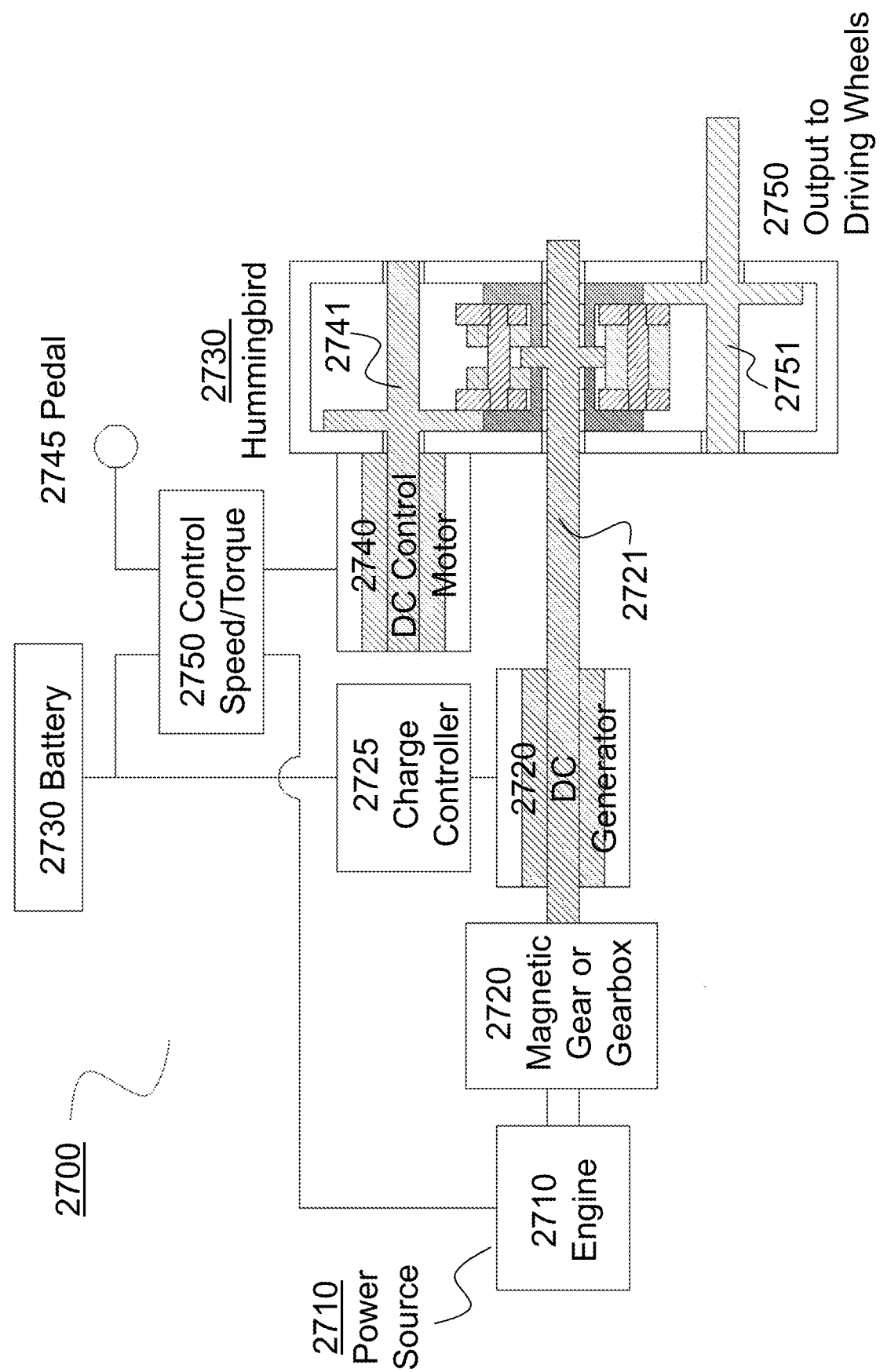
Figure 27. Transmission (IVT): Engine-driven

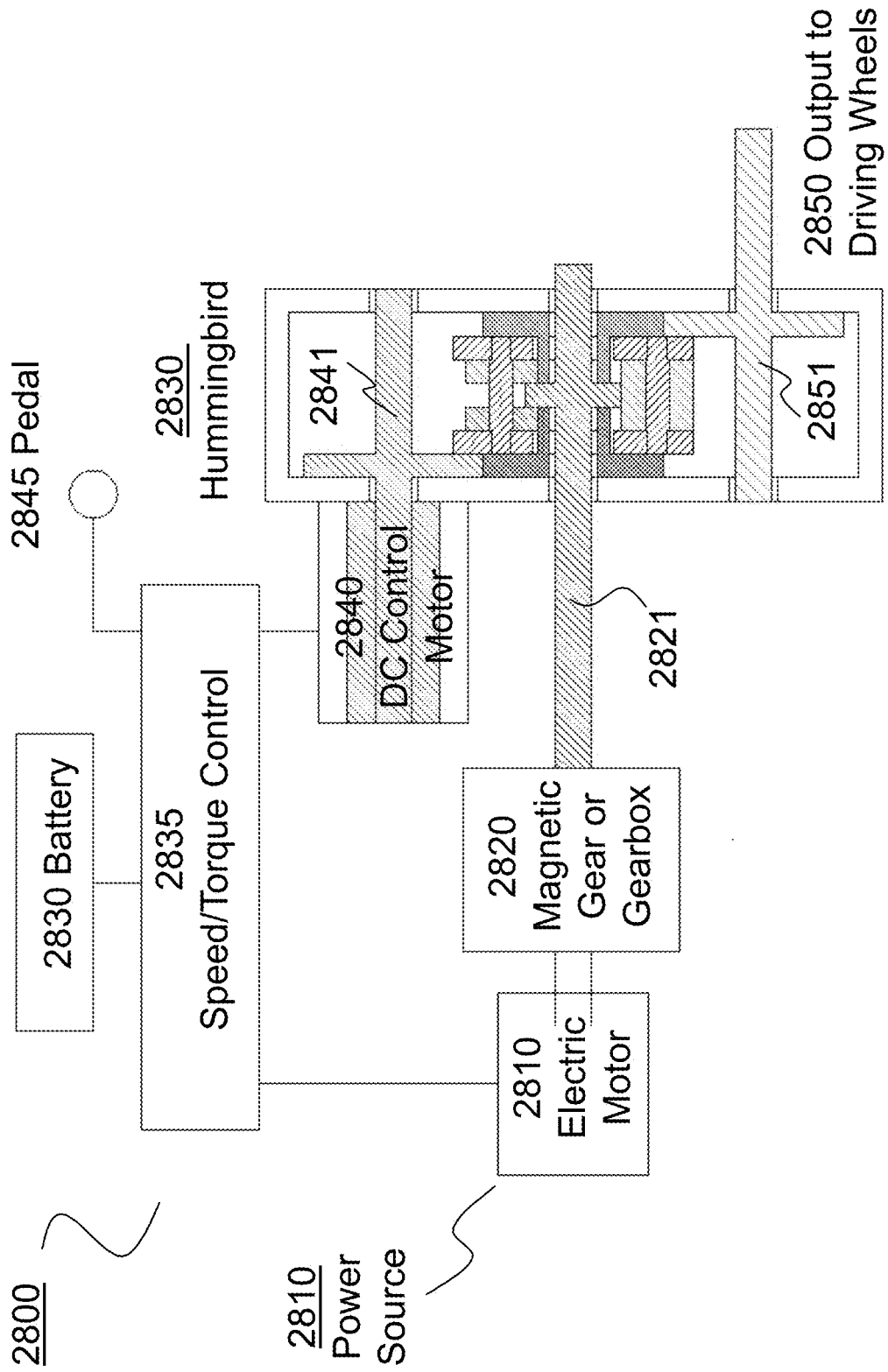
Figure 28. Transmission (IVT): Electric Motor-driven

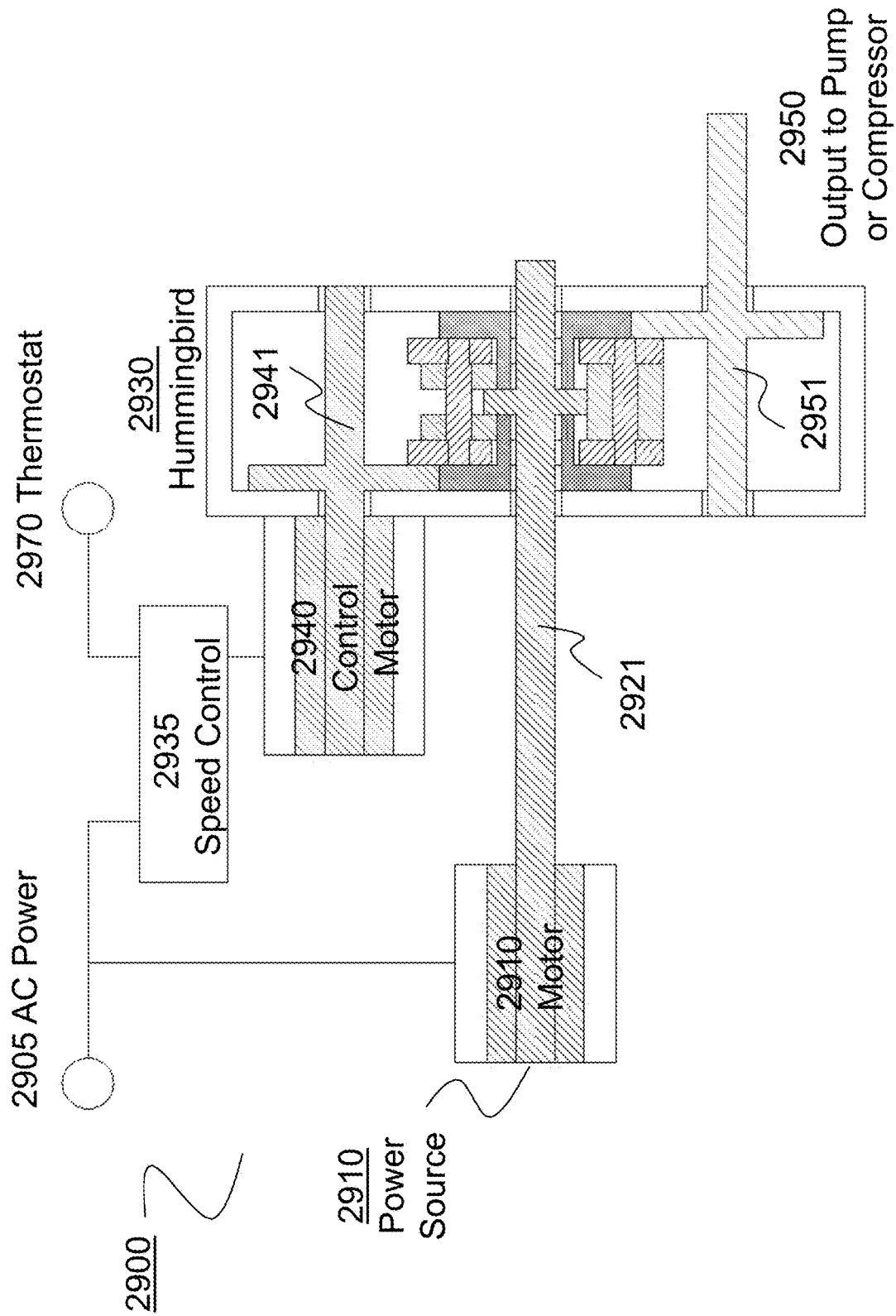
Figure 29. Pump (IVP), Compressor (IVC): Motor-driven

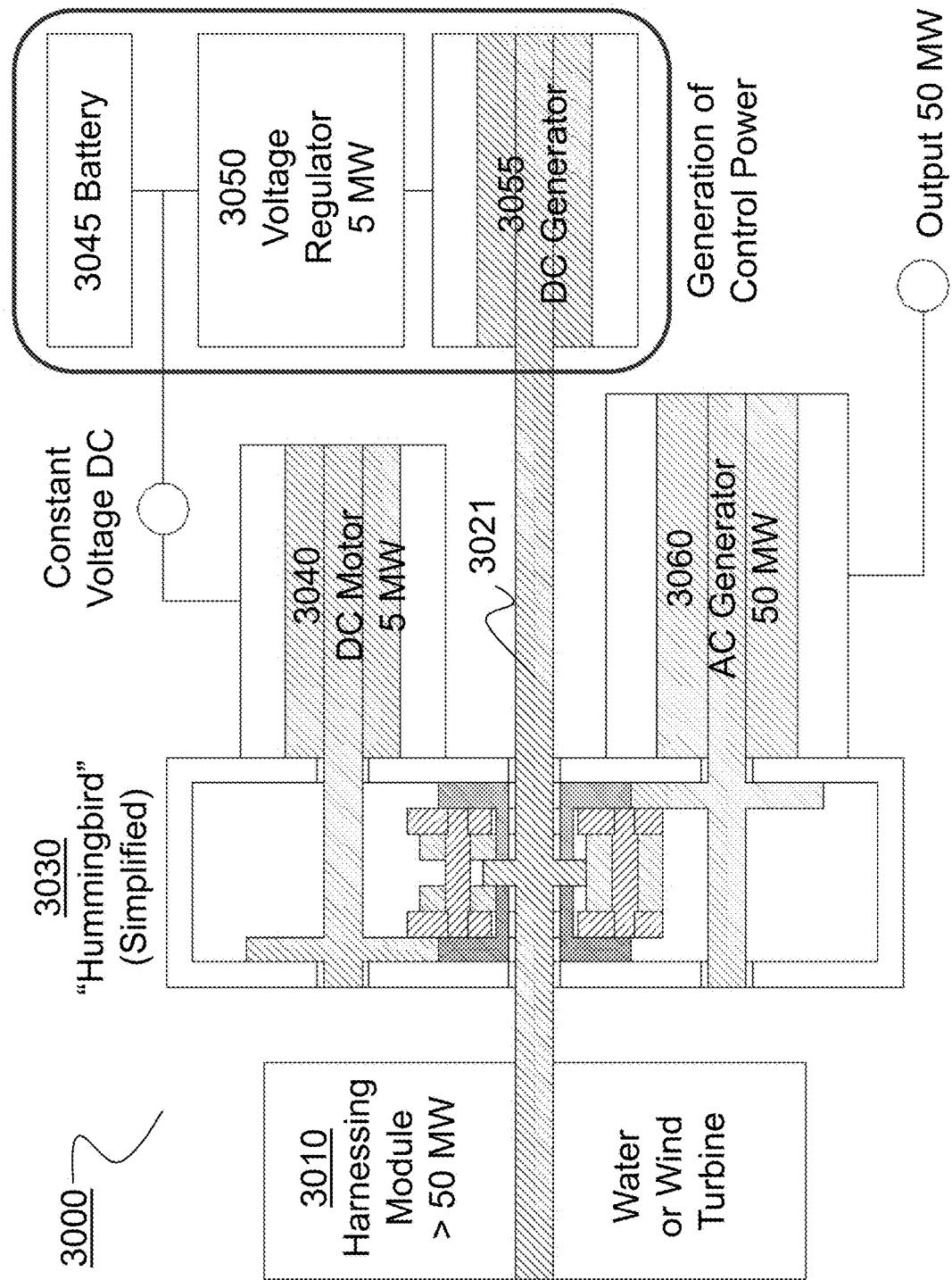
Figure 30. Generation without Grid Power: Distributed Generation with a DC Generator

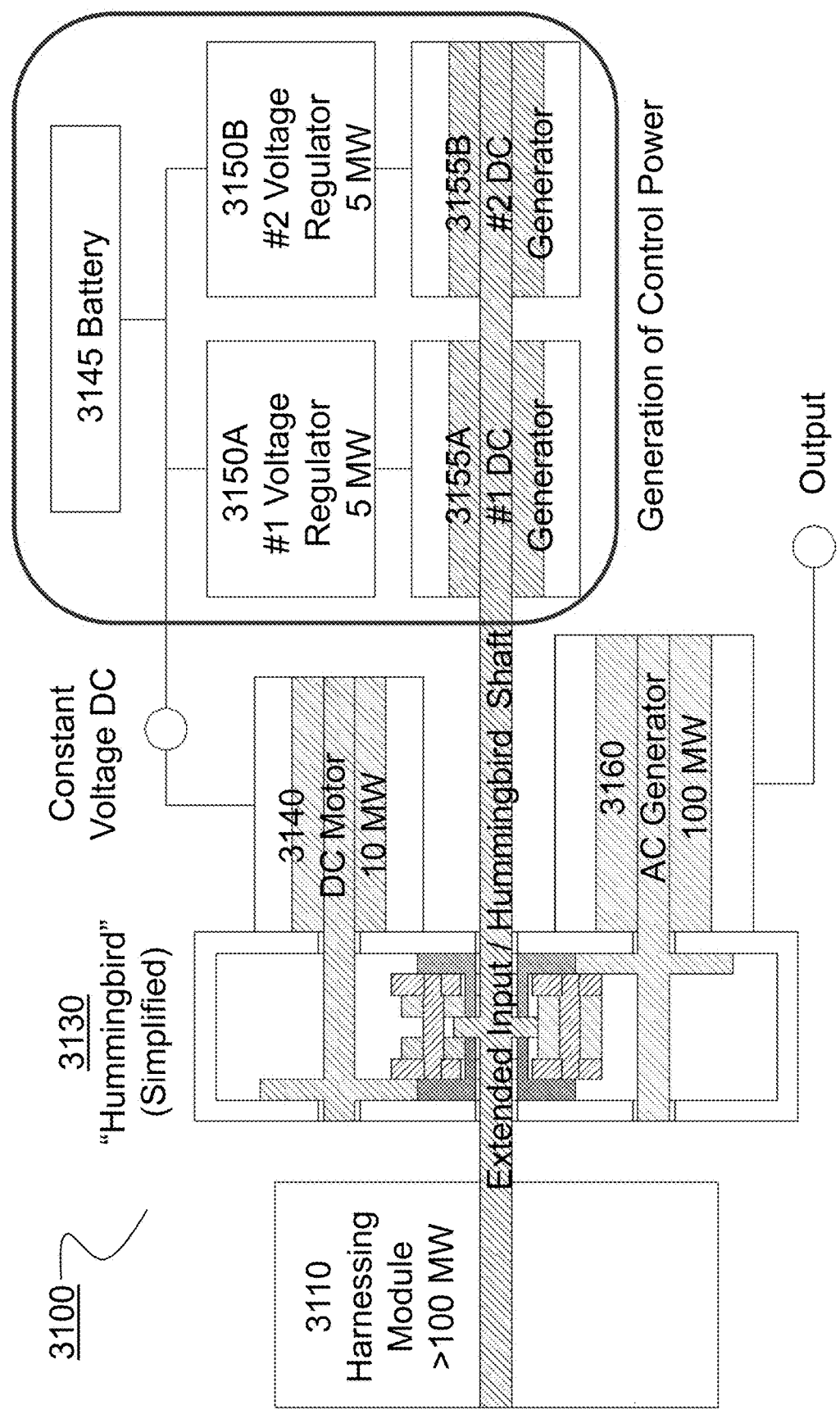
Figure 31. Generation without Grid Power:
Distributed Generation with Multiple DC Generators

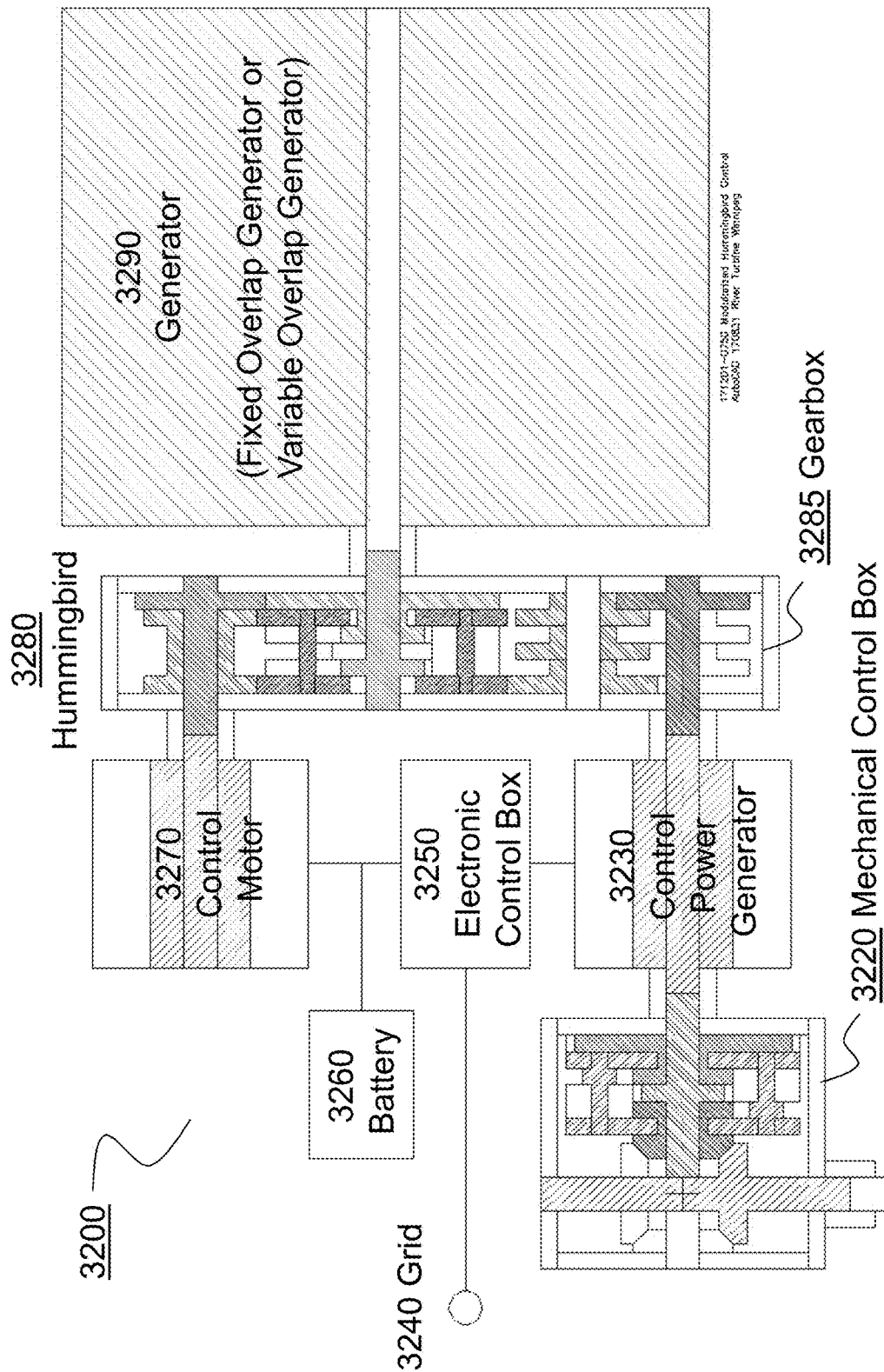
Figure 32: Layout of Modularized Hummingbird Controlled System

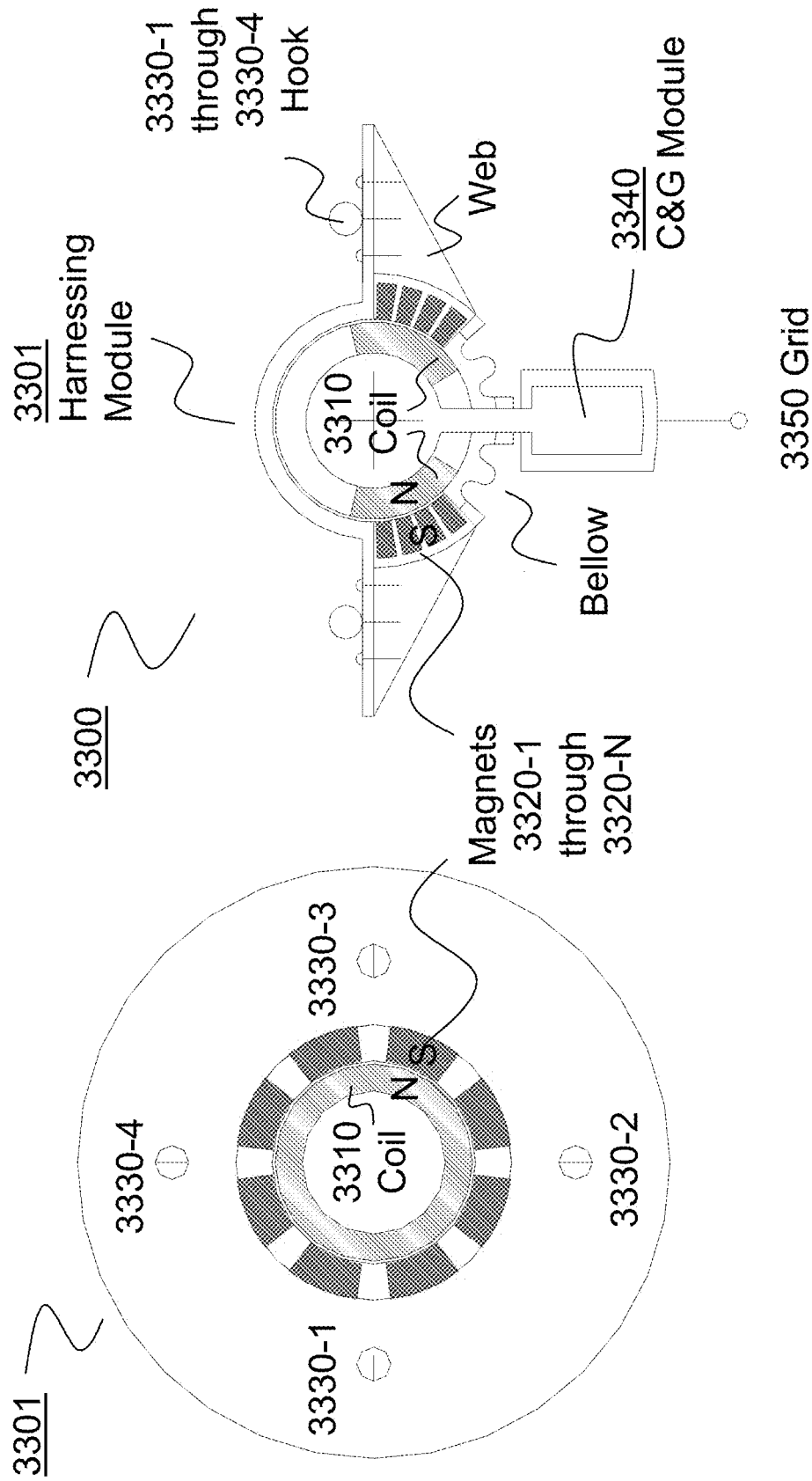
Figure 33(A): Top View
Figure 33(B): Side View

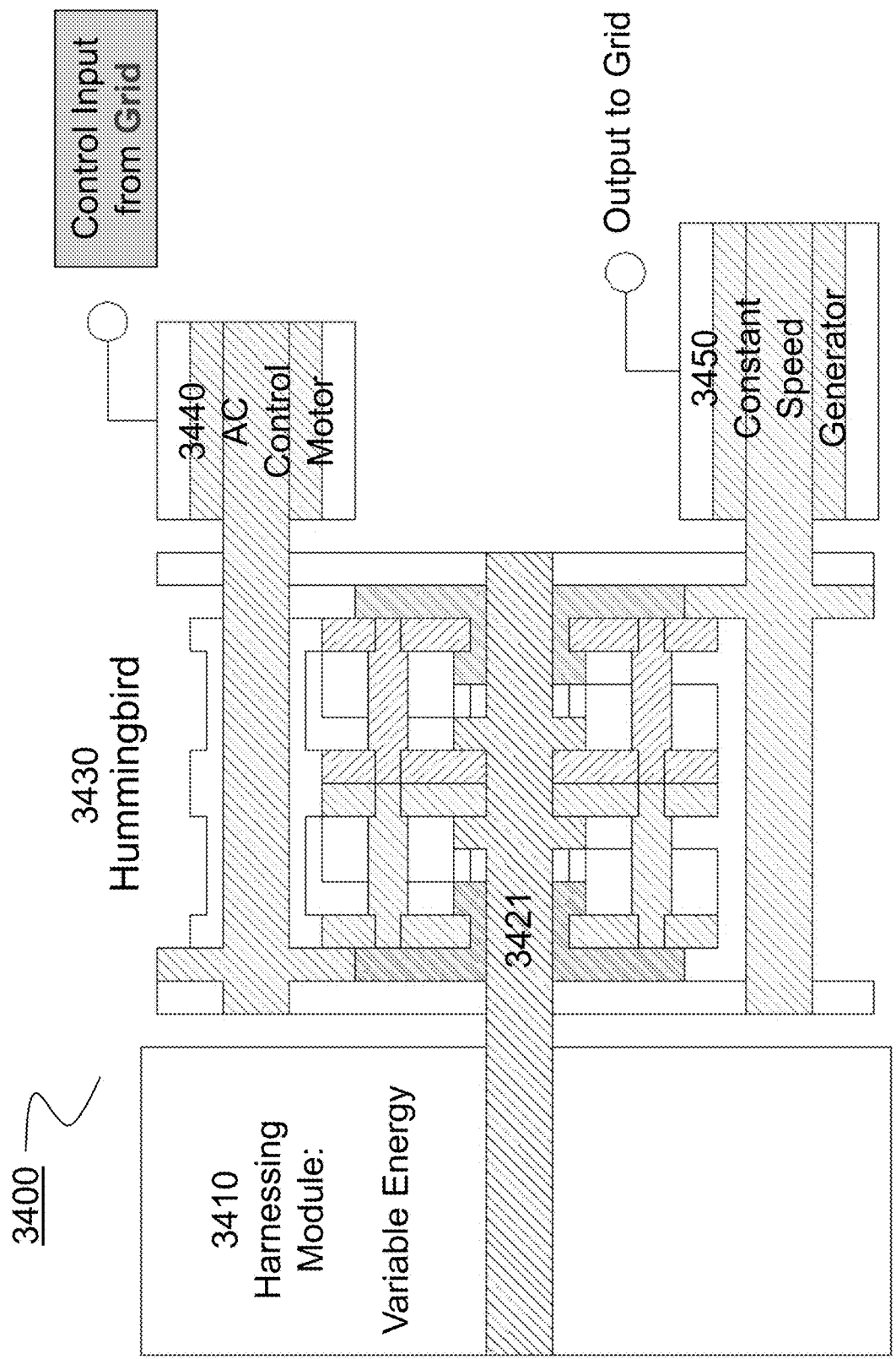
Figure 34: Hydroelectric Turbines With Grid (Grid-connected)

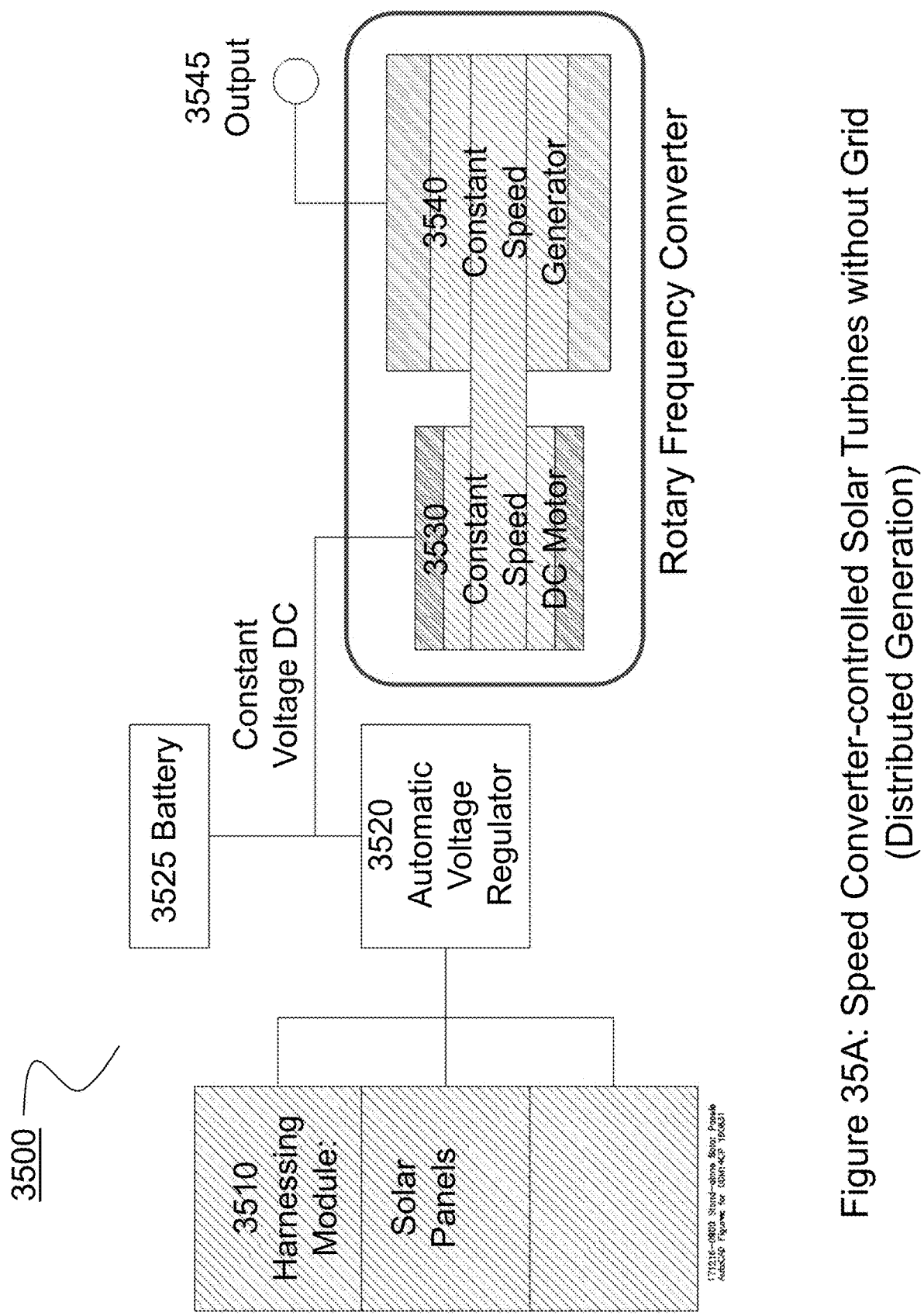
Figure 35A: Speed Converter-controlled Solar Turbines without Grid
(Distributed Generation)

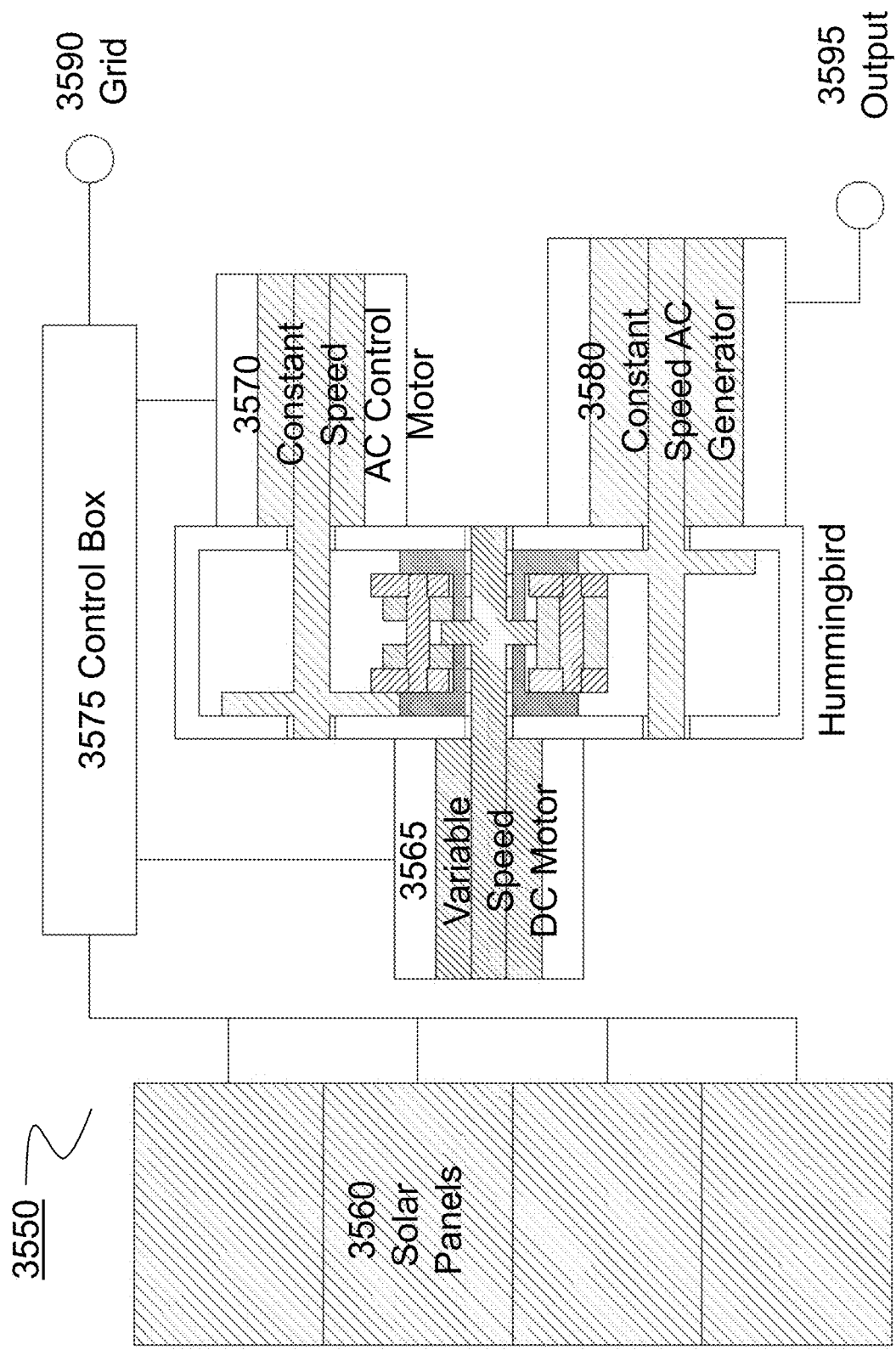
Figure 35B: Speed Converter-controlled Solar Turbines with or without Grid

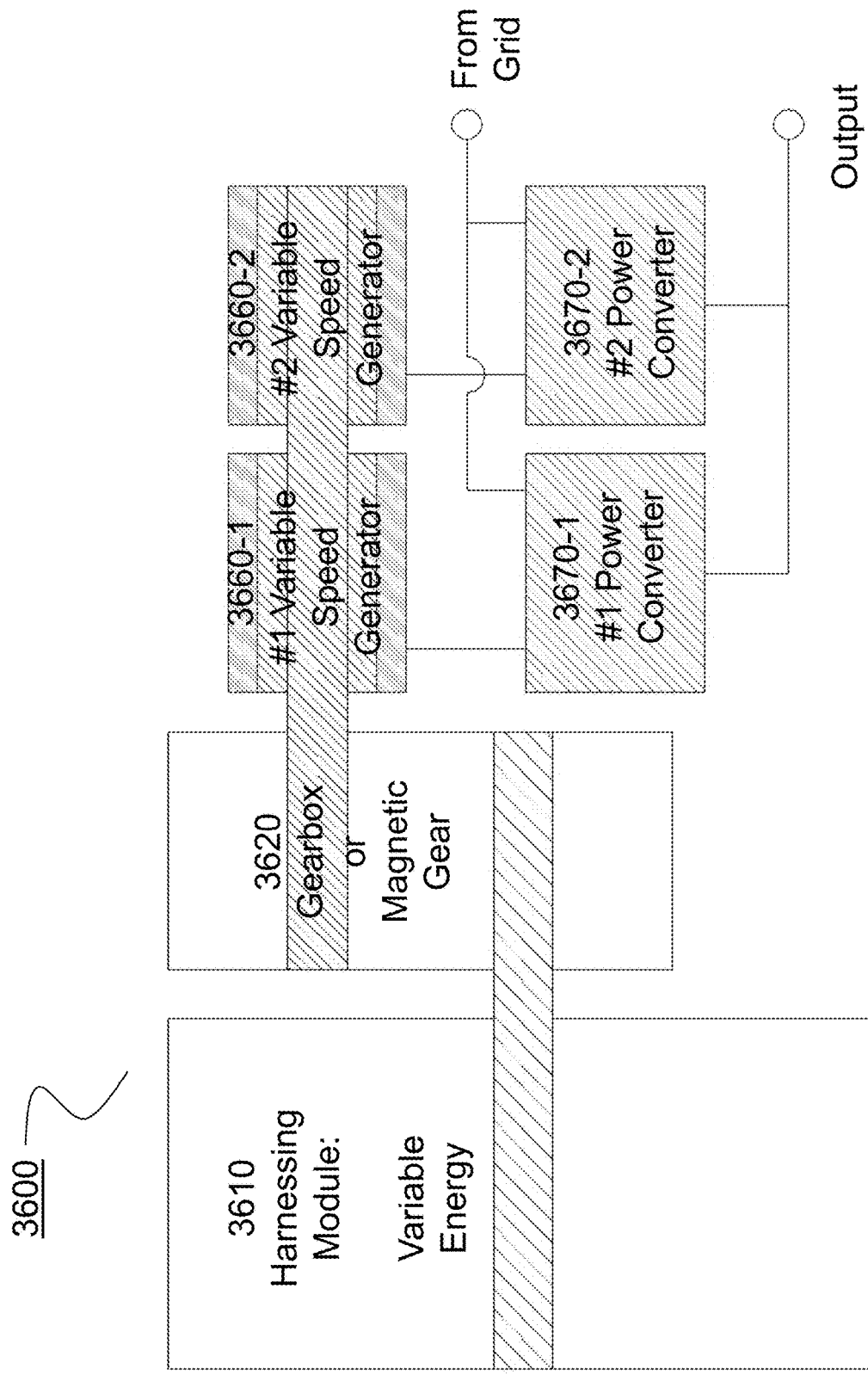
Figure 36: Generating more electricity
Multiple Power Converters (Series Circuit)

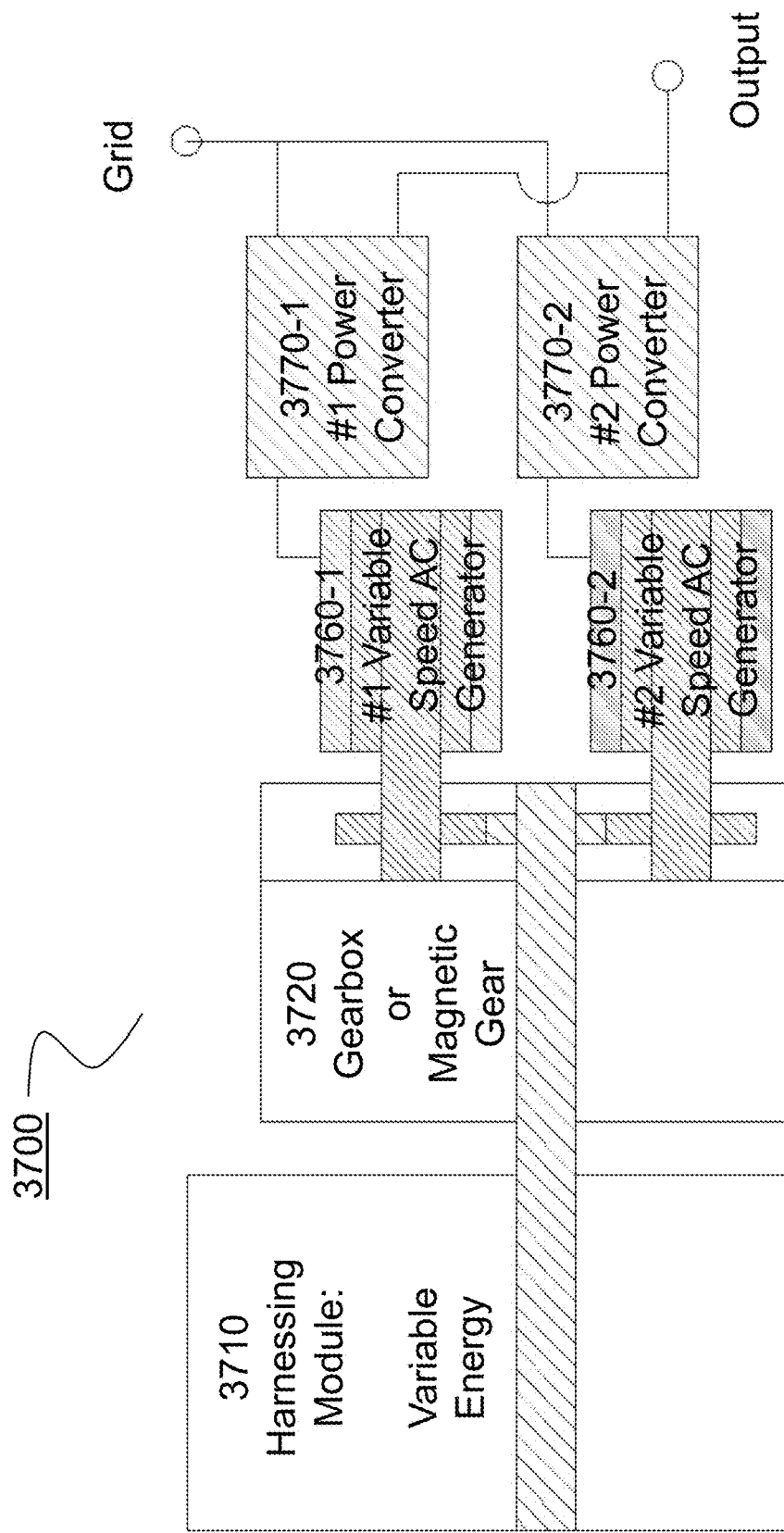
Figure 37: Multiple Power Converters (Parallel Circuit) Generating more electricity

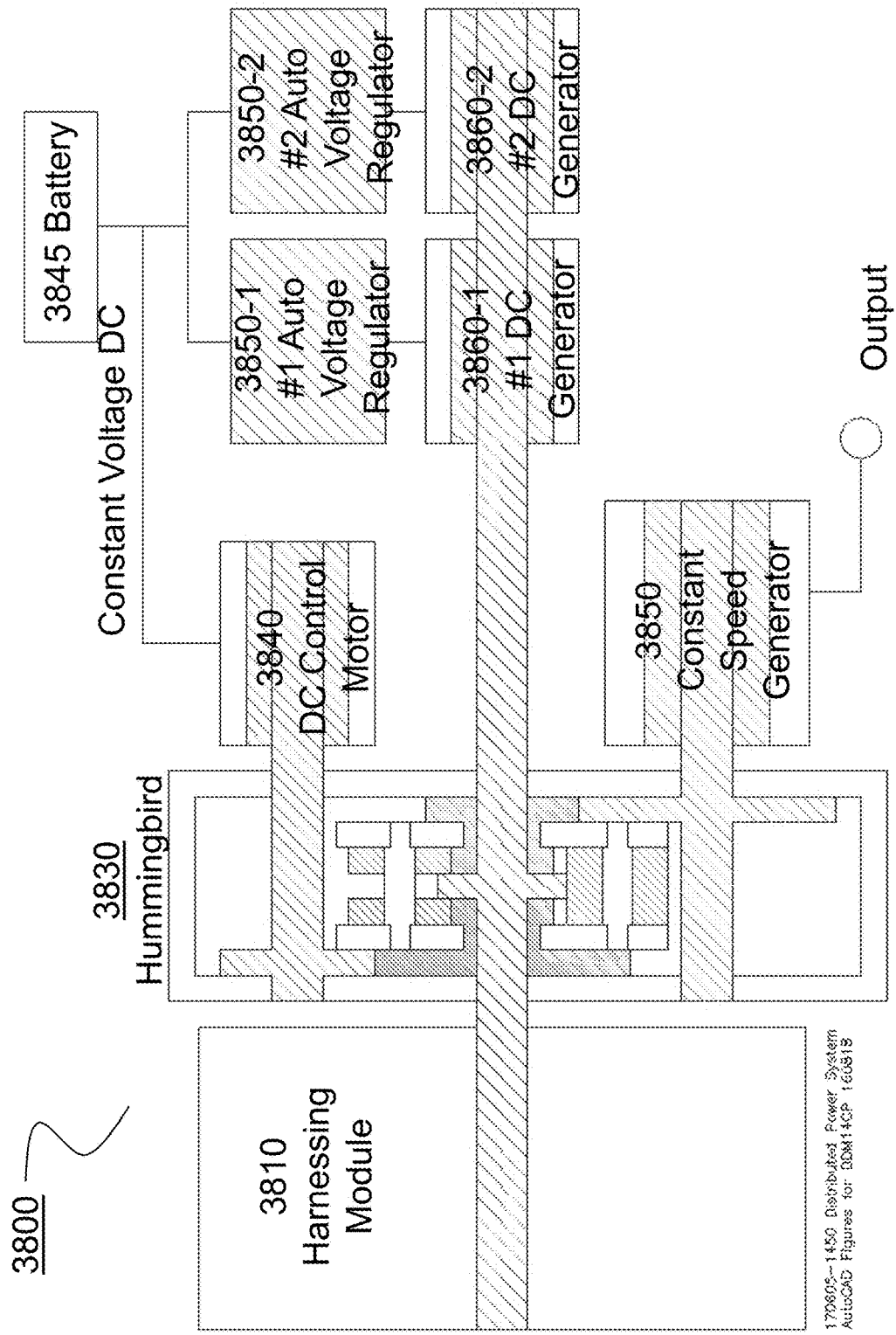
Figure 38: Increased Power Rating: Multiple AVRs

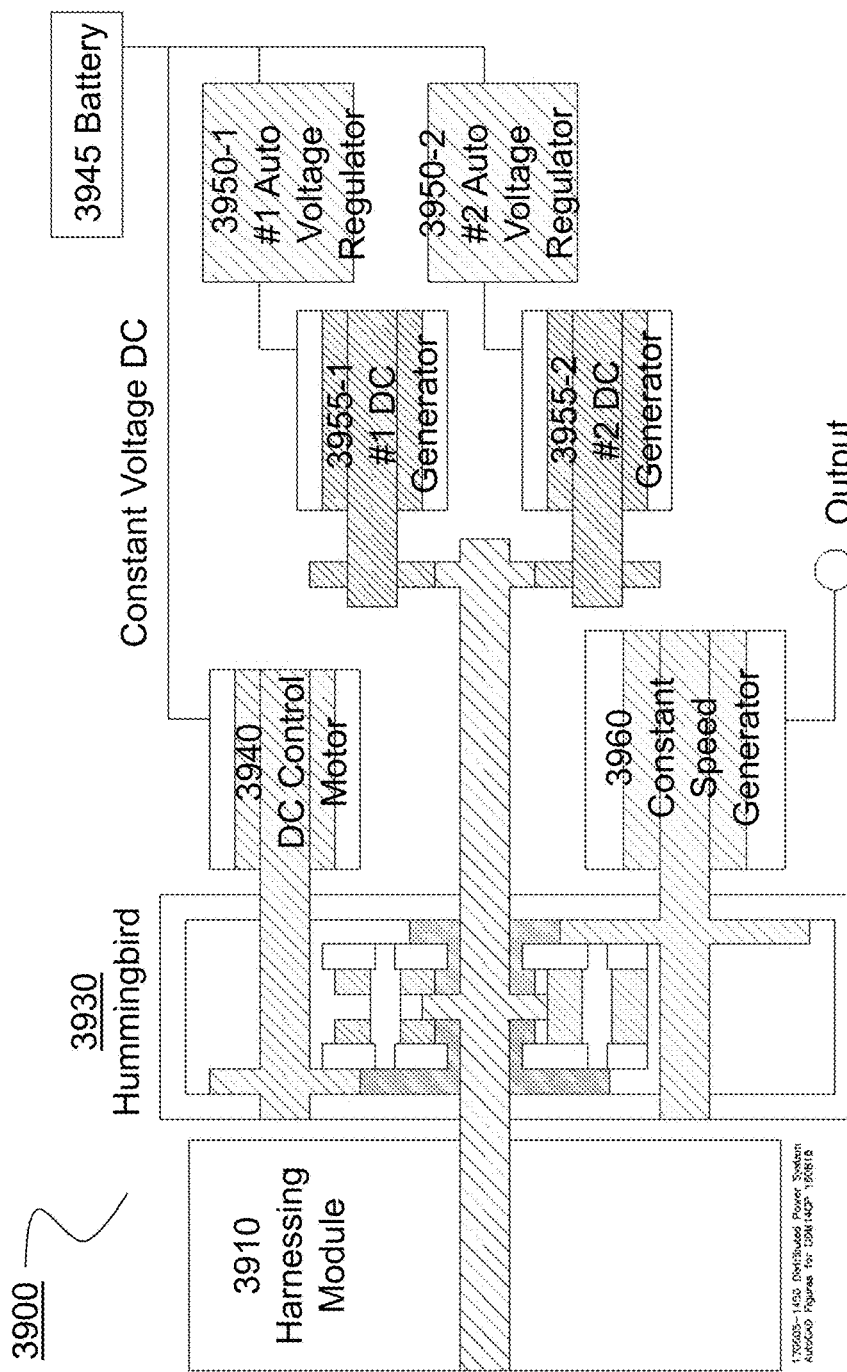
Figure 39: Increased Power Rating: Multiple AVRs

CONTROL APPARATUS AND METHOD FOR VARIABLE RENEWABLE ENERGY

This application is a continuation-in-part of U.S. patent application Ser. No. 15/267,655, filed Sep. 16, 2016, (now allowed) which is a continuation-in-part of U.S. patent application Ser. No. 14/838,867 (now U.S. Pat. No. 9,476, 401) filed on Aug. 28, 2015, and is also a continuation-in-part of U.S. patent application Ser. No. 15/707,138 filed on Sep. 18, 2017, entitled "Commutator-less and Brush-less Direct Current Generator and Applications for Generating Power to an Electric Power System" which claims the right of priority to U.S. Provisional Patent Application Ser. No. 62/409,549 filed Oct. 18, 2016 of the same title and inventor, and this application claims the benefit of priority to U.S. Provisional Patent Application Ser. No. 62/487,101 filed Apr. 26, 2017 and to U.S. Provisional Patent Application Ser. No. 62/520,884 filed Jun. 16, 2017.

TECHNICAL FIELD

The technical field of the invention relates to providing a method and apparatus for controlling the harnessing of renewable energy with a marine hydrokinetic (MHK) or wind turbine or other variable energy producing source and for controlling other apparatus including moving vehicles such as trucks and automobiles at variable speeds. Two three variable Transgear™ gear assemblies are assembled in various configurations as a so-called Hummingbird™ mechanical control, for example, such that two spur/helical gear Transgear gear assemblies having an input, an output, and a control including a control motor may convert variable renewable input energy (wind, water and solar energy) into a constant rotational speed output for generating an electrical output of constant frequency (fifty Hertz European or sixty Hertz U.S.). The control system also has application in infinitely variable transmissions, for direction control and turning control as well in controlling pumps and compressors.

BACKGROUND OF THE INVENTION

Hydroelectric and wind energy are two major sources of so-called renewable energy. In the U.S.A. in 2015 (EIA), 33.3% or one-third of all electric energy is produced by steam generation using coal. A third source of renewable energy comes from the sun (only 0.6%) and a first source comes from water (hydro amounts to 6.0% according to the EIA). Water flows at variable speed and so does wind. The sun only is bright enough during daytime hours for conversion to electrical energy. An advantage of water flow is the mass/density, inertia or power that may be generated by the flow of water compared with the flow of wind (wind amounts to 4.7%) where wind must be collected by large wind-driven propellers or rotor blades. Also, for example, river water typically flows at all hours of the day.

Natural gas provides, in the same year, about 32.8% of U.S. electric energy, and nuclear energy now provides about 19.6%, for example, via steam turbine generation. Petroleum, such as oil, is used to produce only about 1% of U.S. electric energy. Coal, natural gas, biomass (1.6%) and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic, MHK, energy) sources. The Grand Coulee dam, Hoover dam and the Tennessee Valley Authority are exemplary of projects started in the early $20^{th}$ century in the United States for generating hydroelectric power, but these require large dams to build potential energy for turning electric turbine generators. Large hydroelectric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a solar, wind or water driven electricity generator control that may save the cost of building a dam or a large wind mill with giant propellers, permit the marine hydrokinetic (MHK) generation of electricity and use the high inertia flow of a river or the flow of ocean currents, tides and waves. And, notwithstanding the variable nature of renewable sources of energy, there is a need for a control system for assuring constant frequency power at constant voltage to conform to world standards. Similarly, wind-driven turbines should be more efficient, reliable, and designed to convert variable wind speed over a greater speed range to constant frequency and voltage output for delivery to an electric power grid.

So-called biomass energy generated from plant and animal material (waste) may amount to 1.6% of total renewable energy but has similar problems to those of non-renewable carbon-based systems and can cause emissions. While hydroelectric energy amounts to the next greatest renewable source at about 6.0%, it is believed that more can be done to efficiently utilize the rivers, tides and ocean currents in the United States than by hindering the flow of water commerce by the construction of dams.

Other renewable sources include geothermal, wind and solar energy. While these are "clean" sources, to date, their growth has been unimpressive. Only wind energy is supported by the Department of Energy, and wind energy is forecast to grow from 4.7% in 2015 to 20% of all US energy in approximately 20 years. Recently, offshore wind turbines have been considered for use off the Eastern Shore of the United States mounted on platforms for generating power for the mainland coastal states.

Further detail of a conventional wind turbine is described in WO 1992/14298 published Aug. 20, 1992 and assigned to U.S. Windpower, Inc. A variable speed rotor may turn a gearbox to increase the rotational velocity output of the rotor and blade assembly. For example, a so-called cut-in speed (rotational velocity) of a rotor may be about six revolutions per minute (when electricity may be generated) and the rotor blade may typically cut-out at about 30 revolutions per minute (a maximum for electricity generation without damage to the turbine) by controlling the pitch of the rotor via a pitch control system during conditions of high wind velocity and to reduce rotor blade noise. Typically, wind speeds over 3 meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines do not have sufficient wind speed to operate at all depending on weather conditions, placement and the like.

When wind speed and direction vary, a pitch control system may measure the wind speed and adjust the pitch of rotor blades to pass more wind and so control the rotor blade from turning too fast. A yaw control points the rotor blade into the wind whichever way the wind is blowing. Yaw control (for example, via a wind vane) may supplement pitch control to assist in pointing a rotor into the direction of wind flow. These vanes may also be used for water driven tidal turbines. Noise from rapid rotor velocity in wind turbines can be abated, for example, by turning the blade parallel to the wind using a wind speed control system to thus maintain the rotational velocity close to a cut-out speed. An anemometer placed at the tail of the known wind turbine may measure wind velocity and provide a control input. The tail (or vane) of the turbine may be equipped with a rudder or wind vane for pitch or yaw control. Horizontal or vertical stabilizers may be provided for pitch or yaw control. The rudder or wind vane may help point the variable speed rotor into the wind. In general, however, there is a problem with known wind turbine systems that only a portion of the wind energy available at a site of a wind turbine farm may be harnessed resulting in harnessing only a portion of the kinetic energy of the available wind to feed an electric power grid. There is also a problem with mechanical gearboxes which comprise meshed gears that can break during large wind gusts or at high tidal water speeds or during large wave motion due to severe torque increases.

A mechanical meshed gear gearbox is known to have a failure rate of approximately 5%. Electronics used in a wind turbine has the highest potential failure rate of 26%. Control units generally exhibit a failure rate of 11%. Sensors and yaw control exhibit approximately a 10% failure rate. The failure rate of a variable frequency converter or variable power converter may be on the order of 26% (electronics) according to an ongoing consortium's study of drive train dynamics at the University of Strathclyde, Glasgow, Scotland. According to published information, the mean time between failures of a 1.5 megawatt wind turbine, for example, may be only two years on average (but the real failure rate is an industrial secret); and the replacement cost may be over $50,000 (for example, $50,000 to $100,000 US) per variable frequency converter. A failure rate of the variable speed generator of a known wind turbine is on the order of 4.5%. Consequently, problems related to known wind and water turbines relate closely to the failure rate of gearboxes, generators, variable frequency converters or variable power converters and associated electronics and inefficiencies of operation.

A solution to the identified problems is to provide a constant rotational velocity as an input to the constant speed electric generator so that the generator in turn can produce a constant frequency output and deliver a constant voltage and variable current directly to an electric grid. Transmissions or speed converters, for example, have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

A recent development in the art of gearboxes is a magnetic gear which relies on permanent magnets and avoids meshed gears. Magnetic gears, for example, developed by and available from Magnomatics, Sheffield, UK, have an air gap between sheath and shaft and so there is no meshing of gears in a gearbox. Alternating north and south poled permanent magnets may slip with a gust of wind or burst of water energy with a magnetic gear but break a meshed gear gearbox. A magnetic gear yields when a large gust of wind or a tidal or wave burst of water energy turns a gearbox input while a meshed gear may break or cause considerable wear to a meshed gear of the gearbox.

Many of the problems of wind turbines are carried forward into marine hydrokinetic (MHK) turbines such as run-of-the-river, tidal, ocean wave and hydrokinetic river turbines. There is the same problem of having to convert a harnessed variable frequency to a constant frequency and voltage output. On the other hand, there are many advantages for harnessing marine hydrokinetic (MHK) energy: the density (mass or inertia) of water is much greater and its speed is not as variable as wind speed especially when used in a relatively constant flowing river or steam which flows continuously in the same direction (such as the Mississippi River of the United States). Generally, for example, rivers flow in one direction and the major ocean currents do the same. Wave generation, however, in oceans and other large bodies of water varies in magnitude with wind and weather. Ocean shore waves are more predictable and a strong undertow can be useful for electric power generation. Tides are reversible (high tides flowing in and low tides flowing out) and associated known turbines may be limited to one direction of water flow (high or low tide).

A concept for improving wind turbines is use of a direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, for example, use power converters or frequency converters and so result in reduced down time for gearbox repairs at the expense of increased cost due to the bigger generators. A speed converter to convert variable speed to constant speed is disclosed in U.S. Pat. No. 8,388,481 of Kyung Soo Han, incorporated by reference as to its entire contents. The speed converter is entirely mechanical and so scalable and improves upon the high failure rate, reliability and efficiency of known electrical/mechanical systems. Speed converters under development are also frequency converters. are shown in this and other patent applications and patents of Key Han and are referred to as infinitely variable speed converters or simply speed converters.

Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of U.S. Pat. No. 8,641,570 of Differential Dynamics Corp. (also known as DDMotion), also incorporated by reference as to its entire contents. The DDMotion speed converters are differentiated from those of Torotrak and Fallbrook by their gear drives (no toroids, pulleys or belts) and that they are scalable.

A turbine was produced by Hydrovolts, Inc. The apparatus may comprise a waterwheel and may comprise a gear and belt drive inside which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U.S. Published Patent Application 2010/0237626 of Hammer published Sep. 23, 2010, which appears to comprise a waterwheel construction. Hydrovolts' rotating (hinged) blades may control some of the water flow speed, but it is urged that the exposed rotating blades may be susceptible to damage.

A river turbine is known which may be attributed to Free Flow Power Corp. and may have been lowered to the bottom of the Mississippi River or attached to a piling. It is believed that such a device may be very similar to a turbine engine of an airplane but below water level and the water, at velocity, drives a turbine propeller (blades). Due to lowering prices of natural gas, the project became economically unviable (according to their press release in 2012).

New Energy Corp, Inc. of Calgary, AB, Canada has recently announced a hydrokinetic turbine. These are floating turbines that will come in sizes from five kilowatts to one hundred kilowatts. An installation of a twenty-five kilowatt EnviroGen plant is planned for use by the First Nation communities on the Winnipeg River and requires no dams and will be anchored in the river. The plant is expected to require no fuel, run twenty-four hours a day from river currents and there is allegedly no need for a large battery bank. The energy harnessing module comprises propellers that appear to be vertical to face the river water flow of approximately 2.4 meters per second or three meters per second.

It is generally known in the art to utilize devices that look much like wind turbines to capture water energy. A tidal and/or river current turbine is known from FIG. 1 of U.S. Pub. Patent App. 2009/0041584 published Feb. 12, 2009. The diagram provides the labels, showing direction of water flow "A" (from right to left). Note that the turbine rotates on a pole so that rotor blade 150 captures the water as it passes. This device may be available from Verdant Power. It is respectfully submitted that Verdant Power may currently be strengthening their blades and adding pitch control.

A rotating ring device including a rotating ring is known which is available from Oceana Energy Company. FIG. 1 of U.S. Published Patent Application 2012/0211990 of Aug. 23, 2012 of Oceana Energy allegedly comprises hydrofoils both external and internal to the rotating ring.

Perhaps the most like a wind turbine in appearance is the known tidal energy turbine of ScottishPower Renewables, a division of Iberdrola. According to press releases, this tidal device with its propeller (rotor blades) is capable of generating approximately 10 MW of power as an "array" perhaps of twelve or more such devices at less than 1 MW each.

Devices are also known for harnessing the power in water waves such as ocean waves. Such a device is known and available from Pelamis Wave Power. FIG. 1 of Pelamis's U.S. Pub. Patent Application 2013/0239566 of Sep. 19, 2013 shows a Pelamis device 10 floating in the ocean. The device 10 may comprise a plurality of hinged sections 12-A, 12-B, 12-C, 12-D and 12E. The device wiggles and generates power in the direction of a wave from left to right. As the wave passes through the hinged sections, the sections 12A through 12E move up and down with the height of the wave. The wave thus creates movement which may be used to generate electricity. It may be said that the higher the wave, the greater the movement; the calmer the seas, the less the movement and the less generation of electricity.

Most maps of the United States show the major rivers which include the Ohio, the Mississippi, the Missouri, the Snake River and the Pecos and Brazos Rivers of Texas. As can be seen from such a map, there is a great potential to harness the water energy of these rivers in the United States and to power, for example, the entire area covered by the Mississippi River and its tributaries including the Missouri, the Platte and the Red Rivers. Using dams across these rivers to generate electricity would be costly and hinder river traffic and marine lives. It may be that only Free Flow Power has developed a device for use on such a river as the Mississippi (but Free Flow Power abandoned the Mississippi project in 2012).

Similarly, a map of the world shows the major rivers of the world, further highlighting the potential to harness water energy in rivers world-wide. Also, ocean current maps are known, for example, showing the Gulfstream. Proximate to the United States, the strong ocean current of the Gulfstream is known to flow northward along the east coast of the United States. On the west coast of the United States, there is known a southward current initiating as the north Pacific drift and, as it passes California, is referred to as the California Coastal current. Other important world currents include and are not limited to the Peru/East Australian current, the Brazilian current/Benguela current, the west wind drift, the West Australian current, the Kuroshio current and the North Atlantic drift. These strong currents are known and have the potential to generate a considerable amount of power but are presently not used for electricity or power generation. (Predictable ocean tides cause water to flow upstream in ocean tributaries at high tide and downstream in ocean tributaries at low tide and may be more widely used for electric power generation.)

A typical hydroelectric power plant is mounted within a dam of a river. A first step in harnessing water energy in this means is to build the dam to create a pressure head that is proportional to the depth of the water backed up by the dam. The backed-up water is represented by a reservoir or lake. At the base of the dam, there may be intake gates which allow water that has been compressed by the head to flow through a penstock to a powerhouse which is one of many such powerhouses that may be constructed along the width of a large dam. One powerhouse may comprise a generator and a turbine which outputs electric power to long distance power lines. Once the water passes through the turbine, it is returned to the river downstream.

A variable torque generator (VTG) (called a VPG when varying power output) has been described in U.S. Pat. Nos. 8,338,481; 8,485,933; and 8,702,552 as well as PCT/US2010/042519 published as WO2011/011358 of Key Han, incorporated by reference as to their entire contents. The variable torque or variable overlap generator has one of an axially moveable rotor and/or stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another. When used in a power generator to regulate flow of power, the VTG is referred to as a variable power generator or VPG. When used in a torque generator and a power generator to regulate torque and flow of power, the generator is referred to as a variable torque and power generator or VT&PG. Torque and/or power are at a maximum when there is a maximum rotor/stator overlap.

In particular, there is described in, for example, WO2011/011358 or U.S. Pat. No. 8,338,481 (the U.S. '481 patent), the concept of measuring torque/rpm on an output shaft of a system such as a wind or river/tidal/ocean wave/ocean current turbine (which may be referred to herein as a marine hydrokinetic (MHK) turbine) for providing a constant output from a variable flow input. The measured torque/rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase with increasing wind or water flow and vice versa. This variable torque generator (VTG) process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

In either the '481 U.S. patent or the WO 2011/011358 printed publication documents directed to wind turbines, FIG. 1 is described as prior art and describes how gear boxes 108 connected to propellers can result in an expensive failure rate and replacement cost. This failure rate and replacement cost may be overcome by the recent deployment of a so-called magnetic gear which has no meshing of gears and the round components are separated by air gaps between permanent magnets so there is no meshing of gears and little to no maintenance. DDMotion has proposed a variable to constant speed generator, and FIG. 12 shows the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. In FIG. 13, the rotor and stator of the variable power generator are shown such that the rotor 1310 is directly coupled to the shaft 1320. "When the stator parts 1330(a) and 1330(b) are moved away from rotor 1310, a minimum input torque results. The operation of a control may be as follows via measuring a torque value stored in memory proximate to the maximum torque that a given rotor shaft 1320 may receive (a maximum allowable torque value), the stator parts 1330(a) and 1330(b) may be moved by a motor (not shown) to be in removed torque position or a position in between maximum and minimum torque positions whereby a close-to-maximum torque position may be achieved in relation to the measured torque and the maximum allowable torque (/rpm) value or value stored in memory."

Most of today's water/electric conversion is directed to hydroelectric dams, tidal influences and small rivers or canals. According to www.mecometer.com, the potential for development of electricity for large rivers is on the order of over one million megawatts in the USA. Also, the capacity for generating electricity using rivers in China is 1.1 million megawatts and that of the entire world over five million megawatts. So larger river and wind farms are not only economically viable, they represent viable renewable energy sources for powering the world without hydrocarbons, high cost and with low maintenance.

A hybrid solar concentrator is described by U.S. Published Patent Application No. 2017/0279406. The hybrid solar concentrator breaks up the solar spectrum into heat-producing frequencies and electricity producing frequencies. A motor controlled by a calendar and an input from a global positioning system may always keep the solar concentrator pointed at a source of light such as the sun or reflected light from the moon. Power generated is still variable and must be controlled to constant frequency and constant voltage.

Consequently, there remains a need in the art to provide applications of such a variable torque and power generator (VT&PG) assembly as well as two three variable spur/helical gear assemblies (Transgear gear assembly) called a Hummingbird gear assembly or a Goldfinch™ assembly and a constant speed motor in connection with the generation of electrical energy/power (variable torque and power generator, VT&PG) from renewable sources such as wind and river/tide/ocean wave/ocean current and solar devices, that is, a marine hydrokinetic or wind turbine electric power generator among other possible applications for generating electric power at constant alternating current frequency and voltage for an electric power grid for a small community (for example, in developing countries) or small industrial plant (for example, 25 kw capacity) or for powering the entire Mississippi river basin (several MHK turbines placed periodically along the length of the entire Mississippi river).

SUMMARY OF THE PREFERRED EMBODIMENTS

Embodiments of control systems for renewable energy electric power generation at constant frequency may involve the combination of first and second spur/helical gear assemblies called Transgear™ gear assemblies having a constant speed control motor for converting variable rotational speed to constant electrical frequency. In one embodiment, to reduce a requirement for generating power to run the constant speed generator, a conventional direct current generator may be used to generate power for running the constant speed motor and other purposes. Priority U.S. patent application Ser. No. 15/707,138 filed Sep. 18, 2017 suggests a commutator-less and brush-less direct current generator that is more efficient than known DC generators. Conventional or recent designs of a direct current generator for generating a constant rotational velocity may have outputs that may be used to regulate a Transgear spur/helical gear assembly or assemblies referred to herein as a Hummingbird variable to constant speed control apparatus driven by a renewable energy harnessing module so as to not require power be drained from an electric grid to operate a constant frequency alternating current generator at constant voltage.

A suggested application also may include application of a known variable torque and power generator (VT&PG) sometimes referred to as a Variable Overlap Generator (VOG) or variable power generator (VPG) for converting variable rotational speed to constant electric power grid alternating power frequency. The controlled or constant speed motor useful, for example, in wind and river/tidal/ ocean wave/ocean current (MHK) turbines along with the use of spur/helical gear assemblies of sun gears, sets of planetary gears and carrier gears and brackets referred to herein as Transgear™ gear assemblies or simply Transgear may be a known direct current constant speed motor (driven by the direct current generator referred to above) or alternating current constant speed control motor or both. No hatch control (water) or pitch (wind) control is needed.

The gears of a so-called Hummingbird speed control system may be buffered to a harnessing module by a known magnetic gear assembly available from Magnomatics Limited of Sheffield, UK. The magnetic gear assembly permits slippage between gears of a magnetic gearbox so that a gust of wind or sudden increase in water flow velocity will not damage gears of a gearbox or require the use of a clutch.

In wind and MHK turbines, a mechanical speed or frequency converter may be used for the purposes of adjusting the harnessed speed of the input which may be slow or fast depending on the rate of wind speed or river, tidal or ocean flow velocity with respect to a desired constant output speed (rotational velocity or electric power frequency) for generating electric power to be fed to an electric power grid. The embodiment of a variable speed converter has been constructed and samples are considered having three variables and different "Hummingbird" varieties of simpler and more complex forms constructed and tested. These Hummingbird control varieties of variable to constant frequency and voltage control all provide mechanical synchronization of variable input to constant output and efficient mechanical control of speed, operating at a multiple of 50 Hz (European) or 60 Hz (US) to generate constant voltage at constant alternating current frequency and the like.

As the three-variable spur/helical gear assembly called a Transgear gear assembly has developed over time from a Goldfinch control system to a first Hummingbird version described in priority U.S. patent application Ser. No. 15/267,655 filed Sep. 16, 2016, after simplification, may comprise two spur/helical gear assemblies combined and share a common shaft coupled to a renewable energy harnessing module with variable speed rotation. The two assemblies may be reduced in complexity to a single mechanical assembly with few moving parts as samples have been constructed and simplified. It is important to note that since a speed converter converts variable speed to constant speed and converts constant speed to constant frequency, DDMotion's speed converters may be called a mechanical frequency converter or a "rotary frequency converter" as is called in the industry to differentiate from an electronically controlled variable power converter or variable frequency converter (VFC) or variable frequency drive (VFD) which are less efficient and may break down easily.

In particular in wind and MHK turbines, it is suggested that there be an adjustment of the relative phase angular (radial) relationship between the rotor and stator in addition to the concept of adjusting the (axial) position lengthwise of a moveable rotor or stator in a variable torque and power generator (VT&PG) for variable torque and power or variable overlap generator (VOG) with variable input velocity (typically rotational speed) and desired output electric frequency and voltage. This concept is especially useful for mechanical speed converters for synching the phase angle of variable input with, for example, a desired constant output velocity (convertible to electric power frequency, for example, at 60 Hz US and 50 Hz European) and constant voltage (but variable current depending on the wind/water velocity).

A further practical application of VT&PG is to provide a reciprocating input to a fixed torque and power generator (FT&PG) sometimes referred to as a fixed overlap generator (FOG) for generating electricity with a reciprocating rotor. This concept eliminates a process of converting erratic motion of ocean wave energy, for example, to a rotary motion before generating electricity and may eliminate the need for Sprags from the speed converter(s) described in prior patent applications and patents of the present inventor, and reduces cost, weight, size, and potential validation time. A further purpose of a Sprag is to use a Sprag or an electro-mechanical control system to engage cam output to an output shaft. For the purpose of increasing the harnessed speed of reciprocating input or preventing the mechanical gearbox damage due to the sudden surge of power of reciprocating input, using magnetic gears or electromagnetic coupling instead of toothed gears may improve the durability of a gearbox without damaging the teeth. The magnetic gears of a magnetic gearbox (having no teeth) may intentionally slip (rather than break) in the event of a strong gust of wind or a strong water flow until a predetermined level of torque between magnetic gears is reached at which point the magnetic gears magnetically mesh with one another and do not slip (unless there is another strong gust of wind or strong water flow).

A further practical application of VT&PG is to use a VT&PG as a reactive speed controller by adjusting the torque or varying the load so that the waterwheel speed may be increased or decreased in a river/tidal/ocean wave/ocean current, marine hydrokinetic (MHK) turbine. In this embodiment, the VT&PG may increase or decrease torque by axially moving the rotor and stator relative to each other in MHK or wind turbines (or any variable load) for control of a waterwheel (or propeller/blades) or Hatch of such a MHK turbine. In a MHK turbine, the reactive torque control may be applied to control waterwheel speed until reactive control reaches a designed maximum and then Hatch control may be used for further waterwheel speed control with respect to desired output electrical power frequency and amount of current generated. A VT&PG may accept rotating or reciprocating input because the input change may vary positively or negatively from a reference value from an erratic energy source, for example, and may provide reactive control because the waterwheel reacts quickly to a load (or to a brake).

A variable torque and power generator (VT&PG) useful in all embodiments for controlling torque/rpm/power from a maximum to a minimum is shown in perspective view in FIGS. 3A, 3B and in a practical application in FIG. 5 of the priority '655 patent application, the figures showing rotor and stator coupled magnetically or electromagnetically for minimum and maximum overlap. (There may be an infinite number of positions between minimum overlap and maximum overlap in a VT&PG but minimum and maximum overlap positions are shown by way of example). The utilization of a variable torque and power generator (VT&PG) as shown in FIGS. 3A and 3B has been validated by the University of Maryland, Baltimore County, as a useful control device for controlling the torque, rotational speed, and power. When the available input torque at the cut-in speed is below the specified value to generate electricity, the VT&PG torque may be reduced, and when the provided input power is more than the specified rated power, the rated power of the VT&PG may be increased. In this case the power rating of the VT&PG has to be higher than the FT&PG (Fixed T&P Generator). Another way of using the embodiment is by adjusting the torque, the rotational speed of the harnessing device, a waterwheel or an assembly of wind rotor blades having parameters (such as propeller pitch or using a hatch) that may be controlled. For steady flowing streams and rivers, without much flow rate variation, a constant speed output can be easily produced by compensating the input. In wind and strong tide and ocean current turbine applications, considerable more control is required due to the more extreme variation, for example, in wind velocity from practically a calm wind to a high velocity storm wind so as to not break the meshed gear gearbox at the input. This may be rectified by using a magnetic gear comprising magnetic poles which will not breakdown. As shown in FIGS. 2A, 2B and practical application FIG. 6 of the priority '655 patent application, a magnetic gear of a magnetic gearbox 620 (replacing mechanical gears with teeth) may provide an input to a Hummingbird speed control converter to provide a high efficiency, high power, low maintenance electric power generating system which is also scalable to different capacity needs. Use of a constant speed motor may be used with the Hummingbird models to achieve the improvements to constant speed/frequency and voltage control.

In alternative embodiments shafts and rotors may be connected to a pump, transformer, engine, generator, transmission or other device or wind or river/tidal/ocean wave/ocean current (MHK) turbine as discussed above. Note that in an alternative embodiment a rotor may be moveable with respect to the stator if needed to achieve minimum, medium and maximum torque and power (and any position in between). These variable torque and power generators (VT&PGs) may be added to an input compensating speed converter, for example, to output electric power to a grid at constant frequency.

In MHK turbines, for example, the VT&PG may be used to advantage regulating output shaft rotational velocity to a constant value.

FIGS. 1 through 33B of the present application are provided by way of example to show the application of magnetic gears of a magnetic gearbox, a VT&PG (VOG) in an MHK turbine, output speed or electric current frequency control from variable to be relatively constant via a constant speed control motor and the various prototypes of Hummingbird three variable gear assembly embodiments (mechanical frequency converter) used to convert variable water and wind flow rates to match constant frequency and voltage rates for provision to an electric grid at varying water flow rates (wave action and tidal flow included) and wind flow speeds. In hybrid solar concentrator, a portion of sun energy is produced via known photoelectric cells while an infrared collecting portion of the sun energy may be used to drive steam turbines at variable speed so the present control apparatus and method may have application in solar systems. The constant speed motor of the Hummingbird control apparatus may be powered by the grid or use, for example, the commutator-less, brush-less DC generator as described above. The same principles may be applied to solar, wind and MHK turbines to obtain constant output rotational velocity or electric current frequency and voltage and to adjust propeller pitch in comparison to variable wind/water or solar renewable energy sources.

These and other embodiments will be described with respect to the drawings, a brief description of which follows.

BRIEF DESCRIPTION OF THE DRAWINGS

FIG. 1 provides a corresponding perspective view of an exemplary harnessing module for an MHK turbine 100, for example, located so as to receive water flow 110 from left to right in this embodiment and generate electricity. Many different harnessing modules have been discussed above that may be used to harness wind, river, tidal or ocean or solar energy. Harnessing module also refers to the capture of renewable wind energy via large wind turbines and propellers at varying wind speeds and directions and by solar/lunar energy concentrators. The variable output is provided to a controlling module 104 and a generating module 105 for generating electrical energy at constant frequency and voltage.

FIG. 2A and FIG. 2B, comprise drawings of a mechanical internal planetary gear assembly 205 and a magnetic gear assembly 210 for comparison and magnetic gear assemblies 210 manufactured by Magnomatics Limited, Sheffield, UK, wherein assemblies 210 comprise a high-speed magnet rotor (sun gear), a steel pole piece rotor (planetary carrier) and an outer magnetic array. Gear assemblies 210 may consist of two rings of permanent magnets with a ring of steel pole pieces in between. The steel pole pieces may act as magnetic flux paths from each of the rings of magnets. Field harmonics are created by each ring of magnets such that by careful selection of pole numbers, one can couple to the magnetic field creating a gear ratio the same as a mechanical epicyclical gearbox, with the outer ring of magnets normally held still. An advantage of a magnetic gear box is that it may intentionally slip and then grasp again when the magnetic gear box encounters high wind or water velocities above a current velocity, for example, when a thunderstorm hits or a high velocity gust of wind hits the propeller of a wind turbine.

FIG. 3A shows a perspective, cutaway view of a fixed overlap generator (FOG). The FOG comprises a fixed assembly of a rotor and stator wherein there is a fixed, maximum overlap between rotor and stator and the amount of torque generated (and output power) is at a maximum. A problem is that wind and water may vary in direction and speed. Also, water is heavier and so has the capability of creating more renewable energy, for example, in a river twenty-four hours a day and at a relatively constant river flow rate.

FIG. 3B shows a variable overlap generator (VOG) and how the rotor of a fixed overlap generator (FOG) of FIG. 3A may be moved axially away from the stator (or toward the stator per the arrow) so as to create less torque to better match input velocity to desired constant output velocity. For example, when wind speeds diminish, the harnessed wind energy is variable with the degree of axial overlap of rotor and stator at the fixed position of FIG. 3A to a minimum overlap position where the rotor does not overlap the stator and little torque is produced by the magnetic fields between rotor and stator. On the other hand, a wind propeller has little drag caused by the rest of the machinery referred to herein as a control and generating module. So a propeller will turn and generate energy even at low wind speeds with a VOG. The VOG is very useful in regulating output rotor speed in the event of variable input rotational speeds to be a constant rotor rotational speed.

FIG. 4A shows a top view of a brush-less and commutator-less direct current generator that is more efficient than known direct current generators and comprises a rotating shaft 410 for rotating a plurality of N rotating permanent magnets, 420-1 to 420-N, where N may be, for example, six or eight permanent magnets of fixed north/south polarity in relation to a stationary electric coil 430 of N coils which are electrically connected together to output a direct current voltage without using a rectifier or brushes and commutators.

FIG. 4B shows a side view of the direct current generator of FIG. 4A such that the magnetic field detected by the coils provides a direct current voltage output (VDC) as a result of the rotating permanent magnets of the same polarity.

FIG. 5A shows a block schematic mechanical diagram 500A of a harnessing module 510 (where the input 510 is variable water flow (MHK energy) or wind energy) connected to a controlling and a generating module 500A by a shaft 511 for producing at its output 570, for example, a constant U.S. 60 Hertz frequency, 110 or 220 volt AC current output 570 for local power or demand or variable power distribution. FIG. 5A shows demand or variable power generation without a grid (no need to take power from a grid to operate a constant speed AC control motor 550) or locally distributed generation of power. The shaft 511 from the harnessing module 510 drives a DC generator 516 (preferably a brush-less commutator-less DC generator as taught by the priority '138 patent application and FIGS. 4A and 4B). The DC generator 516 via voltage regulator 518 powers a DC motor 512 having a shaft extended to Hummingbird 520 and Transgear 525 mechanical controls for providing constant speed input. The Transgear 525 is also shown receiving control input from AC motor 550 which receives controlled power for constant output rotational speed tapped from output control box 540 based upon operation of a variable output generator (VOG) 560 per FIG. 3B. Consequently, the variable power/overlap generator (VOG) 560 with rotor 556 attached to shaft 555 (connected to Hummingbird 520 output) generates power at constant voltage and frequency for output to control box 540 and to output 570. The VOG 560 has a moveable stator 557 and provides an adjustment via shaft 530 and square thread 530A and block 530B for controlling the amount of rotor 556/stator 557 overlap of VPG 560 based on the input rotational speed of the harnessing module 510.

FIG. 5B shows demand or variable power generation using the grid for powering an AC constant speed motor 510 (receiving control input power from the electric grid 505) and AC motor 550 tapping power from control box 540 off the output of the VOG or VPG 560. The Transgear assembly 525 controls the movement of the rotor axially in relation to the stator 557 of the rotor 556 on shaft 555 via control shaft 530 for turning square thread 530A moving block 530B connected to the rotor of VPG 560 to vary the rotor/stator overlap based on the input rotational speed of the harnessing module 510. Otherwise, the operation of the Hummingbird 520 and Transgear 525 assemblies' control of FIG. 5B is the same as that of FIG. 5A. A constant 110 VAC output 570 may be output at a constant frequency of 60 Hz by operation of the Hummingbird 520 and Transgear 525 mechanical control in combination with the VPG/VOG 560.

FIG. 6 of the present invention shows a general layout of a river turbine with Hummingbird control including a harnessing module/controlling module/generating module 600 comprising a Hummingbird control 630 specific to a waterwheel 103 used as a renewable energy harnessing module 610 and, for example, a marine hydrokinetic (MHK) turbine including a Hummingbird control 630. The general layout 600 of an exemplary river turbine comprises a harnessing module 610 (which may be of a paddle wheel type such as FIG. 1 or any known water energy harnessing module discussed or known in the prior art) receiving variable speed river flow 110 for turning a shaft 615. A magnetic gear assembly 620 or other mechanical gear box helps match expected river rotational speed to a predetermined speed for running Hummingbird mechanical control 630. A spur/helical gear assembly (Hummingbird) mechanical control 630 comprising a combination of first and second Transgear assemblies 613, 614 develops rotational output via an input shaft 621 connected to the harnessing module 610 and a constant speed control motor 640 having its own shaft 641 as a control input to the Hummingbird Transgear assembly 613. The shaft 641 has a sun gear 642 meshed with the first spur/helical gear assembly 613 via sun gear/sleeve/sun gear extension gear 643 and an output gear 652 on shaft 651 meshed with a sun gear/sleeve/sun gear extension gear 653 of the second spur/helical gear assembly 614 for operating a generating module 670 of a controlling and generating (C & G) module 680 (620, 630, 640, 660, 670) for providing an output at constant electrical frequency and voltage 655 to a grid. An advantage is that the Hummingbird control 630, unlike an electronic variable frequency converter, has increased durability and no electronic circuits to fail. Moreover, river water flow may be more constant than wind speed, for example, three meters per second, and there is no variable overlap generator shown (but may be optionally used as may magnetic gears 620).

FIG. 7 provides a general layout of a river turbine developed for a sample #3 of an MHK river turbine 700. Harnessing module 701 for harnessing river flow or hydrokinetic energy 710 provides a rotating shaft 715 input to a mechanical gearbox 705 which may be magnetic or mechanical for matching a river speed caused rotational speed to a predetermined speed for input to a Hummingbird 710. Note that the sun gear/sleeve/sun gear extension gears may be moved to the right of each Transgear gear assembly 711, 712. The mechanical gearbox 705 outputs rotational speed to a control and generator module or C&G module 702 comprising a three variable Transgear Hummingbird control 710 or a mechanical frequency converter control assembly called Hummingbird (referred to herein as a mechanical frequency converter) comprising first and second side-by-side Transgear gear assemblies 711, 712 and a constant speed control motor 751 for controlling output velocity to a generator. In this embodiment, control motor 751 requires control input power, for example, from the grid 713 to power the constant speed control motor 751. Control motor 751 delivers constant speed to left Transgear assembly 711 via a sun gear/sleeve/sun gear extension disc located at the right of Transgear assembly 711. Generator 791 outputs constant frequency electric power generator output 720 at constant voltage to an electric grid or the generated power is used locally taking its output from a right sun gear/sleeve/sun gear extension gear of second spur/helical gear assembly 712 of Hummingbird 710. A mechanical or magnetic gearbox 705, in particular, is shown for replacing prior art mechanical gearboxes between the harnessing module 701 and the C & G module 702.

FIG. 8A provides details of how a three-variable side-by-side two Transgear control 800 (Hummingbird) operates to control rotational speed via a control input 820 and specifically shows the left Transgear 813 of two Transgear assemblies of a Hummingbird mechanical control. Left Transgear assembly 813 comprises three cross-hatched sections. An input shaft 812 is a variable speed input from a harnessing module 810 (not shown) and, if present, a gearbox or magnetic gear box (not shown). The input shaft 812 has a sun gear 815 of the left Transgear 813 which is integrally connected or attached to shaft 812 for providing the variable rotational input to the left Transgear assembly 813. Carrier assembly 825 is shown providing output 830 through its carrier gears. Output 830 receives a control input 820 comprising a sun gear/sleeve/sun gear extension disc (located on the left in this embodiment) surrounding variable input shaft 812, which sun gear/sleeve/sun gear extension disc provides the control input 820.

FIG. 8B provides details of how the right Transgear assembly 814 operates. The variable input 810 to the right Transgear 814 is provided by a second sun gear 816 of shaft 812 which, like the first sun gear 815, is integrally connected or attached to variable input shaft 812. The control input 840 is received via connecting gear 817 from left Transgear gear carrier gear assembly 825 or carrier output 830. Finally, the Hummingbird output 850 of the right Transgear is taken from the sleeve, sun gear, sun gear extension gear 850 cross-hatched from the input and control more tightly than the input or control input from lower left to upper right.

FIG. 9A shows a left half of a Hummingbird control 900 showing the variations of rotational speed at an input if a variable A number of revolutions per minute is added to an X revolutions per minute input rotational speed received at variable input 910 (the sun gear 815 of the left assembly 813 per FIG. 8A). If it is given that a control input via 920 is provided of −X revolutions per minute constant speed, then, the left Transgear output 930 to the connecting gear=′½ {(X rpm+Δ rpm)−X rpm}=′s ½ Δ rpm which is past via a white shaft (a connecting gear shaft to the right Transgear assembly).

FIG. 9B shows a right half of a Hummingbird control 900 showing the variations in rotational speed caused via the connecting gear from the left half (left spur/helical gear assembly of FIG. 9A). The input to the right half of the Hummingbird control is the same variable input received by the left half and is indicated as variable input 910 via the second sun gear 816 and =′s X rpm+Δ rpm (cross-hatched upper left to lower right). The control input 960 comprises a crosshatched carrier assembly from upper right to lower left received from the connecting gear 817. The output of the right half of the Hummingbird is the output of the Hummingbird 950 and =′s−(X rpm+Δ rpm)+2 [½ Δ rpm]=′s−X rpm and is taken from the sun gear extension disc of the sleeve/sun gear/sun gear extension disc lightly cross-hatched from upper right to lower left.

FIG. 9C shows a Hummingbird controlled MHK river turbine 900 with the combined steps of FIGS. 9A and 9B. Step #1 is identifying the variable and Step #2 is eliminating the variable so that the output may be constant.

FIG. 9D shows a black and white photograph of a rotary frequency converter 970 comprising a motor portion 972 and a generator portion 974 for converting a constant rotational speed input into a constant electrical frequency output.

FIG. 9E shows a schematic diagram of a basic river turbine having three sections: a harnessing module 810 for providing a variable rotational speed input (such as a waterwheel or paddle wheel having rotor blades), a controlling module 820 including a direct current generator 825 and a DC motor 972 for receiving the harnessing module 815 input. The DC generator 825 permits DC power generation (for example, per DC generator of FIGS. 4A and 4B) rather than use of grid power for powering a DC constant speed motor 972 of the rotary frequency converter. A generating module section 830 comprises a variable overlap generator (VOG) 974 receiving a controlled input from the DC constant speed motor 972 of controlling module 820 in order to provide an output to grid 850 at 60 Hz frequency depending on the variable renewable energy range captured by the harnessing module 810. When DC motor 972 rotates at a required constant speed, generator 974 will generate grid compatible constant frequency. The arrangement of DC motor 972 and generator 974 operates as a rotary frequency converter 845.

FIG. 10 shows a combination of FIGS. 9A and 9B comprising Hummingbird control 1000. Variable speed input 1010 of X+Δ rpm is received from a harnessing module (not shown) and is delivered to first sun gear 1015 of a first spur/helical gear assembly 1013 and to second sun gear 1016 of a second spur/helical gear assembly 1014 (loosely crosshatched from lower left to upper right). A control input 1020 of −X rpm is fed to a left sleeve/sun gear/sun gear extension disc of the first assembly 1013 (tightly cross-hatched from lower left to upper right). The output 1025 of the first assembly 1013 (½) ((X+Δ rpm)−X)+/2 Δ rpm (Transgear rule applied) is provided to a connecting gear 1017 for serving as a control input 1030 to a carrier assembly of the second Transgear assembly 1014 (loosely cross-hatched from upper right to lower left). The output 1040 of the second assembly is the Hummingbird output ((X+Δ rpm)−(2)(½ Δ rpm))=′s−X rpm (a constant speed), called herein and in priority patent applications as the Transgear Rule applied.

FIG. 11 shows an alternative embodiment of a Hummingbird control 1100. In this embodiment, there are left and right spur-helical gear assemblies as before connected by connecting gear 1135 but input sun gears 1137 and 1138 are located to the left side of each Transgear assembly. Input rotational speed 1101=′s (X+Δ) rpm as before. This is delivered to the first assembly via sun gear 1137 and to the second (right) assembly via sun gear 1138. The control input of the first assembly is delivered to sun gear/sleeve/sun gear extension disc 1151 as −X rpm (via a constant speed motor not shown). The output of the left assembly 1130 is provided by the cross-hatched carrier sections including but not limited to numbered planetary gear 1141A, double width pin 1142A, planetary gear 1141B and double width pin 1142B. The connecting gear 1135 delivers −the variable ½ Δ rpm to the second carrier gears 1131 loosely cross-hatched from upper right to lower left comprising 1143A, 1144A, 1143B and 1144B with the Transgear Rule applied. The Hummingbird output 1111 is via the right sun gear/sleeve/sun gear extension disc 1111 and =′s−((X+Δ)−½ Δ)=′s−X rpm which is the desired constant speed output (from the variable input) for producing a constant frequency electrical power.

FIG. 12A comprises a series of six steps (1) through (6) for simplifying a two Transgear assembly Hummingbird of FIG. 12A step (1) into a simplified Hummingbird assembly of FIG. 12A step (6) showing six steps of simplification of the first and second spur/helical gear assemblies and the connecting gear of FIG. 12A step (1).

FIG. 12A steps (1) through (6) show mechanical schematics of a Hummingbird control, mostly taken from the Hummingbird embodiment of FIGS. 8A and 8B combined showing two Transgear assemblies and a con-gear (the connecting gear) 1215 connecting the two Transgear assemblies seen in FIG. 12A step (1). The figures show how two Transgear assemblies forming a Hummingbird may be simplified in steps. The figures show how two Transgear assemblies forming a Hummingbird may be simplified in steps. Input 1221 from a harnessing module is a variable rotational speed turning an input shaft with first and second sun gears 815 and 816 as variable inputs to left and right assemblies of FIG. 12A step (1). There is shown an elongated connecting gear 1215 (three gears are attached to the shaft) meshed with gears 1230 of the first assembly and 1220 of the second assembly where the output of the first assembly is the control input of the second assembly (typically from a constant speed control motor in a renewable energy generator). The Hummingbird output is taken from right sun gear/sleeve/sun gear extension gear 830.

FIG. 12A step (2) shows the Hummingbird control assembly of step (1) with carrier gears (brackets) 1222A and 1222B attached together and the connecting gear 1215 has been removed.

FIG. 12A step (3) shows more than one change to the assembly of FIGS. 12A step (2). Pins 1223A and 1223B of step (2) are joined to make an elongated pin 1223 in step (3). The similar elongation occurs with the opposite, bottom pins of step (2). Also, it can be seen that first and second sun gears 815 and 816 of step (1) have been combined into one input sun gear 1217 which is meshed with a planetary gear 1225A of the first assembly and a planetary gear 1226A of the second assembly becomes part of the output 830 as in steps (1) through (3) as it is meshed with the right sun gear/sleeve/sun gear extension disc. The two center carrier gears (brackets) are removed.

FIG. 12A step (4) shows the meshing of planetary gears 1226 and 1225A rotated 180 degrees. Since planetary gears 1225A and 1226A are meshed to a common sun gear 1217, the two gears can be combined into one and will be shown in FIG. 12A step (5).

FIG. 12A step (5) shows an increase in diameter of sun gear 1217 of step (4) in step (5). At the same time, separate gears 1225A and 1226A are joined to make gear 1216. FIG. 12A step (5) shows some open space between left and right side of gear 1217.

FIG. 12A step (6) shows a collapsing of the two assemblies of step (5) into a more compact assembly with the outer planetary gears 1225A and 1225B pushed in and with reduced width. In step (6), three variables remain in cross-hatch. Input comprises input shaft 1221. Control is sun gear/sleeve/sun gear extension disc 1220 and meshed planetary gear 1225A, and output is sun gear, sleeve, sun gear extension disc 1230 and planetary gear 1225B (lightly cross-hatched lower left to upper right). Simplified Hummingbird controls are shown in FIG. 13, FIG. 16, FIG. 17, FIGS. 19 to 32; (with the larger width carrier gear on the bottom).

FIG. 12B combinations of function assignments, hereinafter, combinations (1) through (6), show how a simplified Hummingbird may comprise six combinations of function assignments to three variables: what may be an input, what may comprise a control and what may comprise an output. There are six different assignments 1200 shown, the first being shown in FIG. 12B combination (1).

FIG. 12B combination (1) shows in dark cross hatch a first variable input function performed by the left sun gear extension disc/sleeve/sun gear 1220. The control function is performed by the right sun gear/sleeve/sun gear extension disc 1230 shown in slightly lighter cross hatch. The output function is performed by the gear 1217 on the shaft 1221A.

FIG. 12B combination (2) shows that the input function has been continued in this variation of Hummingbird use to the left sun gear/sleeve/sun gear extension disc 1220. The control function is assumed by the cross-hatched gear 1217 on central shaft 1221A. The output function has been assumed by the right sun gear/sleeve/sun gear extension disc 1230.

FIG. 12B combination (3) shows that the input function is assumed by the central shaft 1221A and its sun gear 1217. The control function 1220 is assigned to the left sun gear/sleeve/sun gear extension disc. The output function 1230 is assumed by the right sun gear/sleeve/sun gear extension disc. Carrier gears 1218 do not assume any function and freewheel in combinations (1) through (3).

FIG. 12B combination (4) shows that the input function may be assigned to left sun gear/sleeve/sun gear extension disc 1220. Notice that, in combinations (4) through (6), the central shaft 1221A is white and is assigned no function. The control function is assigned to right sun gear/sleeve/sun gear extension gear 1230. The output function is assigned to carrier gears 1218.

FIG. 12B combination (5) shows that the input function 1220 may be assigned to left sun gear/sleeve/sun gear extension disc 1220. The control function may be assigned to carriers 1218. The output function may be assigned to right sun gear/sleeve/extension gear 1230.

FIG. 12B combination (6) shows that the input function may be assigned to carriers 1218. The control function may be assigned to left sun gear/sleeve/sun gear extension disc 1220. The output function may be assigned to right sun gear/sleeve/sun gear extension disc 1230.

FIG. 12C torque ratio (1) through FIG. 12C torque ratio (3) represent three different torque ratios of the Hummingbird control of FIG. 12B and show how sun gear and sun gear connecting gear diameter choice plays an important role in speed and torque adjustment by gear ratio, control of control motor speed and to set the number of poles of a generator.

FIG. 12C torque ratio (1) shows a same gear ratio, assumes a constant motor speed and a set number of generator poles. Notice that the diameter of all connecting gears connected to shafts have consistent same diameters. These connecting gears comprise con-gears 1245, 1220, 1230 and 1285. If the rotational speed of shaft 1240 is 1800 rpm then the rotational speed of left and right sun gear/sleeve/sun gear extension discs and shaft 1280 are all 1800 and the torque ratio is calculated as 1800/1800 or simply one for the gear train from 1245 to 1285. (There is no change in sun gear 1217 diameter of central shaft 1221A torque ratios (1) through (3)).

FIG. 12C torque ratio (2) shows an embodiment of a simplified Hummingbird control where the connecting sun gear (con-gear) 1255 has a diameter smaller, for example, by one-half than that of the left sun gear/sleeve/sun gear 1220 extension disc, in particular, the extension disc or gear which is much larger. For example, if the rotational speed of gear 1255 of shaft 1240 is 7200 rpm, then, the rotational speed of the left sun gear 1220/sleeve/sun gear extension gear (enlarged diameter) is cut in half or 3600 rpm. Furthermore, the right sun gear 1230 sleeve/sun gear extension disc may have a small diameter at one-half of the diameter of the large diameter connecting gear 1286 to shaft 1280 to a generator. In this example, the torque ratio is reduced from 7200/1800 or is ¼. In this example, also, the speed is cut in half again from 3600 to 1800 and the generator driven by shaft 1280 may have one set of poles. A more complicated example of increasing the number of generator poles and decreasing generator speed and torque ratio is shown in FIG. 12C torque ratio (3).

FIG. 12C torque ratio (3) has an added connecting shaft 1260 and connecting gear 1265 of a smaller diameter when compared with shaft 1270 and its right connecting gear 1275 such that the rotational speed of shaft 1260 if given as 1800 rpm is cut in half to 900 rpm rotational speed of shaft 1270. Left connecting gear 1278 of shaft 1270 is manufactured with a smaller diameter than connecting gear 1220, namely, sun gear/sleeve/sun gear extension disc 1220. Consequently, in this exemplary embodiment, the rotational speed of shaft 1270 when passed to the left sun gear/sleeve/sun gear extension disc is cut in half again to 450 rpm. Now, referring to right sun gear/sleeve/sun gear extension disc 1230 which has a small diameter extension gear meshed with large diameter connecting gear 1287 of generator shaft 1280, there is another halving of the rotational speed from 450 rpm to 225 rpm of generator shaft 1280. The torque ratio is calculated as 1800/225=⅛ and eight sets of poles will be used for a generator driven by shaft 1280

FIG. 13 shows a simplified Hummingbird control 1330 similar that of the simplified Hummingbird of FIG. 12F used in an MHK river power generator which may be called sample #3 consistent with earlier samples 1 and 2 such as Goldfinch control system using variable pitch cams described in a priority patent application. The control motor 1340 at upper right provides the constant speed control via its shaft and sun gear to a control input shown at upper left of simplified Hummingbird 1330 via a sun gear. The input shaft 1302 comes from the harnessing module 1310 and input is delivered via a middle sun gear (shaded similarly to the shaft 1302). The combined and simplified Hummingbird assembly 1330 connects to control motor 1340 shaft at the right meshed with a left sleeve/sun gear extension gear (shaded more darkly). The output from generator 1350 is provided to a sun gear of the generator shaft of generator 1350 at the left of the Hummingbird via right sleeve/sun gear extension gear. Control and generating module 1320 comprises Hummingbird 1330, control motor 1340 and generator 1350.

FIG. 14A is an embodiment of an un-simplified Hummingbird control that is most like the Hummingbird control 710 of FIG. 7 and comprises three cross-hatched sections for three variable control. Input 1410 (loosely crosshatched from lower left to upper right) is provided by a harnessing module to input shaft 1402 with left sun gear 1437 and right sun gear 1439 of first and second spur/helical gear Transgear assemblies. The control input 1420, for example, from a constant speed control motor is delivered to sun gear/sleeve/sun gear extension gear 1420 (tightly and darkly cross-hatched from lower left to upper right) while the output 1430 (lightly and tightly cross-hatched from lower left to upper right) is taken from the second right sun gear/sleeve/sun gear extension gear 1430. FIG. 14A may be schematically drawn as FIG. 14A(1).

FIG. 14B differs from FIG. 14A in that the left sun gear/sleeve/sun gear extension gear is located at the right side of the first Transgear assembly and may be schematically drawn as FIG. 14(B)1. The cross-hatching is the same and is from lower left to upper right for input 1410 via shaft 1402 and sun gears 1437 and 1439. The control 1420 is tightly cross-hatched from lower left to upper right and the output 1430 is lightly cross-hatched from lower left to upper right. Only two combinations are shown but two more are possible, where both sun gear/sleeve/sun gear extension discs are located on the left of their respective Transgear assemblies and an embodiment where both sun gear/sleeve/sun gear extension gears are located on the right of their respective Transgear assemblies.

FIGS. 14A(1) and 14B(1) show two different simplified schematics of the similar Hummingbird controls of FIGS. 14A and 14B with matching shading. In FIG. 14A(1) in comparison with FIG. 14A it can be readily seen that input 1410 is delivered to the same sun gears 1437 and 1439 shown in spaced lower left to upper right crosshatch. Control 1420 is shown delivered to a first tightly cross-hatched triangle facing a mechanical lead to the second sun gear input 1439 and the output 1430 taken from triangle 1430.

FIG. 14B(1) may be described as a center feed where the input 1410 is provided to both sun gear triangles 1437 and 1439. The control 1420 comes from the left to meet input 1437 and is connected by mechanics to the pair of triangles including the output 1430 taken from the right sun gear/sleeve/extension disc of FIG. 14B.

FIG. 15A is a representation of a view of a DDMotion wind turbine with the propeller (rotor blades) not shown but having the control components comprising a magnetic gear box to withstand heavy winds and changing wind speeds. There is a speed converter S/C from variable wind speed to a more constant rotational speed and a variable overlap generator (VOG) shown to regulate and generate the more constant rotational speed to a constant frequency electrical output.

FIG. 15B shows a magnetic gear that permits slippage manufactured by Magnomatics of Sheffield, UK used between the propeller shaft and the input shaft to a Hummingbird or similar mechanical control.

FIG. 15C(1) shows a so-called Goldfinch control (speed converter S/C of FIG. 15A) first shown in priority patents and patent applications incorporated herein by reference of Key Han. The Goldfinch control is seen to be more complex in assembly than the simplified Hummingbird of FIG. 15C(2).

FIG. 15C(2) shows a simplified Hummingbird control (speed converter S/C of FIG. 15A) with an input shaft, a control and an output sun gear/sleeve. FIG. 15D shows the third component of FIG. 15A which is a variable overlap generator (VOG) with a rotor which is controlled to axially move from a fixed position within a stator to a distant position axially along a rotor shaft to a position of minimum overlap and minimum speed to further control speed conversion to constant electrical frequency.

FIG. 16 is a simplified layout of a river or wind turbine using a simplified Hummingbird control similar to FIG. 12F (rotated 180° to show control motor 1640 at the top and generator 1650 at the bottom). A harnessing module 1610 provides a variable speed input 1611 to a gearbox or magnetic gear assembly 1620 for matching expected rotary speeds of the harnessing module to a rotational velocity that may be delivered to an input shaft 1621 of simplified Hummingbird 1630. Control input shaft 1641 receives a constant speed control input from control motor 1640 which may receive direct current or alternating current 1645 via a generator (not shown) of the harnessing module or from a grid. The simplified Hummingbird 1630 delivers a constant speed output 1651, and the variable input 1621 to a VOG or FOG 1650 which delivers output power 1655 to a grid or some of the output power can be used to power the control motor 1640 where the controlling module is 1660 and the generating module is 1670 while the combined control and generating module 1680 combines 1660 and 1670 including Hummingbird control 1630, gearbox 1620 and control motor 1640 and VOG 1650 (generating module 1670). The output power 1655 should be a multiple of the power used to run control motor 1640 if the harnessing module is delivering an expected level of renewable energy from input water flow or wind speed.

FIG. 17 provides an example of constant output power amplification from a 0.8 megawatt control motor to, for example, an eight megawatt generator output power (a multiple of approximately ten as an example) when the variable power comprising renewable energy from harnessing module 1710 is providing greater than eight megawatts. The greater the wind velocity or the water flow rate through a harnessing module, the more likely a constant output ten times (more or less) the constant control motor requires is achieved. Harnessing module 1710 may be a river paddle wheel receiving a river flowing at three meters per second which can produce about eight megawatts of renewable energy. As a result, the generator 1750 may output eight megawatts and use only 0.8 megawatts of grid power 1745 to control simplified Hummingbird 1730.

FIG. 18 is a collection of graphs showing wind (or similar to water) speed in meters per second on a horizontal axis versus wind frequency at the required speed in hours per year on the left vertical axis. If a variable overlap generator (VOG) is used with wind power, for example, one may harness more energy from the wind (or water) using a mechanical Hummingbird. The object is to reduce the cut-in speed of turning the harnessing module (for example, a wind propeller) in low winds or increase the rated speed so as to gain more rated power at the output. If the cut-in speed and the rated power are improved, then, the cross-hatched area shown of actual harnessed energy is improved as well, labeled in bold "More Energy." With minimum overlap of a rotor and stator of a VOG, a propeller (or waterwheel) will start turning sooner than if a fixed overlap generator is used and the lower cut-in speed results in a higher rated power. The overlap of rotor and stator of a VOG will be maximized at the cut-out speed and harness more power acting as a larger generator.

FIG. 19 shows a power amplification and generation embodiment 1900 using grid power 1945 to power an eight megawatt control motor at constant speed as a control input to Hummingbird 1930. An input rotational speed 1921 which may be valued at eighty megawatts or greater due to a high velocity water current or propeller speed wind velocity may permit a generator 1950 output 1955 rated at approximately eighty megawatts when the system is amplifying approximately ten times.

FIG. 20 shows a distributed generation (stand-alone) without using grid power or using self-generated power with a DC generator 2060. DC generator 2060 delivers its generated constant direct current to DC control motor 2040 serving as the control constant speed input to simplified Hummingbird 2030. Input shaft 2021 from a harnessing module 2010 or gearbox 2020 may be extended to the DC generator 2060 having an associated charge controller 2070 and battery to regulate the DC generator output to constant voltage direct current and store power in a battery 2080. DC motor 2040 may thus operate at constant speed and receive constant power from the harnessing module 2010. Constant speed AC generator 2050 receives output of the simplified Hummingbird controller 2030 and delivers constant voltage 2090 at constant frequency. The DC generator 2060 may be brush-less and commutator-less and taught by FIGS. 4A and 4B.

FIG. 21 is very similar to the circuitry of FIG. 20 except that FIG. 21 shows amplification of the constant output power of DC control motor 2140 at constant speed operating, for example, at 0.8 megawatts of power. Assuming the harnessing module 2110 is either a large wind turbine operating in high wind speeds or a water-driven module operating in a fast-flowing river at three meters per second or higher water flow rates, then, an amplification of the constant speed DC motor at 0.8 megawatts may result in an addition of AC power at output 2155 to eight megawatts when the amplification rate is one to ten.

FIG. 22 is very similar to the circuitry of FIG. 21 except that DC generator 2260 takes eight megawatts of renewable energy to generate eight megawatts of constant speed output as DC control motor 2240. Because of the high river flow rate or high wind speed expected from harnessing module 2210, it is expected that alternating current generator 2250 is capable of delivering approximately eighty megawatts of output power 2255, for example, to an electric grid.

FIG. 23 is very similar to the circuitry of FIG. 22 and generates the same amplified output of approximately eighty megawatts DC via constant speed DC generator 2350. The control constant speed motor, however, is an AC control motor 2340 operating at constant speed and driven by power taken from an input shaft from a harnessing module 2310 via a variable speed AC generator at eight megawatts and regulated to constant frequency alternating current by a known power converter for converting AC to DC and then inverting the direct current back to constant frequency alternating current to AC control, constant speed motor 2340.

FIG. 24 shows a placement of variable speed generators 2460-1 and 2460-2 in parallel to tap, for example, sixteen megawatts of power captured from a renewable energy source such as wind or water via harnessing module 2410 which thus permits an alternating current control motor 2440 to operate at sixteen megawatts and the constant speed alternating current generator to deliver, for example, approximately one hundred sixty megawatts of AC power at constant frequency. Please note that the amplification ratio used for the control motor to the generator is approximately one to ten.

FIG. 25 shows another example of generation of constant frequency AC power at a large value such as output 2555 at approximately eighty megawatts and constant voltage also generated by tapping eight megawatts of renewable energy harnessed by the harnessing module 2510. In this example, a variable speed generator 2560 at eight megawatts rated power delivers eight megawatts of variable frequency alternating current to a modified power converter (AC to DC) for converting variable alternating current frequency to direct current for operating constant speed direct current control motor 2540 at eight megawatts.

FIG. 26 shows how variable speed generators and modified power converters, for example, two each, 2660-1 and 2660-2 and 2675-1 and 2675-2 may tap sixteen megawatts of direct current constant voltage in parallel for operating a sixteen megawatt direct current control motor 2640 at constant speed for controlling simplified Hummingbird 2630. The output alternating current generated at, for example, a constant sixty Hertz and 110 or 220 volts may be approximately one hundred sixty megawatts. The point of FIGS. 20 through 26 is that the output power controlled by a simplified Hummingbird or a two spur-helical gear assembly Hummingbird (not shown) may be scalable; (one hundred sixty megawatts is not the upper limit possible from a renewable energy harnessing module). An upper limit may be in the hundreds of megawatts or even larger. The output power controlled by a Hummingbird control embodiment of the present invention depends on the renewable energy captured by an appropriately placed harnessing module, for example, on the top of mountains, as a large river such as the Colorado River narrows increasing river flow rates through a canyon, placement of wind turbines off-shore or on the Antarctic continent or large ocean turbines planted in the Gulf stream or other constant current. Off-shore high wind turbines of large propeller size and use of high river currents which may flow from, for example, a dam spillway are further examples of larger renewable energy sources that can scalably capture large amounts of renewable energy.

FIGS. 27 through 29 show further examples of use of a three variable Hummingbird control in, for example, vehicular transmissions, pumps and compressors.

FIG. 27 provides a mechanical schematic block diagram of an infinitely variable transmission (IVT) which may be driven by an internal combustion engine or a hybrid engine (for example, a Toyota Prius automobile), a boat engine or a truck tractor such as a vehicular engine 2710. Engine 2710 (for example, of a large diesel-powered truck tractor) provides a power source 2710 of hundreds or thousands of horsepower as may an ocean liner comprising a plurality of large engines. The engine torque and speed of rotation may be variable (depending on the pressure placed on pedal 2745 and delivered via speed/torque control 2750). The output of engine 2710 may be provided via a gearbox or magnetic gearbox 2720 to a direct current generator 2720 driven by shaft 2721 extending from the gearbox 2720 to an input of the simplified Hummingbird control 2730. Meanwhile, some of the engine power is tapped and, for example, stored at a battery 2730 and output via speed/torque control 2750. The battery 2730 input is regulated by charge controller 2725 and speed/torque control 2750 operates a constant speed direct current control motor 2740 as a control input to simplified Hummingbird 2730 via shaft 2741 as well as the Hummingbird receiving direct current input from DC generator 2720. Applying pressure to pedal 2745 operates speed/torque control 2750 which provides a speed control of engine 2710, an input to battery 2730 and provides tapped power from DC generator 2720 via charge controller 2725 and battery 2730 and speed/torque control to power DC control motor 2740 at continuous voltage providing continuous speed control to simplified Hummingbird 2730 via shaft 2741. The output of simplified Hummingbird 2730 is shaft 2751 which delivers output power 2750 to drive, for example, vehicular wheels or boat engine propellers via shaft 2751. The principles of using a simplified Hummingbird control may also be applied for delivering power to turn wheels of a vehicle or propellers of a boat per FIG. 28 that is powered by electricity. Briefly, speed/torque control 2750 may comprise a programmed computer processor and memory for storage of input data from a plurality of sensors including but not limited to GPS location sensors, accelerometer/gyroscope sensors of vehicle position with respect to gravity, wind speed and direction sensors, weather sensors, torque sensors and rotational speed sensors, not shown, and an algorithm for matching engine torque to wheel speed depending on driver pedal and sensor input.

FIG. 28 provides a mechanical schematic block diagram of an infinitely variable transmission (IVT) which may be driven by an electric motor such as a vehicular motor 2810 of an electric powered vehicle or boat. Motor 2810 (for example, a motor of a Tesla or a hybrid Prius) provides a power source 2810 of hundreds of horsepower. The motor torque and speed of rotation may be variable (depending on the pressure placed on pedal 2845 and delivered via output of speed/torque control 2835 to electric power source motor 2810. The output of motor 2810 is provided via a gearbox or magnetic gearbox 2820 to an input shaft 2821 of simplified Hummingbird 2830. Direct current control motor 2840 has a control shaft 2841 extending from the DC control motor 2840 to a control input of the simplified Hummingbird control 2830 via shaft 2841. DC control motor 2840 receives a fraction of battery power delivered by battery 2830. Because the vehicle or boat is powered by electricity from battery 2830 and according to pressure on pedal 2840, the battery power is provided via speed/torque control 2835 to operate DC control motor 2840 and is mostly delivered to power electric power source/engine 2810. Meanwhile, speed/torque control 2835 operates a constant speed direct current control motor 2840 as a control input to simplified Hummingbird 2830 via shaft 2841. The Hummingbird also receives direct current rotational speed from gearbox 2820 of electric motor 2810. Simplified Hummingbird 2830 provides output to output shaft 2851 as output 2850 for driving wheels of a vehicle or turning propellers of a boat. Briefly, speed/torque control 2835 may comprise a programmed computer processor and memory for storage of input data from a plurality of sensors including but not limited to GPS location sensors, accelerometer/gyroscope sensors of vehicle position with respect to gravity, wind speed and direction sensors, weather sensors, torque sensors and rotational speed sensors, not shown. These sensors provide data for use by an algorithm of speed/torque control 2835 to determine a control input to DC control motor 2840 that is continuously varying depending on user input via pedal 2845 and sensed speed/torque and other sensed data.

FIG. 29 exemplifies the use of a Hummingbird three variable control 2930 in an infinitely variable pump or an infinitely variable compressor driven by a motor 2910 which comprises a power source (for example, AC) for the compressor or pump via input shaft 2921 to an attached input sun gear of the simplified Hummingbird 2930. Compressor/pump embodiment 2900 may have an alternating current source of power 2905 which is mostly delivered to motor 2910 for driving input shaft 2921. The left sun gear extension disc/sleeve/sun gear of simplified Hummingbird 2930 receives control provided, for example, via a thermostat 2970 and using some of the AC power 2905 delivers power to a control motor 2940 regulated by the thermostat 2970. Control motor 2940 provides the control input via shaft 2941 to left sun gear extension gear/sleeve of simplified Hummingbird 2930. The output of simplified Hummingbird control 2930 is provided via right sun gear extension disc/sleeve to output shaft 2951 as output 2950 to a pump or to a compressor.

FIG. 30 shows a schematic of a simplified Hummingbird 3030 in a renewable energy embodiment showing Hummingbird control of a local embodiment which uses the renewable energy to operate a DC control motor 3040 at constant speed and may produce an output dependent on the value of the input renewable energy, for example, fifty megawatts of alternating current power at constant frequency and voltage via an alternating current generator 3060. Harnessing module 3010 is expected to capture fifty megawatts of renewable energy power, for example, wind, river, tidal or wave energy. The water or wind drives a harnessing module 3010 which may comprise propellers, paddle wheels, wave motion capture modules and reversible paddle wheels or propellers, for example, with fins or the like to cause the harnessing module to face the wind or water at all times or to be reversible and capture the tide when it goes out and when it comes in. Harnessing module 3010 provides an input via an extended input/Hummingbird shaft 3021 having a sun gear (unnumbered) which turns both the Hummingbird input and delivers some energy to a direct current generator 3055 as described above which may be brushless and commutator-less. Control motor power generated by the DC generator 3055 may be variable and regulated to a constant by a voltage regulator 3050 and stored in a battery 3045. The rated constant direct current output of the control power may, for example, be five megawatts for operating DC constant speed control motor 3040 which power is delivered to left sun gear extension disc/sleeve of the simplified Hummingbird. The regulated output at constant alternating current frequency and voltage of AC generator 3060 may be rated at approximately the input harnessed power of fifty megawatts and is taken from the right sun gear extension gear/sleeve of the simplified Hummingbird 3030.

FIG. 31 shows an example of doubling the generation of control power for tapping off ten megawatts of renewable energy and operating a ten megawatt direct current control motor 3140. As a result, approximately all of the greater than one hundred megawatts captured at the harnessing module 3110 is deliverable as constant frequency, constant voltage and a rated power output of one hundred megawatts at the Output of AC generator 3160. This principle of increasing the number of direct current generators and voltage regulators in parallel and use of a battery 3145 for direct current power storage may be multiplied to three or more units (from the two parallel units shown) for permitting larger and larger direct current constant speed motors 3140 if the renewable energy that can be collected exceeds hundreds of megawatts of power.

FIG. 32 provides a layout of a modularized, simplified Hummingbird control system that may be used generically for generating power dependent on a value of harnessed energy. A harnessing module 3210 is not shown but may comprise any embodiment for capturing renewable energy such as wind and water power. The harnessing module may receiver tidal, ocean wave, river, dam spillway, or other water power left to the imagination of the user of the present invention or any form of wind energy delivered by a windmill, a wind turbine or wind paddle wheel or any other wind energy harnessing module left to the imagination of the use, a simplified Hummingbird control system 3280 consisting of three variable and optionally providing a further regulation of variable speed versus constant frequency via a fixed or variable overlap generator 3290 (details not shown). Starting at the lower left, a harnessing module 3210 provides variable rotational input to an input shaft of a bevel gear assembly portion of a mechanical control box 3220 providing input angle adjustment and the ability to turn input power ON and OFF by disengaging the right sun gear of a Transgear assembly from a spur/helical gear assembly having orthogonal input shafts at right angles to one another. A depicted horizontal input shaft provides harnessed input renewable energy collected, for example, from water and wind to an input of a Hummingbird 3280 via a control power generator 3230. The extension of the horizontal input shaft delivers harnessed variable energy to an input gear box 3285 to the Hummingbird 3280. An electrical grid input 3240 is delivered to an electronic control box 3250 which is capable of either taking alternating current power from the grid or direct current power from the harnessed DC power output of input and control motor 3270 powered by battery 3260 and deliver sufficient direct current power to power constant speed control motor 3270 via the grid or with the assistance of a harnessed direct current battery 3260. The constant direct current power output of the control box 3250 and battery 3260 powers constant speed DC control motor 3270. DC control motor 3270 delivers constant speed and constant power input via control shaft to simplified Hummingbird 3280 via control shaft and attached sun gear meshing with right sun gear extension gear/sleeve/sun gear of simplified Hummingbird 3280. Input gearbox 3285 meshes with a carrier assembly of Hummingbird 3280 and, regulated by control, the Hummingbird produces output to a FOG or a VOG 3290 for further regulation of variable speed to electric frequency as needed. The FOG or VOG 3290 outputs harnessed power as electrical power at constant frequency and voltage at the Output only reduced to the extent some power is tapped to run control motor 3270 at constant speed.

FIG. 33(A) shows a top view of a wave (for example, an ocean wave) harnessing module and FIG. 33(B) shows a side view of the same harnessing module but additionally showing a control and generating module 3340 which may generate harnessed energy to an electric grid at constant electric frequency and voltage and at a power rating equivalent to the value of harnessed energy. The harnessing module 3301 comprises opposite polarity magnets to those of a spherical assembly surrounding a coil. As the S magnets are moved by a wave up and down and around the spherical coil and N polarity magnets, electricity is generated at variable frequency in the coil via the hook, web and billow design. The coil delivers the generated variable electricity to a control and generating module for conversion to constant voltage (and frequency, if AC generation).

FIG. 33(A) provides a top view of a harnessing module 3301 for an erratic motion energy such as a wave motion generator having a stator coil 3310 at the center and, following Faraday's law, with surrounding moveable rotor permanent magnets 3320-1 through 3320-N where there is a permanent North pole closest the coil 3310 and the South poles comprise a plurality of coils equally spaced about the North pole and the stator coil. In this example, the number of permanent magnets is, for example, eight sets, but may be any number from four to sixteen.

FIG. 33(B) is a side view of both the harnessing module 3301 and a control and generating module 3340. The harnessing module of FIG. 33(A) comprises a circular wing and ball and socket (best seen in FIG. 33(B)) such that permanent magnets 3320-1 through 3320-N, for example, having an S magnetic polarity and may move in any direction, for example, from water wave motion represented by the outer circle including hooks 3330-1 through 3330-4. A plurality of four hooks 3330-1 through 3330-4 are shown by way of example for the outer circle (wing and socket) feeding power to grid 3350. FIG. 33(B) shows the harnessing module 3300 in greater detail with the wing (web) and socket ball shown in cross-section. The web may move with wave motion such that the S/N interaction creates a magnetic field to change in Coil harnessing wave energy as electrical energy of variable frequency. The control and generator module 3340 which may comprise any of the control and generator modules discussed above including a Hummingbird control. The wave energy generator delivers power to a grid 3350 at constant frequency and voltage. Regarding the socket in particular of FIG. 33(B), the socket may be seen to be bowl-shaped (without the bottom) and comprise the, for example, four or eight sets of S magnets which move about a coil 3310 due to wave motion which coil 3310 picks up the generated EMF and delivers the EMF generated to the C and G module 3340 (control and generating module) for output to grid 3350.

FIG. 34 provides a further mechanical block diagram 3400 of a Hummingbird control 3430 that may comprise a hydroelectric turbine having an alternating current control motor 3440 powered by an electrical grid for producing a constant rotational velocity. A hydro-electric harnessing module may be installed at a penstock, tail races, spillways (usually associated with a dam) and operate during designed or non-designed for levels of dam water. Examples includes storm weather, draught conditions and the like. Input rotational speed of shaft 3421 from the harnessing module designed for hydro-electric harnessing provides an input to drive a Hummingbird control 3430. Control input of a predetermined level of constant power is provided by grid to an AC control motor connected to the left sun gear/sleeve/sun gear extension gear of the left Transgear assembly. Alternatively, a portion of generated power from constant speed generator 3450 may power the AC control motor 3440. Control (from AC control motor 3440) is provided to the left sun gear/sleeve/sun gear extension gear of the Hummingbird 3430 used. Output to the grid (which is a multiple of the control input taken from the grid) is taken from the right sun gear/sleeve/extension gear of the second (right) Transgear assembly operating a constant speed generator 3450 operating at a desired electrical alternating current frequency. Where water level is low during winter/spring season, a Hummingbird can still increase the capacity factor and generate more electricity.

FIG. 35A provides a mechanical block diagram 3500 of a system for use with a harnessing module 3510 comprising solar panels (photelectric cells, for example, which generate direct current electricity from light energy). A plurality of solar panels 3510 may be connected in parallel and deliver at the output of the harnessing module 3510 a multiple of the electricity generated by just one solar panel. The captured electrical energy of the solar panels 3510 may be delivered to an automatic voltage regulator 3520 in combination with at least one battery 3525 for storing electricity during peak solar energy times and discharging during non-peak periods (such as at night). Batteries 3525 or automatic voltage regulator 3520 provide constant voltage direct current to a constant speed direct current motor 3530 which outputs a constant rotational speed via a joining shaft to constant speed generator 3540. The constant speed generator 3540 in turn will typically be an alternating current constant speed generator 3540 for generating constant voltage at constant frequency to the grid 3545 or the output may be used locally to run a DC or an AC system such as an industrial facility (distributed generation).

FIG. 35B shows a further speed converter-controlled solar turbine 3550 with or without use of grid power. A control box 3575 controls the constant speed AC control motor 3570 and the variable speed DC motor 3565 so that variable solar electric input from the solar panels 3560 is distributed as variable power to variable speed motor 3565 and some power is used to drive AC control motor 3570 at constant speed in case grid power is not available. The harnessed electric power from typically photoelectric conversion by solar panels 3560 is regulated to constant frequency by constant speed AC generator 3580 and output to grid 3595. Control motor 3570 can be a DC motor when grid power is not available. This optional embodiment does not require batteries if electricity is generated during the period when the sun is available.

FIG. 36 provides a further mechanical schematic diagram of a concept (similar to a concept discussed earlier with reference to FIG. 23) of using variable speed generators and power converters connected in parallel to be able to capture as much energy as possible from the harnessing module 3610. Variable energy may be water or wind and so a harnessing module of variable energy 3610 may have a wind or river flow that may be buffered from high winds or extreme water flow conditions by a gearbox or a magnetic gear system 3620, the latter slipping if, for example, a wind turbine propeller is hit by a sudden gust of extreme winds. While only two pairs of variable speed generator and power converter are shown, a pair comprising, for example, variable speed generator 3660-1 and power converter 3670-1, there may be as many pairs connected in parallel as will support the capture of as much energy as possible from harnessing module 3610. A variable speed generator 3660 accepts variable rotational speed input from gearbox 3620 and feeds generated electricity to an associated power converter 3670 which delivers power at a desired constant frequency to a local output (for example, an industrial plant) or to a power grid.

FIG. 37 is similar to FIG. 36 and yet different in that the concept is connection of a plurality of variable speed generator and power converter pairs directly to the output shaft of the gearbox 3720. Note that the effective energy collected is distributed evenly between the two pairs so half the energy goes to the first pair and half to the second, connected in parallel, each to the shaft output of the gearbox 3720. So the two pairs of variable speed generator and power converter can handle and distribute the power received to the grid or for local use, each pair restoring half the received energy via the gearbox 3720. As shown, both shafts of the variable speed generators 3760-1 and 3760-2 are connected to the gear output of the gearbox or magnetic gear 3720. This arrangement will also generate more electricity and utilize plural variable speed converters. The arrangement is limited in reality to about three or four variable speed generator tapping harnessed rotational energy off the shaft output of the gearbox 3720 because realistically, there is not sufficient space for more than about four generator sun gears to mesh with gearbox 3720 shaft. Multiple sets of a generator and a power converter may be connected in parallel to produce more output.

FIG. 38 shows an example of increasing the power rating of the DC Control Motor 3840, for example, from four megawatts to eight megawatts by connecting pairs of automatic voltage regulators (AVRs), such as 3850-1, with variable speed generators, such as 3860-1, in parallel such that twice the rotational energy in may be used to provide power to the DC control motor such as 8 megawatts. A multiple of ten being approximate, the output of a constant speed generator 3850 fed to an Output may be eighty megawatts via simplified Hummingbird 3830 given that at least eighty megawatts of energy is captured by harnessing module 3810.

FIG. 39 provides an example of utilizing multiple DC generators paired with automatic voltage regulators, series connected pairs connected in parallel and run by a common input shaft from harnessing module 3910 through simplified Hummingbird 3930 (with no gearbox shown but optionally used) so that DC control motor 3940 receives all the DC power at constant voltage DC available or required by the motor 3940 with the bulk of the harnessed energy operating a constant speed generator 3960 for output to a local use or to a grid at constant frequency and voltage. While only two pairs are shown, there may be a third or fourth pair of generator and regulator sharing incoming shaft coupling the harnessing module with the Hummingbird 3830.

These and other embodiments of a Hummingbird control and applications thereof may be suggested by the following detailed description of the invention.

DETAILED DESCRIPTION

In the figures of the present embodiments of the invention comprising FIGS. 1 through 39, an effort has been made to follow a convention such that the first reference number such as 1XX indicates a figure number where the element first appears, for example, Hatch 102 first appearing in FIG. 1. Similar reference numerals XX are intended to be used in the Figures to represent similar elements or components of drawings. For example, in FIG. 5B, component 510 where 10 is XX, represents a harnessing module as, for example, so does component 610 of FIG. 6.

Referring now to FIG. 1, FIG. 1 provides a corresponding perspective view of an exemplary MHK river turbine 100, for example, in particular, a harnessing module, located so as to receive water flow 110 from one direction (such as left to right) and generate electricity via a generator (not shown) component of a Control and Generating Module (C & G Module) 105 attached to the output shaft 105 of the gear box and mechanical control 104 leading to the C & G Module 105 (not shown). The MHK river turbine 100 may have a sloped block 101 for channeling the water flow 110 toward a hatch 102 which is shown in a partially closed position with respect to a waterwheel 103. The waterwheel 103 will turn more freely if the hatch 102 is fully open and exposes the waterwheel 103 to the entire water flow. In some embodiments, the hatch 102 may close to prevent damage to the waterwheel 103 during emergencies such as being hit by debris or excessive rotational speed or controlled by a water flow sensor and control system such as a Goldfinch or Hummingbird to a more constant water flow rotational speed on an output shaft of the gearbox 104. A Hummingbird or Goldfinch control is not shown but may be considered part of the mechanical controls 104.

Referring again to FIG. 1, a ramp called ramp block 101 receives water flow 110, and the water flow may be channeled over a horizontal plane (between block 101 and hatch 102) where hatch 102 is shown in a partially closed position to allow the water flow to turn waterwheel 103. A gearbox and controls 104 (the controls of a C & G module) may comprise a special purpose programmed controlled processor in combination with a mechanical frequency converter or three variable speed converter control such as a Hummingbird and/or a variable torque and power generator such as a VOG may regulate the variable rotational velocity of a shaft of waterwheel 103 to a desired constant rotational velocity of output shaft 105 for driving an electric generator 105 (not shown) for feeding power to an electric power grid. As described below, this MHK turbine may be controlled in the manner described with reference to FIGS. 3, 4, 5, 6, 7, 8, 9, 11, 12, 13A-13C and 18 of the allowed '655 patent application and FIGS. 5, 6, 7, 8, 9, 10 and 11 of patent application U.S. Ser. No. 14/838,867 filed Aug. 28, 2015, now U.S. Pat. No. 9,476,401 and incorporated by reference as to their entire contents.

Referring again to FIG. 1 of the '655 patent application, FIG. 1 may show channeling the water flow toward a hatch 102 via guide fins (not shown) or protector ribs (not shown) where the hatch 102 is shown in a partially closed position with respect to a waterwheel 103. The waterwheel 103 will turn more freely if the hatch 102 is fully open and exposes the waterwheel 103 to the entire water flow and the guides help direct the water toward the waterwheel and increase the water flow speed. Meanwhile, the protector ribs (not shown) may protect the waterwheel form damage by floating debris.

FIG. 2A and FIG. 2B, comprise drawings of first mechanical internal gear planetary gear assembly 205 in FIG. 2A and second Magnetic Gear Assembly 210 of Magnomatics Limited, Sheffield, UK, in FIG. 2B wherein Assembly 210 comprises a high speed magnet rotor (sun gear), a steel pole piece rotor (planetary carrier) and an outer magnetic array. Assembly 210 consists of two rings of permanent magnets with a ring of steel pole pieces in between. The steel pole pieces act as magnetic flux paths from each of the rings of magnets. Field harmonics are created by each ring of magnets such that by careful selection of pole numbers, one can couple to the magnetic field creating a gear ratio the same as a mechanical epicyclical gearbox, with the outer ring of magnets normally held still.

The gears in the gearbox 104 (FIG. 1) may be damaged by sudden power change due to heavy rains carried by water flow 110 and by wind storms such as hurricanes or tornadoes. Shown in FIG. 2B is a typical magnetic gear which may comprise a shaft or pin at its center and inner magnetic gear 220 turns outer magnetic gear 230 having air gaps and alternating N/S permanent magnets used as an alternative to prior art meshing of mechanical gears such that the magnetic gears of gearbox 104 can slip as they turn when the waterwheel 103 is hit by debris or high water flow rates and the magnetic gears are held in each position of slippage by permanent N/S permanent magnets between the slipping gears so that a gearbox 104 of such gears receiving the full thrust of a stopping input shaft will not have their meshed gears break requiring the gearbox 104 to be replaced. A predetermined level of torque between magnetic gears may be reached and the gears start to slip with respect to one another. This slippage, of course, is preferable to breakage of the meshing of mechanical gears. The magnetic gears will again catch one another and stop slipping as the gears' N/S permanent magnets grasp one another again.

FIG. 3A shows a perspective, cutaway view of a fixed overlap generator (FOG). The FOG comprises a fixed assembly of a rotor and stator wherein there is maximum overlap between rotor and stator and the amount of torque generated (and output power) is at a maximum. A problem is that wind and water may vary in direction and speed. Also, water is heavier and so has the capability of creating more renewable energy, for example, in a river twenty-four hours a day and at a relatively constant river flow rate.

FIG. 3B shows a variable overlap generator (VOG) and how the rotor of a fixed overlap generator (FOG) of FIG. 3A may be moved axially away from the stator (or toward the stator per the arrow) so as to create less torque, for example, when wind speeds diminish, the harnessed wind energy is variable with the degree of axial overlap of rotor and stator from the fixed position of FIG. 3A to a position where the rotor does not overlap the stator and little to no torque is produced by the magnetic fields between rotor and stator. On the other hand, a wind propeller has little drag caused by the rest of the machinery referred to herein as a control and generating module. So a propeller will turn and generate energy even at low wind speeds. The VOG is very useful in regulating output rotor speed in the event of variable input rotational speeds to be a constant rotor rotational speed.

FIG. 4A shows a top view of a brush-less and commutator-less direct current generator that is more efficient than known direct current generators and comprises a rotating shaft 410 for rotating a plurality of N rotating permanent magnets, 420-1 to 420-N, where N may be, for example, six or eight permanent magnets of fixed north/south polarity in relation to a stationary electric coil 430 of N coils which are electrically connected together to output a direct current voltage without using a rectifier or brushes and commutators.

FIG. 4B shows a side view of the direct current generator of FIG. 4A such that the magnetic field detected by the coils provides a direct current voltage output as a result of the rotating permanent magnets of the same polarity.

FIG. 5A shows a block schematic mechanical diagram 500A of a harnessing module 510 (where the input 510 may be variable water flow (MHK energy) or wind energy) connected to a controlling and generating module 500A by a shaft 511 for producing at its output 560, for example, a constant U.S. 60 Hertz frequency, 110 volt AC current output 560 for local power or demand or variable power distribution. No grid power is used to power DC control motor 512. The control motor 512 taps some direct current output of DC generator 516 via voltage regulator 518. FIG. 5A shows demand or variable power generation without a grid. There is no need either to take power from a grid to operate a constant speed AC control motor 550 or take power from a locally distributed generation of power by control box 540. A shaft from the harnessing module drives a DC generator 516 (preferably a brush-less commutatorless DC generator as taught by the priority '138 patent application and FIGS. 4A and 4B). The DC generator 516 via voltage regulator 518 powers a DC motor 512 having a shaft control of the Hummingbird mechanical control 520 for controlling variable speed input to constant speed output. The Transgear 525 is also shown receiving control input from AC motor 550 which receives controlled power for constant output rotational speed tapped from output control box 540 based upon operating of a VOG per FIG. 3B. Consequently, the variable power/overlap generator (VOG) 560 generates power at constant voltage and frequency for output to control box 540 and to output 570. The Hummingbird control 520 also drives the variable overlap generator 560 at the variable speed of the harnessing module. The VOG 560 has a moveable stator 557 and provides an output via shaft 530 and square thread 530A and block 530B for controlling the amount of rotor/stator overlap of VPG 560 based on the input rotational speed of the harnessing module 510. Consequently, VOG 560 delivers constant frequency and voltage power consistent with harnessed wind or river energy captured at harnessing module 510.

FIG. 5B shows demand or variable power generation using the grid for powering an AC constant speed motor 510 (receiving control input power from the electric grid) and AC motor 550 tapping power from control box 540 off the output of the VOG or VPG 560 as in FIG. 5A. The Hummingbird control 520 operates the movement of the rotor axially in relation to the stator of the VPG on shaft 555 via rotor control shaft 530 for turning square thread 530A moving block 530B connected to the rotor of VPG to vary the rotor/stator overlap based on the input rotational speed of the harnessing module 510 (determined by the amount of captured renewable energy). Otherwise, the operation of the Transgear control 525 of FIG. 5B is the same as that of FIGURE 5A. A constant 110 VAC output 570 may be output at a constant frequency of 60 Hz by operation of the Hummingbird/Transgear mechanical control in combination with the VPG/VOG. The control input from the grid is a fraction of the renewable energy captured by harnessing module 510 and distributed as electrical power output 570 at constant frequency and voltage.

FIG. 6 of the present invention shows a general layout of a river turbine with two Transgear Hummingbird control including a harnessing module 610 for capturing wind or water renewable energy and a controlling module/generating module 660/670 comprising a Hummingbird control 630 specific to a waterwheel 103 (or propeller) used as a renewable energy harnessing module 610 and, for example, a marine hydrokinetic (MHK) turbine including a Hummingbird control 630. The general layout 600 of an exemplary river turbine comprises a harnessing module 610 (which may be of a paddle wheel type such as FIG. 1 or any known water or wind energy harnessing module discussed or known in the prior art) receiving variable speed river/wind flow 110 for turning a shaft 615. A magnetic gear assembly 620 or other mechanical gear box helps match expected rotational speed resulting from harnessed wind/water energy to a predetermined speed for running Hummingbird mechanical control 630. A spur/helical gear assembly (Hummingbird) mechanical control 630 comprising a combination of first and second Transgear assemblies 613, 614 develops rotational output via an input shaft 621 connected to the harnessing module 610 and a constant speed control motor 640 (operated by DC or AC) having its own shaft 641 as a control input to the left Hummingbird Transgear assembly 613. The shaft 641 has a gear 642 (con-gear) meshed with the first spur/helical gear assembly 613 via sun gear/sleeve/sun gear extension gear 643 and an output shaft 651 meshed with a sun gear/sleeve/sun gear extension disc 653 of the second, right spur/helical gear assembly 614 for operating a generating module 670 of a controlling and generating (C & G) module 680 (660, 670) for providing an output at constant electrical frequency and voltage 655 if alternating current or constant DC voltage to a local drain such as an industrial plant or to a distribution grid. Generator 650 may be DC or AC and, for example, output 655 may be constant frequency and constant voltage AC or constant voltage DC. An advantage is that the Hummingbird control 630, unlike an electronic variable frequency converter, has increased durability and no electronic circuits to fail. Moreover, river water flow may be more constant than wind speed, for example, three meters per second, and there is no variable overlap generator shown (but may be optionally used). If the Hummingbird 630 may receive wind input at dangerous wind speeds, a magnetic gear 620 is more likely called for than a meshed gearbox (having gears that may break).

FIG. 7 provides a general layout of a river turbine developed for a sample #3 of an MHK river turbine 700. Harnessing module 701 for harnessing river flow or hydrokinetic energy 710 provides a rotating shaft 715 input to a mechanical gearbox 705 (a magnetic gear assembly being optionally needed if a relatively constant river flow rate may be assumed) which may be magnetic or mechanically meshed for matching a river speed caused rotational speed to a predetermined speed for input to a Hummingbird 710. The harnessing module 701 may be similar to that of FIG. 1 and comprise a hatch 102 and a waterwheel 103 where the hatch may protect the waterwheel during emergency water conditions. Note that the sun gear/sleeve/sun gear extension gears may be moved to the right of each assembly 711, 712, there being four alternative designs of a two Transgear Hummingbird control. The mechanical gearbox 705 outputs rotational speed to a control and generator module or C&G module 702 comprising a three variable Transgear Hummingbird control 710 or a mechanical frequency converter control assembly called Hummingbird (referred to herein as a mechanical frequency converter) comprising first and second side-by-side Transgear gear assemblies 711, 712 and a constant speed control motor 751 for controlling output velocity to a generator. In this embodiment, control motor 751 requires input power 713, for example, from the grid to power the constant speed control motor 751 which may be an alternating current motor. In an alternative embodiment (not shown), the control motor 751 may be DC and fed by a DC generator connected to an input shaft from the harnessing module or the gearbox 705. Control motor 751 delivers constant speed to left Transgear assembly 711 via a sun gear/sleeve/sun gear extension disc located to the right of assembly 711. Generator 791 outputs constant frequency electric power generator output 720 at constant voltage to an electric grid taking its output from a right sun gear/sleeve/sun gear extension gear of second spur/helical Transgear assembly 712. A mechanical or magnetic gearbox 705 is shown for replacing prior art mechanical gearboxes between the harnessing module 701 and the C & G module 702.

FIG. 8A (along with FIG. 8B) provides details of how a three-variable side-by-side two Transgear control 800 (Hummingbird) operates to control input 820 rotational speed via a control motor (not shown) and specifically shows the left Transgear 813 of two Transgear assemblies of a Hummingbird mechanical control. Left Transgear assembly 813 comprises three cross-hatched sections. An input shaft 812 is a variable speed input from a harnessing module and, if present, a gearbox or magnetic gear box (not shown). The input shaft 812 has a sun gear 815 of the left Transgear 813 which is integrally connected or attached to shaft 812 for providing the variable rotational input to the left Transgear assembly (broadly cross-hatched from lower left to upper right). A carrier assembly 825 broadly cross-hatched from lower right toward upper left is shown providing output 830 of left Transgear assembly 813. Input 810 and output 830 receive a control input 820 (tightly cross-hatched from lower left toward upper right) comprising a sun gear/sleeve/sun gear extension disc surrounding variable input shaft 812, which provides the control input 820.

FIG. 8B provides details of how the right Transgear assembly 814 operates. The input to the right Transgear 814 is provided by a second sun gear 816 of shaft 812 which, like the first sun gear 815, is integrally connected or attached to variable input shaft 812. The control input to the right Transgear assembly 814 is the output 830 from the left Transgear 813 that is transferred by a connecting gear 817. The output 850 to of the right Transgear 814 is the output of the Hummingbird 800. Altogether, the two Transgear assemblies of FIGS. 8A and 8B form a Hummingbird having three variables, an input 810, an output 850 and a control input 820.

FIG. 9A shows a left half of a Hummingbird control 900 showing the variations of rotational speed at an output if a +Δ number of revolutions per minute is added to a variable X revolutions per minute input rotational speed is received at variable input 910 (the sun gear 815 on shaft 812). If it is given that a control input via 920 is provided of −X revolutions per minute constant speed, then, the left Transgear output 930 to the connecting gear=′s ½ {(X rpm+Δ rpm)−X rpm}=′s ½ Δ rpm which is passed via a white shaft (a connecting gear shaft to the right Transgear assembly which will be explained with reference to FIG. 9B). The Transgear rule is applied.

FIG. 9B shows a right half of a Hummingbird control 900 showing the variations in rotational speed caused via the connecting gear 817 from the left half (left spur/helical gear assembly of FIG. 9A) to the right half (right Transgear). The variable input 910 to the right half of the Hummingbird control is the same variable input 910 received by the left half and is indicated as variable input 910 via the second sun gear 816 and =′s X rpm+Δ rpm (cross-hatched lower right to upper left). The control input 960 comprises a cross-hatched carrier assembly from upper right to lower left received from the connecting gear to FIG. 9A. The output of the right half of the Hummingbird is the output of the Hummingbird 950 and =′s−(X rpm+Δ rpm)+2 [½ Δ rpm] =′s−X rpm and is taken from the sun gear extension disc of the sleeve/sun gear/sun gear extension disc lightly cross-hatched from lower left to upper right. The control input 960 is received from the carrier gears of the left Transgear through connecting gear 817. Again, the Transgear rule is applied.

FIG. 9C shows a Hummingbird controlled MHK river turbine with the combined steps of FIGS. 9A and 9B. Step #1 is the step of converting a variable input rotational speed of a rotating shaft from a harnessing module (for example, waterwheel 910) where the variable input rotational speed=′s X rpm+Δ rpm and is converted to a constant output speed of X rpm via a control input from constant speed control motor 920. The output which is fed to a generator 970 at constant voltage, constant frequency, for example, 110 or 220 volts and 60 Hz and because of the varying speed of rotation of the harnessing module 910 should be an amplification of the power used to run the control motor 920 at constant speed and produce a generated useful output. Step #2 is converting the constant output speed of X rpm to the Hummingbird of X rpm in order to obtain an X rpm output which is converted by generator 970 to constant generated frequency, for example, sixty Hertz.

FIG. 9D shows a black and white photograph of a rotary frequency converter 970 comprising a motor portion 972 having a common shaft with a gearbox and a generator portion 974 for making a variable rotational speed input from a motor into a constant frequency output of a power generator.

FIG. 9E shows a schematic diagram of a basic rotary frequency converter having three sections (no gearbox shown): a harnessing module 810 for providing a variable rotational speed input (such as a waterwheel or paddle wheel having rotor blades or a wind turbine propeller and shaft), a controlling module 820 including a direct current generator 825 for receiving the harnessing module 815 renewable energy input captured by the harnessing module 810. The DC generator 825 permits DC power generation (for example, per DC generator of FIGS. 4A and 4B) rather than use of grid power for powering a DC constant speed motor 972 of the rotary frequency converter. The DC generator 825 may output variable voltage direct current which may be regulated to a constant voltage and power rating via charge controller 835 and excess energy stored in battery 840 for release, for example, at a rating of one MW to DC motor 972. A generating module section 830 comprises a variable overlap generator (VOG) 830 receiving a controlled input from the DC constant speed motor 972 of controlling module 820 in order to provide an AC output at constant frequency to grid 850 depending on the renewable energy captured by the harnessing module 810.

FIG. 10 shows a combination of FIGS. 9A and 9B comprising Hummingbird control 1000. Variable speed input 1010 of X+Δ rpm is received from a harnessing module (not shown) and is delivered to first sun gear 1015 of a first spur/helical gear assembly 1013 and to second sun gear 1016 of a second spur/helical gear assembly 1013 (loosely crosshatched from lower left to upper right). A control input 1020 of −X rpm is fed to a left sleeve/sun gear/sun gear extension disc of the first assembly 1013 (tightly cross-hatched from lower left to upper right). The output 1025 of the first assembly 1013 (½)((X+Δ rpm)−X) =′s+½ Δ rpm is provided to a connecting gear 1017 for serving as a control input 1030 to a carrier assembly of the second Transgear gear assembly 1014 (loosely cross-hatched from lower left to upper right). The output 1040 of the second assembly is the Hummingbird output=′s−((X+A rpm) 2(½) Δ rpm))=′s−X (a constant speed), called herein and in priority patent applications as the Transgear Rule (the output shown as tightly cross-hatched from lower left to upper right).

FIG. 11 shows an alternative embodiment of a Hummingbird control 1100. In this embodiment, there are left and right spur-helical gear assemblies as before connected by connecting gear 1135. However, both sun gear/sleeve/sun gear extension discs have been moved to the right of each respective Transgear gear assembly. In a further alternative embodiment both sun gear/sleeve/sun gear extension discs may be moved to the left of each respective Transgear assembly. Input rotational speed 1101='s (X+A) rpm as before. This is delivered to the first assembly via sun gear 1137 and to the second assembly via sun gear 1138 (tightly cross-hatched from lower left to upper right). The control input of the first assembly is delivered to sun gear/sleeve/sun gear extension disc 1151 as –X rpm (via a constant speed motor not shown). The output of the left assembly 1130 of $+\frac{1}{2}$ Δ rpm is provided by the cross-hatched carrier sections numbered planetary gear 1141A, double width pin 1142A, planetary gear 1141B and double width pin 1142B. The connecting gear 1135 delivers $-\frac{1}{2}$ Δ rpm (Transgear rule) to the second carrier 1131 also loosely cross-hatched from lower left to upper right comprising 1143A, 1144A, 1144B and 1143B with the Transgear Rule applied via con-gear 1135 (tightly cross-hatched from lower left to upper right). The Hummingbird output 1111 is via the sun gear/sleeve/sun gear extension disc 1111 (tightly cross-hatched from lower left to upper right) and $='s-((X+\Delta)-\frac{1}{2}\Delta)='s-X$ rpm which is the desired constant speed output (from the variable input X+Δ) for producing a constant frequency electrical power.

FIG. 12A comprises a combination of six steps, steps (1) through (6), for simplifying a complex Hummingbird of FIG. 12A step (1) into a simplified Hummingbird assembly of FIG. 12A step (6) showing several steps of simplification of the first and second spur/helical gear assemblies and the connecting gear of step (1).

FIG. 12A steps (1) through (6) show mechanical schematics of a Hummingbird control, mostly taken from the Hummingbird embodiment of FIGS. 8A and 8B combined showing two Transgear assemblies and con-gears (sun gears of the connecting gear) connecting the two Transgear assemblies seen in FIG. 12A step (1). The figures show how two Transgear assemblies forming a Hummingbird may be simplified in steps. Input 1221 from a harnessing module is a variable rotational speed turning an input shaft with first and second sun gears 815 and 816 as variable inputs to left and right assemblies of step (1). There is shown an elongated connecting gear 1215 meshed with gears 1230 of the first assembly and 1220 of the second assembly where the output of the first assembly is the control input of the second assembly (typically from a constant speed control motor in a renewable energy generator). The Hummingbird output is taken from right sun gear/sleeve/sun gear extension gear 830.

FIG. 12A step (2) shows the Hummingbird control assembly of FIG. 12A step (1) with carrier brackets 1222A and 1222B attached and the connecting gear has been removed.

FIG. 12A step (3) shows more than one change to the assembly of step (2). Pins 1223A and 1223B of step (2) are joined to make an elongated pin 1223 in step (3). The similar elongation occurs with the opposite, bottom pins of step (2). Also, it can be seen that first and second sun gears 815 and 816 of step (1) have been combined into one input sun gear 1217 which is meshed with a planetary gear 1225A of the first assembly and a planetary gear 1226A of the second assembly becomes part of the output 830 as in steps (1) through (3) as it is meshed with the right sun gear/sleeve/sun gear extension disc. The center carrier brackets are removed.

FIG. 12A step (4) shows the meshing of planetary gears 1226 and 1225A rotated 180 degrees. Since planetary gears 1225A and 1226A are meshed to a common sun gear 1217, the two gears can be combined into one as shown in FIG. 12A step (5).

FIG. 12A step (5) shows an increase in diameter of sun gear 1217 of step (4) in step (5). At the same time, separate gears 1225A and 1226A are joined to make gear 1216. Step (5) shows some open space between left and right assemblies from prior figures.

FIG. 12A step (6) shows a collapsing of the two assemblies of step (5) into a more compact assembly with the outer planetary gears 1225A and 1225B pushed in and with reduced width. In step (6), three variables remain in cross-hatch. Input 1221 comprises input shaft 1221, formerly, connected sun gear 1215, which is upper combined planetary gear 1216. Control is sun gear/sleeve/sun gear extension disc 1220 and meshed planetary gear 1225A, and output is sun gear, sleeve, sun gear extension disc 1230 and planetary gear 1225B (lightly cross-hatched lower left to upper right). Further simplified Hummingbird controls are shown in FIG. 13, FIG. 16, FIG. 17, FIGS. 19 to 32; (with the larger width carrier gear on the bottom).

FIG. 12B combinations of function assignments, hereinafter, combinations (1) through (6), show how a simplified Hummingbird may comprise six combinations of function assignment to three variables: what may be an input, what may comprise a control input and what may comprise an output. There are six different assignments 1200 shown, the first being shown in FIG. 12B combination (1).

FIG. 12B combination (1) shows in dark cross hatch a first variable input function performed by the left sun gear extension disc/sleeve/sun gear. Notice that the input function is not performed by shaft 1221A. The control function is performed by the right sun gear/sleeve/sun gear extension disc 1230 shown in slightly lighter cross hatch. The output function is performed by the carrier gears 1216 including the shaft 1221A and a right sun gear at the top of the simplified Hummingbird.

FIG. 12B combination (2) shows that the input function has been continued in this variation of Hummingbird use to the left sun gear/sleeve/sun gear extension disc. The control function is assumed by the cross-hatched gear 1217 on central shaft 1221A. The output function has been assumed by the right sun gear/sleeve/sun gear extension disc 1230.

FIG. 12B combination (3) shows that the input function is assumed by the central shaft 1221A and its sun gear 1217. The control function 1220 is assigned to the left sun gear/sleeve/sun gear extension disc. The output function 1230 is assumed by the right sun gear/sleeve/sun gear extension disc. Carrier gears 1216 do not assume any function and freewheel in FIG. 12B combinations (2) and (3).

FIG. 12B combination (4) shows that the input function may be assigned to left sun gear/sleeve/sun gear extension disc 1220. Notice that in FIG. 12B combination (4) through FIG. 12B combination (6) that the central shaft 1221A is white and is assigned no function. The control function is assigned to right sun gear/sleeve/sun gear extension gear. The output function 1216 is assigned to carrier gears 1216.

FIG. 12B combination (5) shows that the input function 1220 may be assigned to left sun gear/sleeve/sun gear extension disc 1220. The control function 1216 may be assigned to carriers 1216. The output function 1230 may be assigned to right sun gear/sleeve/extension gear 1230.

FIG. 12B combination (6) shows that the input function 1216 may be assigned to carriers 1216. The control function 1220 may be assigned to left sun gear/sleeve/sun gear extension disc 1220. The output function 1230 may be assigned to right sun gear/sleeve/sun gear extension disc 1230.

FIG. 12C torque ratio (1) through FIG. 12C torque ratio (3) represent three different torque ratios of the Hummingbird control of FIG. 12B and show how sun gear and sun gear connecting gear diameter choice plays an important role in speed and torque adjustment by gear ratio, control of control motor speed and to set the number of poles of a generator.

FIG. 12C torque ratio (1) shows the same gear ratio, assumes a constant motor speed and does not set a number of generator poles. Notice that the diameter of all connecting gears connected to shafts have consistent diameters. These connecting gears comprise con-gears 1245, 1220, 1230 and 1285. If the rotational speed of shaft 1240 is 1800 rpm then the rotational speed of left and right sun gear/sleeve/sun gear extension discs and shaft 1280 are all 1800 and the torque ratio is calculated as 1800/1800 or simply one for the gear train from gear 1245 to 1285. (There is no change in diameter of central shaft 1221A sun gear diameter assumed in FIG. 12C torque ratios (1) through (3)).

FIG. 12C torque ratio (2) shows an embodiment of a simplified Hummingbird control where the connecting sun gear (con-gear) 1255 has a diameter smaller than that of the left sun gear/sleeve/sun gear extension disc, in particular, the extension disc or gear which is much larger. For example, if the rotational speed of shaft 1240 is 7200 rpm, then, the rotational speed of the left sun gear/sleeve/sun gear extension gear (enlarged diameter) is cut in half or 3600 rpm. Furthermore, the right sun gear/sleeve/sun gear extension disc may have a very small diameter at a predetermined fraction of the diameter of the large diameter connecting gear to shaft 1280 to a generator. In this example, the torque ratio is reduced from 7200/1800 or is ¼. In this example, also, the speed is cut in half again from 3600 to 1800 and the generator driven by shaft 1280 may have one set of poles. A more complicated example of increasing the number of generator poles and decreasing generator speed and torque ratio is shown in FIG. 12C torque ratio (3).

FIG. 12C torque ratio (3) has an added connecting shaft 1260 and connecting gear 1265 of a smaller diameter when compared with shaft 1270 and its right connecting gear 1275 such that the rotational speed of shaft 1260 if given as 1800 rpm is cut in half to 900 rpm rotational speed of shaft 1270. Left connecting gear 1278 of shaft 1270 is manufactured with a smaller diameter than connecting gear 1220, namely, sun gear/sleeve/sun gear extension disc 1220. Consequently, in this exemplary embodiment, the rotational speed of shaft 1270 when passed to the left sun gear/sleeve/sun gear extension disc is cut in half again to 450 rpm. Now, referring to right sun gear/sleeve/sun gear extension disc 1230 which has a small diameter extension gear meshed with large diameter connecting gear 1287 of generator shaft 1280, there is another halving of the rotational speed from 450 rpm to 225 rpm of generator shaft 1280. The torque ratio is calculated as 1800/225=⅛ and eight sets of poles will be used for a generator driven by shaft 1280.

FIG. 13 shows a layout of a simple Hummingbird control 1330 similar that of the simplified Hummingbird of FIG. 12F used in, for example, an MHK river power generator which may be called sample #3 consistent with earlier samples #1 and #2 (Goldfinch control using variable pitch cams) described in a priority patent application. The control motor 1340 at upper right provides the constant speed control via its shaft and sun gear to a control input shown at upper left of simplified Hummingbird 1330 via a con-gear and extended motor shaft. The input shaft 1302 comes from the harnessing module 1310 and input is delivered via integral or an axially connected sun gear (shaded similarly to the shading of shaft 1302). The combined and simplified Hummingbird assembly 1330 connects to control motor 1340 shaft at the right meshed via a left con-gear with a left sun gear/sleeve shaded darkly. The output 1350 is provided to a sun connecting gear of the generator shaft of generator 1350 at the right of the Hummingbird 1330. Control and generating module 1320 comprises Hummingbird 1330, control motor 1340 and generator 1350. The embodiment of FIG. 13 may be used to generate AC or DC and the control motor may be AC or DC and the output may be at approximately ten times the power consumed by control motor 1340 for operation at constant speed.

FIG. 14A is an embodiment of an un-simplified Hummingbird control that is most like the Hummingbird control 710 of FIG. 7 and comprises three cross-hatched sections for three variable control and may be schematically drawn as FIG. 14A(1). Input 1410 (loosely crosshatched from lower left to upper right) is provided by a harnessing module to input shaft 1402 with left sun gear 1437 and right sun gear 1439 of first and second spur/helical gear Transgear assemblies. The control input 1420, for example, from a constant speed control motor is delivered to sun gear/sleeve/sun gear extension gear 1420 (tightly and darkly crosshatched from lower left to upper right) while the output 1430 (lightly shaded and cross-hatched from lower left to upper right) is taken from the second sun gear/sleeve/sun gear extension gear 1430.

FIG. 14B differs from FIG. 14A in that the left sun gear/sleeve/sun gear extension gear is located at the right of the first Transgear assembly and may be schematically drawn as FIG. 14(B)1. The cross-hatching is loosely from lower left to upper right for input 1410 via shaft 1402 and sun gears 1437 and 1439. The control 1420 is tightly cross-hatched from lower left to upper right and the output 1430 is lightly cross-hatched from lower left to upper right. Only two combinations are shown but two more are possible, where both sun gear/sleeve/sun gear extension discs are located on the left of their respective Transgear assemblies and an embodiment where both sun gear/sleeve/sun gear extension gears are located on the right of their respective Transgear assemblies.

FIGS. 14A(1) and 14B(1) show two different simplified schematics of the same Hummingbird assemblies of FIGS. 14A and 14B respectively. In FIG. 14A(1) in comparison with FIG. 14A it can be readily seen that input 1410 is delivered to the same sun gears 1437 and 1439 shown in spaced lower left to upper right crosshatch. Control 1420 is shown delivered to a first heavily cross-hatched triangle tightly cross-hatched from lower left to upper right facing a mechanical lead to the second sun gear input 1439 similarly cross-hatched as sun gear 1437 and the output is taken from triangle 1430 cross-hatched the same as sun gear/sleeve/sun gear extension disc 1430 of FIG. 14A.

FIG. 14B(1) may be described as a center feed where the input 1410 is provided to both sun gear triangles 1437 and 1439 cross-hatched similarly as in FIG. 14B. The control 1420 comes from the left to meet input 1437 and is connected by mechanics to the pair of triangles including the output 1430 taken from the right sun gear extension disc of FIG. 14A.

FIG. 15A is a representation of a view of a DDMotion wind turbine with the propeller not shown but having the exemplary control components comprising a magnetic gear box to withstand heavy winds and changing wind speeds.

There is a speed converter S/C from variable wind speed to a more constant rotational speed and a variable overlap generator (VOG) shown to regulate the more constant rotational speed to a constant frequency electrical output.

FIG. 15B shows a magnetic gear that permits slippage manufactured by Magnomatics of Sheffield, UK used between the propeller shaft and the input shaft to a Hummingbird or similar mechanical control.

FIG. 15C(1) shows a so-called Goldfinch control (speed converter S/C) first shown in priority patents and patents incorporated herein by reference of Key Han. FIG. 15C(2) shows a simplified Hummingbird control (speed converter S/C) with an input shaft, a control and an output sun gear/sleeve. A complex Hummingbird may replace a simplified Hummingbird whenever a Hummingbird control is utilized in a renewable energy generator or other apparatus as described herein. FIG. 15D shows the third component which is a variable overlap generator (VOG) with a rotor which is controlled to axially move from a fixed position within a stator to a distant position axially along rotor/motor shaft to a position of minimum overlap and minimum speed to further control speed conversion and electrical output of an alternating current generator (the VOG) to constant electrical frequency.

FIG. 16 is a simple schematic of a river or wind turbine using a simplified Hummingbird control similar to that depicted in FIG. 12F. A harnessing module 1610 provides a variable speed input 1611 of a propeller (rotor blades) or a waterwheel 1603 to a gearbox or magnetic gear assembly 1620 for matching expected rotary speeds of the harnessing module to a rotational velocity 1621 that may be delivered to an input shaft 1621 of simplified Hummingbird 1630. Control shaft 1641 receives a constant speed control input from control motor 1640 which may receive direct current or alternating current via a generator (not shown) of the harnessing module or from a grid. The simplified Hummingbird 1630 delivers a more constant speed output than the variable input 1621 to a VOG or FOG 1650 (a generating module 1670) which delivers output power 1655 to a grid, used locally or provides some of the output power to be used to power the control motor 1640 (which may be AC or DC 1645 driven) where the controlling module is 1660 and the generating module is 1650 while the combined control and generating module 1680 combines 1660 and 1670 including Hummingbird control 1630, gearbox 1620 and control motor 1640 and VOG 1650 (generating module 1670). The output power 1655 should be a multiple of the power used to run control motor 1640 if the harnessing module is delivering an expected level of renewable energy from input water flow or wind speed where the multiple is approximately a multiple often times the harnessed renewable energy.

FIG. 17 provides an example of constant input power amplification from a 0.8 megawatt control motor to, for example, an eight megawatt generator output power due to the variable power comprising renewable energy from harnessing module 1710. The greater the wind velocity or the water flow rate through a harnessing module, the more likely a constant output ten times (more or less) the constant control motor requires is achieved. Harnessing module 1710 may be a river paddle wheel receiving a river flowing at three meters per second which can produce about eight megawatts of renewable energy. As a result the generator 1750 may output eight megawatts and used only 0.8 megawatts of grid power 1745 to control simplified Hummingbird 1730.

FIG. 18 is a collection of graphs showing wind (or water) speed in meters per second on a horizontal axis versus wind frequency at the required speed in hours per year on the vertical axis. If a variable overlap generator is used with wind power, for example, one may harness more energy from the wind (or water) using a mechanical Hummingbird. The object is to reduce the cut-in speed of turning the harnessing module (for example, a wind propeller) so as to gain more rated power at the output. If the cut-in speed is improved, then, the cross-hatched area shown of actual harnessed energy is improved as well labeled in bold "More Energy." With minimum overlap of a rotor and stator of a VOG, a propeller (or waterwheel) will start turning sooner than if a fixed overlap generator is used and the lower cut-in speed results in a higher rated power.

FIG. 19 shows a power amplification and generation embodiment 1900 using grid power 1945 to power an eight megawatt control motor at constant speed as a control input to Hummingbird 1930. An input rotational speed 1921 which may be valued at eighty megawatts due to a high velocity water current or propeller speed wind velocity may permit a generator 1950 output 1955 rated at eighty megawatts.

FIG. 20 shows a generation without using grid power and distribution with a DC generator 2060. DC generator 2060 delivers its generated constant direct current to DC control motor 2040 serving as the control constant speed input to simplified Hummingbird 2030. Input shaft 2021 from a harnessing module 2010 or gearbox 2020 may be extended to DC generator 2060 having an associated charge controller 2070 and battery to regulate the DC generator output to constant voltage direct current and store power in a battery 2080. DC motor 2040 may thus operate at constant speed and receive constant power from the harnessing module 2010. Constant speed AC generator 2050 receives output of the simplified Hummingbird controller 2030 and delivers voltage 455 at constant frequency. The DC generator 2060 may be brush-less and commutator-less and taught by FIGS. 4A and 4B.

FIG. 21 is very similar to the circuitry of FIG. 20 except that FIG. 21 shows amplification of the constant output power of DC control motor 2140 at constant speed operating, for example, at 0.8 megawatts of power. Assuming the harnessing module 2110 is either a large wind turbine operating in high wind speeds or a water-driven module operating, for example, in a fast-flowing river at three meters per second or higher water flow rates, then, an amplification of the constant speed DC motor at 0.8 megawatts may result in an addition of power at output 2155 to eight megawatts when the amplification rate is one to ten.

FIG. 22 is very similar to the circuitry of FIG. 21 except that DC generator 2260 takes eight megawatts of renewable energy to generate eight megawatts of constant speed output as DC control motor 2240. Because of the high river flow rate or high wind speed expected from harnessing module 2210, it is expected that alternating current generator is capable of delivering eighty megawatts of output power 2255, for example, to an electric grid.

FIG. 23 is very similar to the circuitry of FIG. 22 and generates the same amplified output at constant frequency of eighty megawatts via constant speed generator 2350. The control constant speed motor, however, is an AC control motor 2340 operating at constant speed and driven by power taken from an input shaft from a harnessing module 2310 via a variable speed AC generator at eight megawatts and regulated to constant frequency alternating current by a known power converter for converting AC to DC and then inverting the direct current back to constant frequency alternating current to AC control, constant speed motor 2340.

FIG. 24 shows a placement of variable speed generators 2460-1 and 2460-2 in parallel so as to tap off sixteen megawatts of power captured from a renewable energy source such as wind or water via harnessing module 2410 which thus permits an alternating current control motor 2440 to operate at sixteen megawatts and the constant speed alternating current generator to deliver, for example, one hundred sixty megawatts.

FIG. 25 shows another example of generation of constant frequency power at a large value such as output 2555 at eighty megawatts and constant voltage also generated by tapping eight megawatts of renewable energy harnessed by the harnessing module 2510. In this example, a variable speed generator 2560 at eight megawatts rated power delivers eight megawatts of variable frequency alternating current to a modified power converter for converting variable alternating current to a modified power converter for converting variable alternating current frequency to direct current for operating constant speed direct current control motor 2540 at eight megawatts.

FIG. 26 shows how variable speed generators and modified power converters, for example, two, 2660-1 and 2660-2 and 2675-1 and 2675-2 may tap sixteen megawatts of direct current constant voltage for operating a sixteen megawatt direct current control motor 2640 at constant speed for controlling simplified Hummingbird 2630. The output alternating current generated at, for example, a constant sixty Hertz and 110 or 220 volts may be one hundred sixty megawatts. The point of FIGS. 20 through 26 is that the output power controlled by a simplified Hummingbird or a two spur-helical gear assembly Hummingbird (not shown) may be scalable; (one hundred sixty megawatts is not the upper limit possible from a renewable energy harnessing module). An upper limit may be in the hundreds of megawatts or even tens of gigawatts or larger. The output power controlled by a Hummingbird control embodiment of the present invention depends on the renewable energy captured by an appropriately placed harnessing module, for example, on the top of mountains, as a large river such as the Colorado River narrows increasing river flow rates through a canyon, placement of wind turbines off-shore or on the Antarctic continent. Off-shore high wind turbines of large propeller size and use of high river currents which may flow from, for example, a dam spillway are further examples of larger renewable energy sources that can scalably capture large amounts of renewable energy.

FIGS. 27 through 29 show further examples of use of a three variable Hummingbird control in, for example, vehicular transmission, pumps and compressors.

FIG. 27 provides a mechanical schematic block diagram of an infinitely variable transmission (IVT) which may be driven by an engine such as a vehicular engine 2710. Engine 2710 (for example, of a large diesel powered truck) provides a power source 2710 of hundreds or thousands of horsepower as may engines for driving propellers of ocean liners. The engine torque and speed of rotation may be variable (depending on the pressure placed on pedal 2740 and delivered via speed/torque control 2750. The output of engine 2710 is provided via a gearbox or magnetic gearbox 2720 to a direct current generator 2720 driven by shaft 2721 extending from the gearbox 2720 to an input of the simplified Hummingbird control 2730. Meanwhile, some of the engine power is tapped and, for example, stored at a battery 2730 via speed/torque control 2750 whose output is regulated by charge controller 2725 and operates a constant speed direct current control motor 2740 as a control input to simplified Hummingbird 2730 via shaft 2741 as well as receiving direct current from DC generator 2720. Applying pressure to pedal 2745 operates speed/torque control 2750 which provides a speed control of engine 2710, an input to battery 2730 and provides tapped power from DC generator 2720 via charge controller 2725 and battery 2730 and speed/torque control to power DC control motor 2740 at a continuously varying voltage providing continuous real-time speed/torque control to simplified Hummingbird 2730 via shaft 2741. The output of simplified Hummingbird 2730 is shaft 2751 which delivers output power 2750 to drive, for example, vehicular wheels or boat engine propellers via shaft 2751. The principles of using a simplified Hummingbird control may also be applied for delivering power to turn wheels of a vehicle or propellers of a boat per FIG. 28 that is powered by electricity. Briefly, speed/torque control 2750 may comprise a programmed computer processor and memory for storage and use of input data from a plurality of sensors including but not limited to GPS location sensors, accelerometer/gyroscope sensors of vehicle position with respect to gravity, wind speed and direction sensors, weather sensors, torque sensors and rotational speed sensors, not shown. There are a number of variables which may be sensed and used by a special purpose algorithm to control speed/torque delivered by engine 2710 to drive wheels 2750 to promote safety and still use the user pedal input 2745.

FIG. 28 provides a mechanical schematic block diagram of an infinitely variable transmission (IVT) which may be driven by an engine such as a vehicular engine 2810 of an electric powered vehicle. Engine 2810 (for example, an engine of a Tesla or a Prius) provides a power source 2810 of hundreds of horsepower. The engine torque and speed of rotation may be variable (depending on the pressure placed on pedal 2845 and delivered via speed/torque control 2835 to power source 2810. The output of engine 2810 is provided via a gearbox or magnetic gearbox 2820 to an input shaft 2841 of simplified Hummingbird 2830. Direct current control motor 2820 has a control shaft 2841 extending from the DC control motor 2840 to a control input of the simplified Hummingbird control 2830 via shaft 2841. DC control motor 2840 receives a fraction of battery power delivered by battery 2830. Because the vehicle or boat is powered by electricity from battery 2830 and according to pressure on pedal 2845, the battery power is provided via speed/torque control 2835 to operate DC control motor 2840 and is mostly delivered to power source/engine 2810. Meanwhile, speed/torque control 2835 operates a constant speed direct current control motor 2740 as a control input to simplified Hummingbird 2730 via shaft 2741 as well as receiving direct current from DC generator 2720. Simplified Hummingbird provides output to output shaft 2851 as output 2850 for driving wheels of a vehicle or turning propellers of a boat. Briefly, speed/torque control 2835 may comprise a programmed computer processor and memory for storage of input data from a plurality of sensors including but not limited to GPS location sensors, accelerometer/gyroscope sensors of vehicle position with respect to gravity, wind speed and direction sensors, weather sensors, torque sensors and rotational speed sensors, not shown. These sensors provide data for a programmed processor to determine a control input to DC control motor 2740 that is continuously varying depending on sensed speed/torque and other sensed data as well as user pedal depression data of pedal 2845.

FIG. 29 exemplifies the use of a Hummingbird three variable control in an infinitely variable pump or an infinitely variable compressor driven by a motor 2910 which comprises a power source for the compressor or pump via input shaft 2921 to an attached input sun gear of the simplified Hummingbird 2930. Compressor/pump embodiment 2900 may have an alternating current source of power 2905 which is mostly delivered to motor 2910 from driving input shaft 2921 of the left sun gear extension disc/sleeve/sun gear of simplified Hummingbird 2930. Control is provided, for example, via a thermostat 2970 and using some of the AC power 2905 delivers power to a control motor 2940 regulated by thermostat 2970. Control motor 2940 provides a control input via shaft 2941 to left sun gear extension gear/sleeve/sun gear of simplified Hummingbird 2930. The output of simplified Hummingbird control 2930 is provided via right sun gear extension disc/sleeve/sun gear to output shaft 2951 as output 2950 to a pump or to a compressor.

FIG. 30 shows a schematic of a simplified Hummingbird 3030 in a renewable energy embodiment showing Hummingbird control of a local embodiment which uses the renewable energy to operate of DC control motor 3040 at constant speed and may produce an output on the value of the input renewable energy, for example, fifty megawatts of alternating current power at constant frequency and voltage via an alternating current generator 3060. Harnessing module 3010 is expected to capture fifty megawatts of renewable energy power, for example, wind, river, tidal or wave energy. The water or wind drives a harnessing module 3010 which may comprise propellers, paddle wheels, wave motion capture modules and reversible paddle wheels or propellers, for example, with fins or the like to cause the harnessing module to face the wind or water at all times or to be reversible and capture the tide when it goes out and when it comes in. Harnessing module 3010 provides an input via an extended Hummingbird input shaft 3021 having an unnumbered sun gear which turns both the Hummingbird input and delivers some energy to a direct current generator 3055 as described above which may be brushless and commutator-less. Control motor power generated by the DC generator 3055 may be variable and regulated to a constant by a voltage regulator 3050 and stored in a battery 3045. The rated constant direct current output of the control power may, for example, be five megawatts for operating DC constant speed control motor 3040 which power is delivered to left sun gear extension disc/sleeve/sun gear of the simplified Hummingbird. The regulated output at constant alternating current frequency and voltage may be rated at approximately the input harnessed power of fifty megawatts and is taken from the right sun gear extension gear/sleeve/sun gear of the simplified Hummingbird 3030.

FIG. 31 shows an example of doubling the generation of control power for tapping off ten megawatts of renewable energy and operating a ten megawatt direct current control motor 3140. As a result, approximately all of the one hundred megawatts captured at the harnessing module 3110 is deliverable as constant frequency, constant voltage and a rated power output of one hundred megawatts at the Output. This principle of increasing the number of direct current generators and voltage regulators in parallel and use of a battery 3145 for direct current power storage may be multiplied to three or more units for permitting larger and larger direct current constant speed motors 3140 if the renewable energy that can be collected exceeds hundreds of megawatts of power.

FIG. 32 provides a layout of a modularized, simplified Hummingbird control system that may be used generically for generating power dependent on a value of harnessed energy. A harnessing module 3210 is not shown but may comprise any embodiment for capturing renewable energy such as wind and water power. The harnessing module may receiver tidal, ocean wave, river, dam spillway, or other water power left to the imagination of the user of the present invention or any form of wind energy delivered by a windmill, a wind turbine or wind paddle wheel or any other wind energy harnessing module left to the imagination of the use, a simplified Hummingbird control system 3280 consisting of three variable and optionally providing a further regulation of variable speed versus constant frequency via a fixed or variable overlap generator 3290 (details not shown). Starting at the lower left, a harnessing module 3210 provides variable rotational input to an input shaft of a bevel gear assembly portion of a mechanical control box providing input angle adjustment and the ability to turn input power ON and OFF by disengaging the right sun gear of a Transgear assembly from a spur/helical gear assembly having orthogonal input shafts at right angles to one another. A depicted horizontal input shaft provides harnessed input renewable energy collected, for example from water and wind to an input and control power generator. The extension of the horizontal input shaft delivers harnessed variable energy to an input gear box 3285 while an electrical output is delivered to an electronic control box which is capable of either taking alternating current power from the grid or direct current power from the harnessed power output of input and control power generator 3230 and deliver sufficient direct current power to power constant speed control motor 3270 via the grid or with the assistance of a harnessed direct current battery 3260. The constant direct current power output of the control box 3250 and battery 3260 powers constant speed DC control motor 3270. DC control motor 3270 delivers constant speed and constant power input via control shaft to simplified Hummingbird 3280 via control shaft and attached sun gear meshing with right sun gear extension gear/sleeve/sun gear of simplified Hummingbird 3280. Input gearbox meshes with a carrier assembly of Hummingbird 3280 and regulated by control, the Hummingbird produces output to a FOG or a VOG 3290 for further regulation of variable speed to electric frequency as needed. The FOG or VOG 3290 outputs harnessed power as electrical power at constant frequency and voltage at the Output only reduced to the extent some power is tapped to run control motor 3270 at constant speed.

FIG. 33(A) shows a top view of a wave (for example, an ocean wave) harnessing module and FIG. 33(B) shows a side view of the same harnessing module but additionally showing a control and generating module which may generate harnessed energy to an electric grid at constant electric frequency and voltage and at a power rating equivalent to the value of harnessed energy.

FIG. 33(A) provides a top view of a harnessing module 3301 for an erratic motion energy such as a wave motion generator having a stator coil 3310 at the center and, following Faraday's law, with surrounding moveable rotor permanent magnets 3320-1 through 3320-N where there is a North pole closest the coil 3310 and the south poles comprise a plurality of coils equally spaced about the North pole and the stator coil. In this example, the number of permanent magnets is, for example, eight sets, but may be any number from four to sixteen.

FIG. 33(B) is a side view of both the harnessing module and a control and generating module. The harnessing module of FIG. 33(A) comprises a circular wing and ball and socket (best seen in FIG. 33(B)) such that permanent magnets 3320-1 through 3320-N, for example, having an S magnetic polarity. The disc shown in FIG. 33(A) with hooks 3330-1 through 3330-4 may move in any direction, for example, from water wave motion represented by the outer circle including hooks 3330-1 through 3330-4 up and down and around the central North polarity coil to generate variable direct current power. A plurality of four hooks 3330-1 through 3330-4 are shown by way of example for the outer circle (wing and socket) feeding power to grid 3350. FIG. 33(B) shows the harnessing module 3300 in greater detail with the wing (web) and socket ball shown in cross-section. The web may move with wave motion up and down or around the coil such that the S/N interaction creates a magnetic field to change in Coil harnessing wave energy as electrical energy comprising direct current energy (which varies with the motion of the wings and disc). The control and generator module 3340 may comprise any of the control and generator modules discussed above including a Hummingbird control and is intended to covert the variable direct current generated by the coil to constant frequency, constant voltage alternating current. The wave energy generator delivers AC power to a grid 3350 at constant frequency and voltage. Regarding the socket in particular of FIG. 33(B), the socket may be seen to be bowl-shaped (without the bottom) and comprise the, for example, eight sets of magnets which move about the coil 3310 up and down and around the coil due to wave motion which coil 3310 picks up the generated EMF and delivers the EMF generated to the C and G module 2340 (control and generating module) for output to grid 3350 at constant frequency and voltage.

FIG. 34 provides a further mechanical block diagram 3400 of a Hummingbird control 3430 that may comprise a hydroelectric turbine having an alternating current control motor 3440 powered by an electrical grid for producing a constant rotational velocity. A hydro-electric harnessing module may be installed at tail races, spillways (usually associated with a dam) and operate during non-deigned for levels of dam water. Examples includes storm weather, draught conditions and the like. Input rotational speed of shaft 3421 from the harnessing module designed for hydro-electric harnessing provides an input to drive a Hummingbird control 3430. Control input of a predetermined level of constant power is provided by grid to an AC control motor connected to the left sun gear/sleeve/sun gear extension gear of the left Transgear assembly. Alternatively, a portion of generated power from constant speed generator 3450 may power the AC control motor 3440. Control (from AC control motor 3440) is provided to the left sun gear/sleeve/sun gear extension gear of the Hummingbird 3430 used. Output to the grid (which is a multiple of the control input taken from the grid) is taken from the right sun gear/sleeve/extension gear of the second (right) Transgear assembly operating a constant speed generator 3450 operating at a desired electrical alternating current frequency.

FIG. 35A provides a further mechanical block diagram 3500 of a system for use with a harnessing module 3510 comprising solar panels (photelectric cells, for example, which generate direct current electricity from light energy). A plurality of solar panels 3510 may be connected in parallel and deliver at the output of the harnessing module 3510 a multiple of the electricity generated by just one solar panel. The captured electrical energy of the solar panels 3510 is delivered to an automatic voltage regulator 3520 in combination with at least one battery 3525 for storing electricity during peak solar energy times and discharging during non-peak periods (such as at night). Batteries 3525 or automatic voltage regulator 3520 provide constant voltage direct current to a constant speed direct current motor 3530 which outputs a constant rotational speed via a joining shaft to constant speed generator 3540. The constant speed generator in turn will typically be an alternating current constant speed generator 3540 for generating constant voltage at constant frequency to the grid 3545 or the output may be used locally to run a DC or an AC system such as an industrial facility.

FIG. 35B shows a further speed converter-controlled solar turbine 3550 with or without use of grid power. A control box 3575 controls the constant speed AC control motor 3570 and the variable speed DC motor 3565 so that variable solar electric input from the solar panels 3560 is distributed as variable power to variable speed DC motor 3565 and some power is used to drive AC control motor 3570 at constant speed in case grid power is not available. The harnessed electric power from typically photoelectric conversion by solar panels 3560 is regulated to constant frequency by constant speed AC generator 3580 and output to grid 3595. Control motor 3570 can be a DC motor when grid power is not available for local power.

FIG. 36 provides a further mechanical schematic diagram of a concept (similar to a concept discussed earlier with reference to FIG. 23) of using variable speed generators and power converters connected in parallel to be able to capture as much energy as possible from the harnessing module 3610. Variable energy may be water or wind and so a harnessing module of variable energy 3610 may have a wind or river flow that may be buffered from high winds or extreme water flow conditions by a gearbox or a magnetic gear system 3620, the latter slipping if, for example, a wind turbine propeller is hit by a sudden gust of extreme winds. While only two pairs of variable speed generator and power converter are shown, a pair comprising, for example, variable speed generator 3660-1 and power converter 3670-1, there may be as many pairs connected in parallel as will support the capture of as much energy as possible from harnessing module 3610. A variable speed generator 3660 accepts variable rotational speed input from gearbox 3620 and feeds generated electricity to an associated power converter 3670 which delivers power at a desired constant frequency to a local output (for example, an industrial plant) or to a power grid.

FIG. 37 is similar to FIG. 36 and yet different in that the concept is connection of a plurality of variable speed generator and power converter pairs directly to the output shaft of the gearbox 3720. Note that the effective energy collected is distributed evenly between the two pairs so half the energy goes to the first pair and half to the second, connected in parallel, each to the shaft output of the gearbox 3720. So the two pairs of variable speed generator and power converter can handle and distribute the power received to the grid or for local use, each pair restoring half the received energy via the gearbox 3720. As shown, both shafts of the variable speed generators 3760-1 and 3760-2 are connected to the gear output of the gearbox or magnetic gear 3720. This arrangement will also generate more electricity and utilize plural variable speed converters. The arrangement is limited in reality to about three or four variable speed generator tapping harnessed rotational energy off the shaft output of the gearbox 3720 because realistically, there is not sufficient space for more than about four generator sun gears to mesh with gearbox 3720 shaft. Multiple sets of a generator and a power converter can be connected in parallel to increase power.

FIG. 38 shows an example of increasing the power rating of the DC Control Motor 3840, for example, from four megawatts to eight megawatts by connecting pairs of automatic voltage regulators (AVRs), such as 3850-1, with variable speed generators, such as 3860-1, in parallel such that twice the rotational energy in may be used to provide power to the DC control motor such as 8 megawatts. A multiple of ten being approximate, the output of a constant speed generator 3850 fed to an Output may be eighty megawatts via simplified Hummingbird 3830 given that at least eighty megawatts of energy is captured by harnessing module 3810.

FIG. 39 provides an example of utilizing multiple DC generators paired with automatic voltage regulators, series connected pairs connected in parallel and run by a common input shaft from harnessing module 3910 through simplified Hummingbird 3930 (with no gearbox shown but optionally used) so that DC control motor 3940 receives all the DC power at constant voltage DC available or required by the motor 3940 with the bulk of the harnessed energy operating a constant speed generator 3960 for output to a local use or to a grid at constant frequency and voltage. While only two pairs are shown, there may be a third or fourth pair of generator and regulator sharing incoming shaft coupling the harnessing module with the Hummingbird 3830.

The principles of application of the several discussed embodiments of a structure and method of constructing same for, for example, providing a green renewable energy alternative to the burning of fuel such as coal, oil or other less environmentally friendly energy sources have been demonstrated above using a pair of spur/helical gear assemblies of sun gears and planetary gears constructed as a three variable control of variable rotational speed and an accompanying VT&PG or variable overlap generator (VOG) control assembly used to convert rotational speed variation to constant frequency, for example, for use in a wind or MHK turbine electric power generator. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). A three variable to constant speed converter may be of the Goldfinch or Hummingbird type and include a constant speed motor for controlling the output speed at a constant along with use of a variable power generator in these embodiments. Besides wind and water energy uses, applications of a Hummingbird control may also be found in the fields of combustion or electric vehicles or boats, pumps and compressor. These and other features of embodiments and aspects of a variable energy flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A control assembly for controlling variable rotational speed input such that an output of the control assembly provides a more constant speed output than the variable rotational speed input, the control assembly comprising:

a first input shaft from an energy harnessing module, the first input shaft for receiving a variable rotational speed input from the energy harnessing module, the energy harnessed by the energy harnessing module being variable due to one of variable wind speed and variable water flow speed, the first input shaft connected via a gear box to a second input shaft having first and second central sun gears, the first central sun gear of the second input shaft meshing with a second planetary gear of first, second, third and fourth planetary gears, the second planetary gear having a width greater than that of the first central, input shaft sun gear, the first, second, third and fourth planetary gears comprising first and second opposite planetary gears of a first spur/helical gear assembly and third and fourth opposite planetary gears of a second spur/helical gear assembly, the third planetary gear of the second spur/helical gear assembly meshing with the second central input shaft sun gear, the first and second spur/helical gear assemblies comprising a mechanical control gear assembly, the opposite second planetary gear of the first spur/helical gear assembly being meshed with a first sun gear/sleeve/sun Year extension disc meshed with a gear of a shaft driven by a controlling module, the third and fourth opposite planetary gears comprising the planetary gear meshed with the second central input shaft sun gear and the opposite fourth planetary gear of the second spur/helical gear assembly being meshed with a second sun gear/sleeve/extension disc of the second spur/helical gear assembly, the second sun gear/sleeve/sun gear extension disc meshed with a gear of a shaft to a generating module comprising one of a variable overlap generator and a fixed overlap generator for generating one of a constant frequency, constant voltage alternating current output and a constant voltage direct current respectively.

2. The control assembly as recited in claim 1 wherein the controlling module comprises one of a direct current and an alternating current motor for providing a constant rotational speed input via a shaft and a gear of the shaft, the gear of the shaft meshed with the first sun gear/sleeve/sun gear extension disc of the first spur/helical ear assembly.

3. The control assembly as recited in claim 1 wherein the energy harnessing module comprises a propeller for capturing wind renewable energy.

4. The control assembly as recited in claim 1 wherein the energy harnessing module comprises one of a wheel and a propeller for capturing water renewable energy.

5. The control assembly as recited in claim 1 wherein the energy harnessing module comprises a disc comprising a wing and socket for receiving a ball, the disc, wing and socket forming a disc, wing and socket assembly, a ball moveable around the socket of the disc, wing and socket assembly, the disc, wing and socket assembly moveable up and down and around the ball, the ball comprising a north polarity coil surrounded by a plurality of south polarity magnets of the disc, wing and socket assembly and the disc provided with the wing such that the disc and wing may move up and down and around the north polarity coil to capture ocean wave renewable energy.

6. The control assembly as recited in claim 1 for use in controlling rotational speed of one of a wheel of a vehicle and a propeller of a boat wherein the vehicle or boat are powered by an internal combustion engine.

7. The control assembly as recited in claim 1 wherein the control assembly provides a rotational speed output to a shaft of one of a pump and a compressor.

8. The control assembly as recited in claim 1, the gear box comprising a magnetic gear assembly connecting the energy harnessing module to the first spur/helical gear assembly.

9. The control assembly as recited in claim 1 having first and second direct current generators connected in parallel for provided a multiple of the direct current power to a constant rotational speed control motor.

10. The control assembly of claim 1 wherein rated power of the constant rotational speed motor is approximately one tenth of the power generated by the variable overlap generator.

11. The control assembly of claim 1 adapted for use in one of a pump and a compressor.

12. The control assembly of claim 1 adapted for use in a vehicular transmission, the control assembly being connected to a speed/torque controller for receiving inputs of engine speed and vehicular speed, the vehicular speed being measured in revolutions per minute of one of a driven wheel and a driven propeller.

13. A control assembly for controlling variable rotational speed input such that an output of the control assembly provides a more constant speed output than its variable rotational speed input, the control assembly comprising:
- an input shaft from an energy harnessing module, the input shaft for receiving a variable rotational speed input from the energy harnessing module,
- the input shaft having a central sun gear of a first spur/helical gear assembly, the central input shaft sun gear meshing with a planetary gear of the first spur/helical gear assembly, the planetary gear having a width greater than that of the central input shaft sun gear, and
- a second spur/helical gear assembly adjacent to the first spur/helical gear assembly, the first and second spur/helical gear assemblies surrounding the input shaft, the first spur/helical gear assembly outputting a shaft control for rotating a rotor of a variable power generator for controlling variable speed input to constant speed output,
- the second spur/helical gear assembly receiving control input from a constant speed alternating current motor, the control motor receiving controlled power, the control motor for outputting constant output rotational speed from an output control box receiving controlled power from the variable power generator,
- the second spur/helical gear assembly including first and second opposite planetary gears, and
- the output control box outputting constant frequency and constant voltage responsive to the variable power generator, the constant frequency and constant voltage responsive to a shaft connected by a gear to the second spur/helical gear assembly for moving a moveable stator of the variable power generator with respect to the rotating rotor, the variable power generator outputting constant frequency and voltage power to the output control box, the constant output frequency and voltage power output of the output control box responsive to harnessed wind or river energy captured at the energy harnessing module.

14. The control assembly as recited in claim 13, the input shaft connected to the first spur/helical gear assembly via a brushless and commutator-less direct current generator and voltage regulator providing a direct current for powering a direct current constant speed motor, the direct current constant speed motor for providing constant rotational speed control input to the first spur/helical gear assembly.

15. The control assembly as recited in claim 13, the variable power generator comprising a rotor for rotating about a shaft connected to the first spur and helical gear assembly and the stator being axially moveable with respect to the rotating rotor for providing a constant frequency alternating current power output.

16. The control assembly as recited in claim 13 wherein the energy harnessing module comprises a propeller for capturing wind renewable energy.

17. The control assembly as recited in claim 13 wherein the energy harnessing module comprises one of a wheel and a propeller for capturing water renewable energy.

* * * * *